United States Patent
Da Silva et al.

(10) Patent No.: US 12,010,735 B2
(45) Date of Patent: Jun. 11, 2024

(54) RACH-REPORT INDICATING RAT OR NODE IN A DUAL-CONNECTIVITY / MULTI-RAT CONFIGURATION

(71) Applicant: Telefonaktiebolaget LM Ericsson (publ), Stockholm (SE)

(72) Inventors: Icaro L. J. Da Silva, Solna (SE); Angelo Centonza, Torrenueva Costa Granada (ES); Ali Parichehrehteroujeni, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/623,653

(22) PCT Filed: Jul. 8, 2020

(86) PCT No.: PCT/SE2020/050719
§ 371 (c)(1),
(2) Date: Dec. 29, 2021

(87) PCT Pub. No.: WO2021/006804
PCT Pub. Date: Jan. 14, 2021

(65) Prior Publication Data
US 2022/0295571 A1  Sep. 15, 2022

Related U.S. Application Data

(60) Provisional application No. 62/872,270, filed on Jul. 10, 2019.

(51) Int. Cl.
*H04W 74/0833* (2024.01)
*H04B 7/06* (2006.01)
(Continued)

(52) U.S. Cl.
CPC ...... *H04W 74/0841* (2013.01); *H04W 56/001* (2013.01); *H04W 74/0866* (2013.01); *H04W 80/02* (2013.01)

(58) Field of Classification Search
CPC .......... H04W 74/0841; H04W 56/001; H04W 74/0866; H04W 80/02; H04W 74/0833;
(Continued)

(56) References Cited

U.S. PATENT DOCUMENTS

2019/0132862 A1\* 5/2019 Jeon ...................... H04L 5/0098
2020/0021452 A1\* 1/2020 Sharma ................ H04L 12/189
(Continued)

FOREIGN PATENT DOCUMENTS

GB  2522665 A  8/2015

OTHER PUBLICATIONS

International Search Report and Written Opinion of the International Searching Authority for PCT International Application No. PCT/SE2020/050719 dated Oct. 13, 2020.
(Continued)

*Primary Examiner* — Harry H Kim
(74) *Attorney, Agent, or Firm* — Sage Patent Group

(57) ABSTRACT

Embodiments herein disclose e.g. a method performed by a UE for handling access to one or more radio network nodes: The UE initiates a random access, RA, procedure associated to a cell and according to a first configuration for a second radio access technology, RAT, while the UE is already connected to at least one cell of a first RAT. The UE logs random access related information of the random access procedure while the UE already has a RACH report stored for the first RAT, and transmits a RACH report based on the logged random access information or the stored RACH report, upon request from a radio network node when the UE has more than one medium access control, MAC, entity. The
(Continued)

UE further signals to the radio network node, an indication that highlights for what RAT or radio network node the transmitted RACH report was constructed.

15 Claims, 29 Drawing Sheets

(51) Int. Cl.
　　*H04W 24/02* (2009.01)
　　*H04W 36/00* (2009.01)
　　*H04W 56/00* (2009.01)
　　*H04W 74/08* (2009.01)
　　*H04W 76/16* (2018.01)
　　*H04W 80/02* (2009.01)

(58) Field of Classification Search
　　CPC . H04W 76/16; H04W 24/02; H04W 36/0077; H04B 7/0695
　　See application file for complete search history.

(56) References Cited

U.S. PATENT DOCUMENTS

| | | | |
|---|---|---|---|
| 2020/0145169 A1* | 5/2020 | Zhou | H04W 76/27 |
| 2020/0245205 A1* | 7/2020 | Park | H04W 36/0077 |
| 2022/0279453 A1* | 9/2022 | Dinan | H04W 52/367 |
| 2022/0295571 A1* | 9/2022 | Da Silva | H04W 76/16 |
| 2023/0141231 A1* | 5/2023 | Luo | H04W 76/12 |
| 2024/0032048 A1* | 1/2024 | Jeon | H04L 5/0092 |

OTHER PUBLICATIONS

3GPP TR 37.816 V0.4.0, "3rd Generation Partnership Project; Technical Specification Group Radio Access Network; Evolved Universal Terrestrial Radio Access (E-UTRA) and NR; Study on RAN-centric data collection and utilization for LTE and NR (Release 16)," May 2019, 35 pages.

3GPP TS 38.401 V15.5.0, "3rd Generation Partnership Project; Technical Specification Group Radio Access Network; NG-RAN; Architecture description (Release 15)," Mar. 2019, 39 pages.

CMCC, "Text Proposals for RACH optimization," R3-193187, 3GPP TSG-RAN WG3 #104, Reno, USA, May 13-17, 2019, 3 pages.

CATT, "Consideration RACH optimisation in DC scenario," R3-191580, 3GPP TSG-RAN WG3 #103bis, Xi'an, China, Apr. 8-12, 2019, 2 pages.

3GPP TS 38.300 V15.2.0, "3rd Generation Partnership Project; Technical Specification Group Radio Access Network; NR; NR and NG-RAN Overall Description; Stage 2 (Release 15)," Jun. 2018, 87 pages.

3GPP TS 36.321 V15.4.0, "3rd Generation Partnership Project; Technical Specification Group Radio Access Network; Evolved Universal Terrestrial Radio Access (E-UTRA); Medium Access Control (MAC) protocol specification (Release 15)," Dec. 2018, 131 pages.

3GPP TS 33.401 V15.4.0, "3rd Generation Partnership Project; Technical Specification Group Services and System Aspects; 3GPP System Architecture Evolution (SAE); Security architecture (Release 15)," Jun. 2018, 162 pages.

3GPP TS 38.321 V15.4.0, "3rd Generation Partnership Project; Technical Specification Group Radio Access Network; NR; Medium Access Control (MAC) protocol specification (Release 15)," Dec. 2018, 77 pages.

* cited by examiner

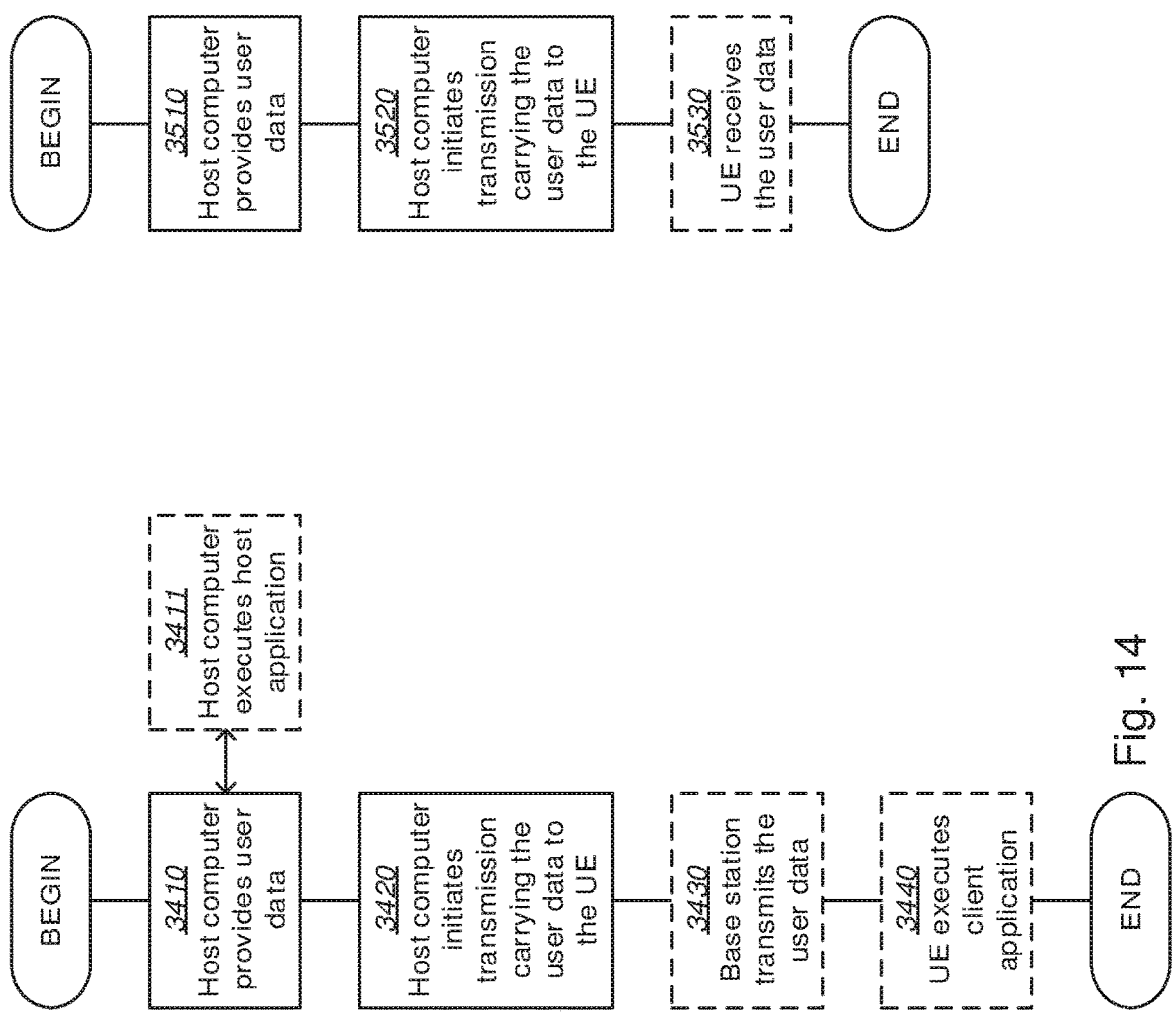

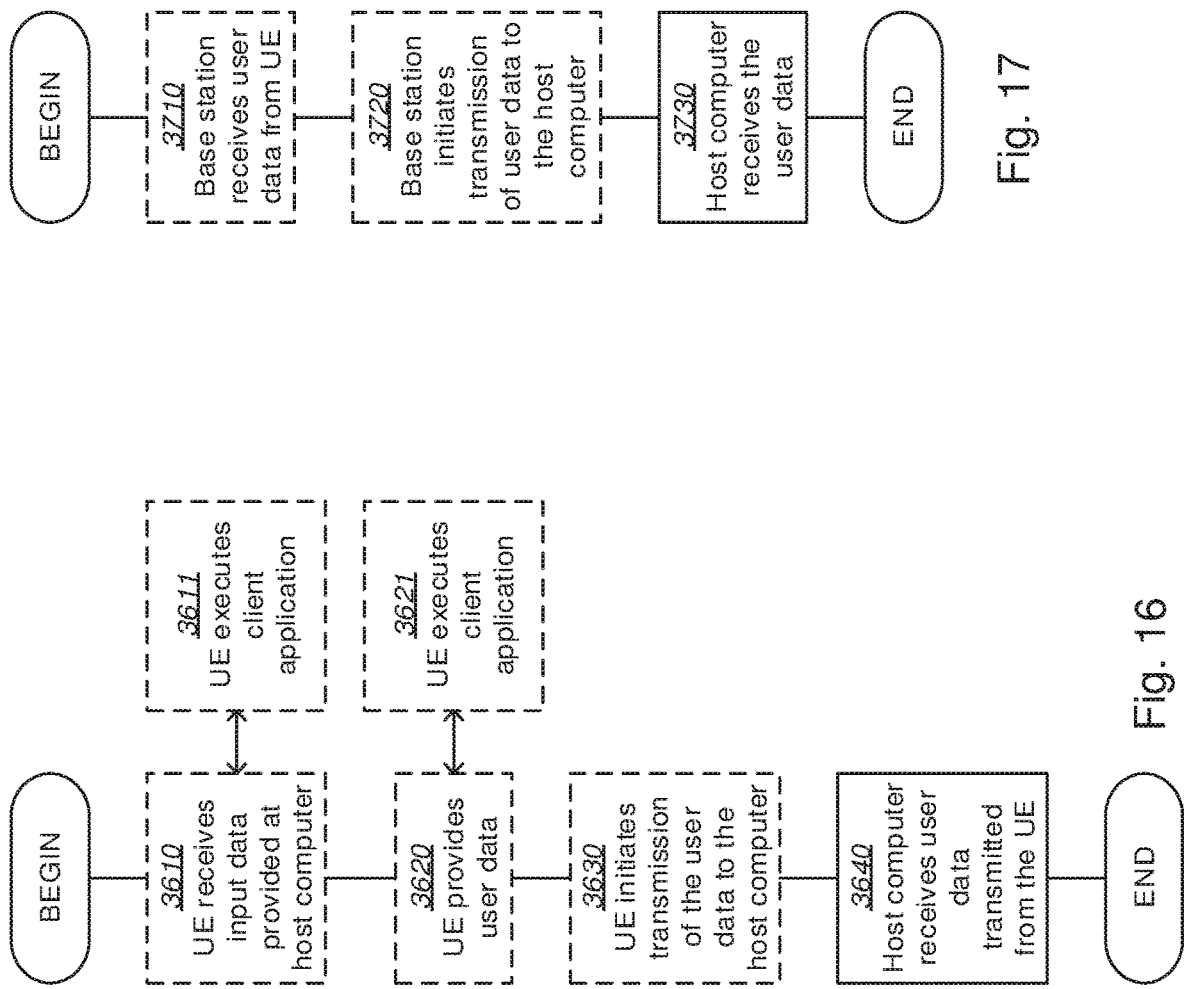

RACH-REPORT INDICATING RAT OR NODE IN A DUAL-CONNECTIVITY / MULTI-RAT CONFIGURATION

CROSS REFERENCE TO RELATED APPLICATIONS

This application is a 35 U.S.C. § 371 national stage application of PCT International Application No. PCT/SE2020/050719 filed on Jul. 8, 2020, which claims the benefit of U.S. Provisional Patent Application Ser. No. 62/872,270, filed on Jul. 10, 2019, the disclosures and content of which are incorporated by reference herein in their entireties.

TECHNICAL FIELD

Embodiments herein relate to a radio network node, a user equipment (UE) and methods performed therein for communication. Furthermore, a computer program product and a computer readable storage medium are also provided herein. In particular, embodiments herein relate to enabling or handling communication of the UE in a wireless communication network.

BACKGROUND

In a typical wireless communication network, user equipments (UE), also known as wireless communication devices, mobile stations, stations (STA) and/or wireless device, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

Embodiments herein are described within the context of 3GPP NR radio technology (3GPP TS 38.300 V15.2.0 (2018 June)). It is understood, that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

The current 5G RAN also referred to as next generation RAN (NG-RAN) architecture is depicted and described in TS 38.401 v15.5.0 as shown in FIG. 1a. The NG architecture can be further described as follows:

The NG-RAN consists of a set of gNBs connected to the 5GC through the NG.

An gNB can support FDD mode, TDD mode or dual mode operation.

gNBs can be interconnected through the Xn.

A gNB may consist of a gNB-CU and gNB-DUs. A gNB-CU and a gNB-DU is connected via F1 logical interface.

One gNB-DU is connected to only one gNB-CU.

NOTE: For resiliency, a gNB-DU may be connected to multiple gNB-CU by appropriate implementation.

NG, Xn and F1 are logical interfaces. The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport, signalling transport. If security protection for control plane and user plane data on TNL of NG-RAN interfaces has to be supported, NDS/IP (3GPP TS 33.401 v.15.4.0 shall be applied).

A gNB may also be connected to an LTE eNB via the X2 interface. Another architectural option is that where an LTE eNB connected to the Evolved Packet Core network is connected over the X2 interface with a so called en-gNB. The latter is a gNB not connected directly to a CN and connected via X2 to an eNB for the sole purpose of performing dual connectivity.

The architecture in FIG. 1a can be expanded by spitting the gNB-CU into two entities. So in the split architecture option, the RAN protocol stack functionality is separated in different parts. The CU-CP is expected to handle the RRC layer, the CU-UP will handle the PDCP layer and the DU will handle the RLC, MAC and PHY layer of the protocol stack. In some further split the DU can have separated unit that handles the PHY parts separately compared to RLC and MAC layers that are handled in a DU.

As different units handle different protocol stack functionalities, there will be a need for inter-node communication between the DU, the CU-UP and the CU-CP. This is achieved via F1-C interface related to control plane signalling, via F1-U interface related to user plane signalling for communication between CU and DU and via E1 for communication between CU-UP and CU-CP.

The E1 interface is a logical interface. It supports the exchange of signalling information between the endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

RACH Report in LTE

Optimization of the RACH configuration in cells is a Release 9 SON feature that is key to optimizing the system performance of a mobile network. A poorly configured RACH may result in higher call setup and handover delays due to frequent RACH collisions, or low preamble-detection probability and limited coverage. The amount of uplink resource reserved for RACH also affects the system capacity. Therefore, a network operator should carefully monitor that the RACH parameters are appropriately set, considering factors such as the RACH load, the uplink interference, the traffic patterns and the population under the cell coverage. The task becomes more complicated given that these factors may change dynamically. For example, if the antenna tilt is changed in a cell, it will affect the rates of call arrival and handover in this cell and the surrounding cells, and therefore the RACH load per preamble in all those cells. A change in transmission power settings or handover thresholds may have similar effects.

Whenever such a network configuration change happens, the RACH self-optimization feature should automatically make appropriate measurements of the RACH performance and usage in all the affected cells and determine any necessary updates of the RACH parameters. Some useful measurements are UE reports of the number of RACH attempts needed to obtain access, or time elapsed from the first attempt until access is finally granted.

RACH parameters that can then be adjusted are typically the following:

Split of RACH preambles between contention-free access, contention-based access with high payload and contention-based access with low payload;

RACH back-off parameter value or the RACH transmission power ramping parameters;

Any other parameter may be adjusted if found useful by network operator.

In addition, the RACH optimization feature facilitates automatic configuration of PRACH parameters (including the PRACH resource configuration, preamble root sequence and cyclic shift configuration) to avoid preamble collisions with neighbouring cells. The principle of this automatic configuration is similar to the automatic physical cell identifier (PCI) configuration SON feature: the PRACH configuration information is included in the 'X2 Setup' and 'eNB Configuration Update' procedures. Therefore, whenever a new eNodeB is initialized and learns about its neighbours via the ANR function, it can at the same time learn the neighbouring PRACH configurations. It can then select its own PRACH configuration to avoid conflicts with the neighbouring ones.

Whenever a conflict is identified, one of the cells should change its configuration, but the algorithm for selecting which cell should change and in what manner is not specified. The network operator can also combine PRACH self-optimization with manual configuration if necessary, but this is typically more prone to errors and more time consuming than automatic RACH optimization.

Log and Reporting of RACH Information in LTE

In LTE the report of RACH information when random access procedure is performed may be requested by the network via the UE Information procedure in RRC (section 5.6.5), in the case where a RACH procedure was successful. That procedure is summarized below, as described in RRC specifications:

5.6.5 UE Information 5.6.5.1 General

FIG. 1c discloses a UE information procedure that is used by E-UTRAN to request the UE to report information.

5.6.5.2 Initiation

E-UTRAN initiates the procedure by sending the UEInformationRequest message. E-UTRAN should initiate this procedure only after successful security activation.

5.6.5.3 Reception of the UEInformationRequest Message

Upon receiving the UEInformationRequest message, the UE shall, only after successful security activation:

1> if rach-ReportReq is set to true, set the contents of the rach-Report in the UEInformationResponse message as follows:
    2> set the numberOfPreamblesSent to indicate the number of preambles sent by MAC for the last successfully completed random access procedure;
    2> if contention resolution was not successful as specified in TS 36.321 [6] for at least one of the transmitted preambles for the last successfully completed random access procedure:
      3> set the contentionDetected to true;
    2> else:
      3> set the contentionDetected to false;
. . .
  1> else:
    2> submit the UEInformationResponse message to lower layers for transmission via SRB1;

UEInformationRequest

The UEInformationRequest is the command used by E-UTRAN to retrieve information from the UE.

Signalling radio bearer: SRB1
RLC-SAP: AM
Logical channel: DCCH
Direction: E-UTRAN to UE UEInformationRequest Message

```
-- ASN1START
UEInformationRequest-r9    ::=    SEQUENCE {
    rrc-TransactionIdentifier     RRC-TransactionIdentifier,
    criticalExtensions            CHOICE {
        c1                            CHOICE {
            ueInformationRequest-r9       UEInformationRequest-r9-IEs,
```

```
            spare3 NULL, spare2 NULL, spare1 NULL
        },
        criticalExtensionsFuture       SEQUENCE { }
    }
}
UEInformationRequest-r9-IEs    ::= SEQUENCE {
    rach-ReportReq-r9              BOOLEAN,
    rlf-ReportReq-r9               BOOLEAN,
    nonCriticalExtension           UEInformationRequest-v930-IEs    OPTIONAL
}
...
-- ASN1STOP
```

| rach-ReportReq |
|---|
| This field is used to indicate whether the UE shall report information about the random access procedure. |

UEInformationResponse
The UEInformationResponse message is used by the UE to transfer the information requested by the E-UTRAN.
   Signalling radio bearer: SRB1 or SRB2 (when logged measurement information is included)
   RLC-SAP: AM
   Logical channel: DCCH
   Direction: UE to E-UTRAN UEInformationResponse Message

```
-- ASN1START
UEInformationResponse-r9 ::=    SEQUENCE {
    rrc-TransactionIdentifier       RRC-TransactionIdentifier,
    criticalExtensions              CHOICE {
        c1                              CHOICE {
            ueInformationResponse-r9        UEInformationResponse-r9-IEs,
            spare3 NULL, spare2 NULL, spare1 NULL
        },
        criticalExtensionsFuture       SEQUENCE { }
    }
}
UEInformationResponse-r9-IEs ::=  SEQUENCE {
    rach-Report-r9                    SEQUENCE {
        numberOfPreamblesSent-r9          NumberOfPreamblesSent-r11,
        contentionDetected-r9             BOOLEAN
    }                                                                OPTIONAL,
    rlf-Report-r9                     RLF-Report-r9                  OPTIONAL,
    nonCriticalExtension              UEInformationResponse-v930-IEs OPTIONAL
}
NumberOfPreamblesSent-r11::=      INTEGER (1..200)
-- ASN1STOP
```

In summary, for each RACH procedure the UE stores the number of preambles sent, which corresponds to the parameter PREAMBLE_TRANSMISSION_COUNTER in MAC specifications (TS 36.321 v.15.4.0. In random access procedure in LTE, the UE sends a preamble and waits for a random-access response (RAR) during a pre-configured time window (RAR window). If the RAR does not come within that time, the UE shall adjust some preamble transmission parameters (e.g. transmission power) and transmit it again (in what is called power ramping adjustment). If the procedure is successful, at the n-th transmission the preamble will be responded. The number n is what would be provided in the RACH report, so the network knows how many times the UE needed to ramp the power before the procedure was successful.

The random-access procedure, and specifically the meaning of the PREAMBLE_TRANSMISSION_COUNTER is shown below, as described in the MAC specifications. First of all, during the initialization the counter is set of 1. Then, at the first attempt, according to the preamble transmission in 5.3.1 the UE shall set the preamble received target power, i.e., the expected power in the RACH receiver at the eNB, to the initial transmission power (parameter provided by the eNB, e.g., via SIB2 in LTE). These values may range from −120 dBm to −90 dBm, and are provided as part of the Power Ramping Parameters. Note that this may also be a parameter to be optmized later (a too large value may lead to a high RACH success rate, but it coud alo create unnecessary UL interference, problematic especially in high load scenarios).

As shown below, the PREAMBLE_RECEIVED_TARGET_POWER will be in this first attempt the preambleInitialReceivedTargetPower+DELTA_PREAMBLE (offset depending on the preamble format that has been configured by the network in prach-ConfigIndex, ranging from −3 dB to 8 dB).

Then, as described in section 3, if no response is received within the configured RAR time window, anohter parameter to possibly optimize, PREAMBLE_TRANSMISSION_COUNTER is incremented by 1. Then, it is chekced if the number of increments has reached its maximum value or not (also a configurable parameter that could be optimized).

Assuming the UE may still perform preamble re-transmission, power ramping occurs and the new preamble transmission power is incremented by a power ramping step, also a configurable parameter. The transmission power in this second attempt will then be:

PREAMBLE_RECEIVED_TARGET_POWER= preambleInitialReceivedTargetPower+DELTA_PREAMBLE+1*powerRampingStep The parameter powerRampingStep may be 0 dB, 2 dB, 4 dB or 6 dB. Power ramping parameters as broadcasted in SIB2 as shown below.

```
PowerRampingParameters ::=              SEQUENCE {
    powerRampingStep                        ENUMERATED {dB0, dB2,dB4, dB6},
    preambleInitialReceivedTargetPower      ENUMERATED {
                                                dBm-120, dBm-118, dBm-116, dBm-114, dBm-
                                                112,
                                                dBm-110, dBm-108, dBm-106, dBm-104, dBm-
```

102,
      dBm-100, dBm-98, dBm-96, dBm-94,
      dBm-92, dBm-901
}

A the (N+1)-th attempt:

PREAMBLE_RECEIVED_TARGET_POWER= preambleInitialReceivedTargetPower+DELTA_PREAMBLE+$N$*powerRampingStep RACH Report in NR As in LTE, random access procedure is described in the NR MAC specifications and parameters are configured by RRC e.g. in system information or handover (RRCReconfiguration with reconfigurationWithSync). Random access is triggered in many different scenarios, for example, when the UE is in RRC_IDLE or RRC_INACTIVE and want to access a cell that is camping on (i.e. transition to RRC_CONNECTED).

In NR, RACH configuration is broadcasted in SIB1, as part of the servingCellConfigCommon (with both DL and UL configurations), where the RACH configuration is within the uplinkConfigCommon. The exact RACH parameters are within what is called initialUplinkBWP, since this is the part of the UL frequency the UE shall access and search for RACH resources.

Below, we highlight the RACH configuration, focusing primarily on parameters related to the preamble power ramping functionality, i.e., power ramping step and initial power ramping, as shown for LTE in the previous section.

RACH-ConfigGeneric Information Element

```
-- ASN1START
-- TAG-RACH-CONFIGGENERIC-START
RACH-ConfigGeneric ::=              SEQUENCE (
    prach-ConfigurationIndex        INTEGER (0..255),
    msg1-FDM                        ENUMERATED {one, two, four, eight},
    msg1-FrequencyStart             INTEGER
(0..maxNrofPhysicalResourceBlocks-1),
    zeroCorrelationZoneConfig       INTEGER (0..15),
    preambleReceivedTargetPower     INTEGER (-202..-60),
    preambleTransMax                ENUMERATED {n3, n4, n5, n6, n7, n8, n10,
n20, n50, n100, n200},
    powerRampingStep                ENUMERATED {dB0, dB2, dB4, dB6},
    ra-ResponseWindow               ENUMERATED {sl1, sl2, sl4, sl8, sl10,
sl20, sl40, sl80},
    ...
}
-- TAG-RACH-CONFIGGENERIC-STOP
-- ASN1STOP
``` msg1-FDM
The number of PRACH transmission occasions FDMed in one time instance, (see TS 38.211 [16], clause 6.3.3.2)
msg1-FrequencyStart
Offset of lowest PRACH transmission occasion in frequency domain with respective to PRB 0. The value is configured so that the corresponding RACH resource is entirely within the bandwidth of the UL BWP. (see TS 38.211 [16], clause 6.3.3.2).
powerRampingStep
Power ramping steps for PRACH (see TS 38.321 [3],5.1.3).
prach-ConfigurationIndex
PRACH configuration index. For prach-ConfigurationIndex configured under beamFailureRecovery-Config, the prach-ConfigurationIndex can only correspond to the short preamble format, (see TS 38.211 [16], clause 6.3.3.2).
preambleReceivedTargetPower
The target power level at the network receiver side (see TS 38.213 [13], clause 7.4, TS 38.321 [3], clauses 5.1.2, 5.1.3). Only multiples of 2 dBm may be chosen (e.g. -202, -200, -198, . . . ).
preambleTransMax
Max number of RA preamble transmission performed before declaring a failure (see TS 38.321 [3], clauses 5.1.4, 5.1.5).
ra-ResponseWindow
Msg2 (RAR) window length in number of slots. The network configures a value lower than or equal to 10 ms (see TS 38.321 [3], clause 5.1.4). UE ignores the field if included in SCellConfig.
zeroCorrelationZoneConfig
N-CS configuration, see Table 6.3.3.1-5 in TS 38.211 [16]

RACH-ConfigCommon Information Element

```
-- ASN1START
-- TAG-RACH-CONFIGCOMMON-START
RACH-ConfigCommon ::=                           SEQUENCE {
    rach-ConfigGeneric                              RACH-ConfigGeneric,
    totalNumberOfRA-Preambles                       INTEGER (1..63)    OPTIONAL,      -- Need S
    ssb-perRACH-OccasionAndCB-PreamblesPerSSB       CHOICE {
        oneEighth                                       ENUMERATED
{n4,n8,n12,n16,n20,n24,n28,n32,n36,n40,n44,n48,n52,n56,n60,n64},
        oneFourth                                       ENUMERATED
{n4,n8,n12,n16,n20,n24,n28,n32,n36,n40,n44,n48,n52,n56,n60,n64},
        oneHalf                                         ENUMERATED
{n4,n8,n12,n16,n20,n24,n28,n32,n36,n40,n44,n48,n52,n56,n60,n64},
        one                                             ENUMERATED
{n4,n8,n12,n16,n20,n24,n28,n32,n36,n40,n44,n48,n52,n56,n60,n64},
        two                                             ENUMERATED
{n4,n8,n12,n16,n20,n24,n28,n32},
        four                                            INTEGER (1..16),
        eight                                           INTEGER (1..8),
        sixteen                                         INTEGER (1..4)
    }
OPTIONAL,    -- Need M
    groupBconfigured                                SEQUENCE {
        ra-Msg3SizeGroupA                               ENUMERATED {b56, b144, b208, b256,
b282, b480, b640,
                                                        b800, b1000, b72, spare6,
spare5,spare4, spare3, spare2, spare1},
        messagePowerOffsetGroupB                        ENUMERATED { minusinfinity, dB0, dB5,
dB8, dB10, dB12, dB15, dB18},
        numberOfRA-PreamblesGroupA                      INTEGER (1..64)
    }
OPTIONAL,    -- Need R
    ra-ContentionResolutionTimer                    ENUMERATED { sf8, sf16, sf24, sf32,
sf40, sf48, sf56, sf64},
    rsrp-ThresholdSSB                               RSRP-Range
OPTIONAL,    -- Need R
    rsrp-ThresholdSSB-SUL                           RSRP-Range
OPTIONAL,    -- Cond SUL
    prach-RootSequenceIndex                         CHOICE {
        l839                                            INTEGER (0..837),
        l139                                            INTEGER (0..137)
    },
    msg1-SubcarrierSpacing                          SubcarrierSpacing
OPTIONAL, -- Cond L139
    restrictedSetConfig                             ENUMERATED {unrestrictedSet,
restrictedSetTypeA, restrictedSetTypeB},
    msg3-transformPrecoder                          ENUMERATED {enabled}
OPTIONAL,    -- Need R
    ...
}
-- TAG-RACH-CONFIGCOMMON-STOP
-- ASN1STOP
``` messagePowerOffsetGroupB
Threshold for preamble selection. Value in dB. Value minus infinity corresponds to -infinity. Value dB0 corresponds to 0 dB, dB5 corresponds to 5 dB and so on. (see TS 38.321 [3], clause 5.1.2)
msg1-SubcarrierSpacing
Subcarrier spacing of PRACH (see TS 38.211 [16], clause 5.3.2). Only the values 15 or 30 kHz (<6 GHz), 60 or 120 kHz (>6 GHz) are applicable (see TS 38.211 [16], section FFS_Section). If absent, the UE applies the SCS as derived from the prach-ConfigurationIndex in RACH-ConfigGeneric (see tables Table 6.3.3.1-1 and Table 6.3.3.2-2, TS 38.211 [16]). The value also applies to contention free random access (RACH-ConfigDedicated), to SI-request and to contention-based beam failure recovery (CB-BFR). But it does not apply for contention free beam failure recovery (CF-BFR) (see BeamFailureRecoveryConfig).
msg3-transformPrecoder
Enables the transform precoder for Msg3 transmission. If the field is absent, the UE disables the transformer precoder (see TS 38.213 [13], clause 8.3)
numberOfRA-PreamblesGroupA
The number of CB preambles per SSB in group A. This determines implicitly the number of CB preambles per SSB available in group B. (see TS 38.321 [3], clause 5.1.1). The setting should be consistent with the setting of ssb-perRACH-OccasionAndCB-PreamblesPerSSB.
prach-RootSequenceIndex
PRACH root sequence index (see TS 38.211 [16], clause 6.3.3.1). The value range depends on whether L = 839 or L = 139. The short/long preamble format indicated in this IE should be consistent with the one indicated in prach-ConfigurationIndex in the RACH-ConfigDedicated (if configured).
ra-ContentionResolutionTimer -continued The initial value for the contention resolution timer (see TS 38.321 [3], clause 5.1.5). Value sf8 corresponds to 8 subframes, value sf16 corresponds to 16 subframes, and so on.
ra-Msg3SizeGroupA
Transport Blocks size threshold in bit below which the UE shall use a contention-based RA preamble of group A. (see TS 38.321 [3], clause 5.1.2)
rach-ConfigGeneric
Generic RACH parameters
restrictedSetConfig
Configuration of an unrestricted set or one of two types of restricted sets, see TS 38.211 [16], clause 6.3.3.1.
rsrp-ThresholdSSB
UE may select the SS block and corresponding PRACH resource for path-loss estimation and (re)transmission based on SS blocks that satisfy the threshold (see TS 38.213 [13])
rsrp-ThresholdSSB-SUL
The UE selects SUL carrier to perform random access based on this threshold (see TS 38.321 [3], clause 5.1.1). The value applies to all the BWPs.
ssb-perRACH-OccasionAndCB-PreamblesPerSSB
The meaning of this field is twofold: the CHOICE conveys the information about the number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of Contention Based preambles per SSB (L1 parameter 'CB-preambles-per-SSB'). Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion).
totalNumberOfRA-Preambles
Total number of preambles used for contention based and contention free random access in the RACH resources defined in RACH-ConfigCommon, excluding preambles used for other purposes (e.g. for SI request). If the field is absent, the all 64 preambles are available for RA. The setting should be consistent with the setting of ssb-perRACH-OccasionAndCB-PreamblesPerSSB, i.e. it should be a multiple of the number of SSBs per RACH occasion.

NR Random Access Procedure (Preamble Power Ramping)

In LTE, the RACH report to assist the network to perform RACH optimization, contains the number of preamble transmissions until the procedure succeeds. It is also very clear what has happened at the UE between the first transmission and the last transmission until the procedure was considered successful: the UE applied power ramping with a configured step and transmitted the preamble once more.

As in LTE, a similar counter PREAMBLE_TRANSMISSION_COUNTER that assists the UE to perform power ramping, sort of RACH state variable, also exists in NR. And, as in LTE, during initialization, that counter is set to 1, so that the initial transmission power for the selected preamble is PREAMBLE_RECEIVED_TARGET_POWER= preambleReceivedTargetPower+DELTA_PREAMBLE. This is just like in LTE, where in the first attempt the transmission power is just the initial transmission power configured by the network+a specified offset which depends on the selected preamble.

Also as in LTE, if no response is received within the configured RAR time window, PREAMBLE_TRANSMISSION_COUNTER is incremented by 1. Then, it is chekced if the number of increments has reached its maximum value or not (also a configurable parameter that could be optimized).

Differences in Power Ramping in NR and LTE

In NR, random access resource selection needs to be performed within a cell depending on measurements performed on SSBs (synchornization signal blocks) or CSI-RSs. A cell in NR is basically defined by a set of these SSBs that may be transmitted in 1 (typical implementation for lower frequencies e.g. below 6 GHz) or multiple downlink beams (typical implementation for lower frequencies e.g. below 6 GHz). For the same cell, these SSBs carry the same physical cell identifier (PCI) and a MIB. For standalone operation, i.e., to support UEs camping on an NR cell, they also carry in SIB1 the RACH configuration, which comprises a mapping between the detected SSB covering the UE at a given point in time and the PRACH configuration (e.g. time, frequency, preamble, etc.) to be used. For that, each of these beams may transmit its own SSB which may be distinguished by an SSB index, see FIG. 2.

The mapping between RACH resources and SSBs (or CSI-RS) is also provided as part of the RACH configuration (signalled to the UE via RRC in RACH-ConfigCommon). Two paramers are relevant here:
SSBs-per-PRACH-occasion: ⅛, ¼, ½, 1, 2, 8 or 16, which represents the number of SSBs per RACH occasion;
CB-preambles-per-SSB preambles to each SS-block: within a RACH occasion, how many preambles are allocated;

To given a first example, if the number of SSBs per RACH occasion is 1, and if the UE is under the coverage of a specific SSB e.g. SSB index 2, there will be a RACH occasion for that SSB index 2. If the UE moves and is now under the coverage of another specific SSB e.g. SSB index 5, there will be another RACH occasion for that SSB index 5 i.e. each SSB detected by a given UE would have its own RACH occasion. Hence, at the network side, upon detecting a preamble in a particular RACH occasion the network knows exactly which SSB the UE has selected and, consequently, which downlink beam is covering the UE, so that the network can continue the downlink transmission e.g. RAR, etc. That factor 1 is an indication that each SSB has its own RACH resource. i.e., a preamble detected there indicates to the network which SSB the UE has selection i.e. which DL beam the network should use to communicate with the UE, such as the one to send the RAR. An example is shown in FIG. 3.

Note that each SS-block typically maps to multiple preambles (different cyclic shifts and Zadoff-Chu roots) within a PRACH occasion, so that it is possible to multiplex different UEs in the same RACH occasions since they may be under the coverage of the same SSB. In a second example, shown FIG. 4, the number of SSBs per RACH occasion is 2. Hence, a preamble received in that RACH occasion indicated to the network that one of the two beams are being selected by the UE. So either the network has means via implementation to distinguish these two beams and/or should perform a beam sweeping in the downlink by transmitting the RAR in both beams, either simultaneously or, transmitting in one, waiting for a response from the UE, and if absent, transmit in the other.

Assuming now that in the first attempt the UE has selected an SSB (based on measurements performed in that cell), it has transmitted with initial power a selected preamble associated to the PRACH resource mapped to the selected SSB, and it has not received a RAR within the RAR time window. According to the specifications, the UE may still perform preamble re-transmission (i.e. maximum number of allowed transmissions not reached).

As in LTE, at every preamble retransmission attempt, the UE may assume the same SSB as the previous attempt and perform power ramping similar to LTE. A maximum number of attempts is also defined in NR, which is also controlled by the parameter PREAMBLE_TRANSMISSION_ COUNTER.

On the other hand, different from LTE, at every preamble retransmission attempt, the UE may alternatively select a different SSB, as long as that new SSB has an acceptable quality (i.e. its measurements are above a configurable threhsold). In that case, when a new SSB (or, in more general term, a new beam) is selected, the UE does not perform power ramping, but transmits the preamble with the same previously transmitted power (i.e. UE shall not re-initiate the power to the intial power transmission). That is shown in the FIG. 5.

For that reason, a new variable is defined in the NR MAC specifications (TS 38.321 v.15.4.0) called PREAMBLE_ POWER_RAMPING_COUNTER, in case the same beam is selected at a retransmission. At the same time, the previous LTE variable still exists (PREAMBLE_TRANSMISSION_ COUNTER), so that the total number of attempts is still limited, regardless if the UE performs at each attempt SSB/beam re-selection or power ramping.

Hence, if the initial preamble transmission, e.g. associated to SSB-2, does not sueed, and the UE selects the same SSB/beam, PREAMBLE_POWER_RAMPING_ COUNTER is incremented (i.e. set to 2 in this second attempt) and the transmission power will be: PREAMBLE_RECEIVED_ TARGET_POWER= preambleReceivedTargetPower+DELTA_PREAMBLE+1*PREAMBLE_POWER_RAMPING_ STEP;

Else, if instead the UE selects a different SSB/beam, the PREAMBLE_POWER_RAMPING_COUNTER is not incremented (i.e. remains 1) and the transmission power will be as in the first transmission: PREAMBLE_RECEIVED_ TARGET_POWER= preambleReceivedTargetPower+DELTA_PREAMBLE;

That preamble power ramping procedure, in case of multiple preamble transmission attempts, is shown below as described in the MAC specifications (TS 38.321):

When the Random Access procedure is initiated on a Serving Cell, the MAC entity shall:
1> flush the Msg3 buffer;
1> set the PREAMBLE_TRANSMISSION_COUNTER to 1;
1> set the PREAMBLE_POWER_RAMPING_ COUNTER to 1;
. . .
1> set PREAMBLE_POWER_RAMPING_STEP to powerRampingStep;
1> set SCALING_FACTOR_BI to 1;
1> if the Random Access procedure was initiated for beam failure recovery (as specified in subclause 5.17); and
1> if beamFailureRecoveryConfig is configured for the active UL BWP of the selected carrier:
   2> start the beamFailureRecoveryTimer, if configured;
   2> apply the parameters powerRampingStep, preambleReceivedTargetPower, and preambleTransMax configured in the beamFailureRecoveryConfig;
   2> if powerRampingStepHighPriority is configured in the beamFailureRecoveryConfig:
      3> set PREAMBLE_POWER_RAMPING_STEP to the powerRampingStepHighPriority.
   2> else:
      3> set PREAMBLE_POWER_RAMPING_STEP to powerRampingStep.
   2> if scalingFactorBI is configured in the beamFailureRecoveryConfig:
      3> set SCALING_FACTOR_BI to the scalingFactorBI.
1> else if the Random Access procedure was initiated for handover; and
1> if rach-ConfigDedicated is configured for the selected carrier:
   2> if powerRampingStepHighPriority is configured in the rach-ConfigDedicated:
      3> set PREAMBLE_POWER_RAMPING_STEP to the powerRampingStepHighPriority.
   2> if scalingFactorBI is configured in the rach-ConfigDedicated:
      3> set SCALING_FACTOR_BI to the scalingFactorBI.
1> perform the Random Access Resource selection procedure (see subclause 5.1.2).
. . .

5.1.2 Random Access Resource Selection

The MAC entity shall:
1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in TS 38.214 [7].

2> else:
  3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by physical downlink control channel (PDCCH); and
1> if the ra-PreambleIndex is not 0b000000:
  2> set the PREAMBLE_INDEX to the signalled ra-PreambleIndex;
  2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> select a Random Access Preamble corresponding to the selected SSB, from the Random Access Preamble(s) determined according to ra-PreambleStartIndex as specified in TS 38.331 [5];
  2> set the PREAMBLE_INDEX to selected Random Access Preamble.
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.

5.1.3 Random Access Preamble Transmission
The MAC entity shall, for each Random Access Preamble:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
  2> increment PREAMBLE_POWER_RAMPING_COUNTER by 1.
1> select the value of DELTA_PREAMBLE according to subclause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET_POWER.

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier).

5.1.4 Random Access Response Reception
Once the Random Access Preamble is transmitted and regardless of the possible occurrence of a measurement gap, the MAC entity shall:
  1> if the contention-free Random Access Preamble for beam failure recovery request was transmitted by the MAC entity:
    2> start the ra-Response Window configured in BeamFailureRecoveryConfig at the first PDCCH occasion as specified in TS 38.213 [6] from the end of the Random Access Preamble transmission;
    2> monitor for a PDCCH transmission on the search space indicated by recoverySearchSpaceId of the SpCell identified by the C-RNTI while ra-Response Window is running
  1> else:
    2> start the ra-Response Window configured in RACH-ConfigCommon at the first PDCCH occasion as specified in TS 38.213 [6] from the end of the Random Access Preamble transmission;
    2> monitor the PDCCH of the SpCell for Random Access Response(s) identified by the RA-RNTI while the ra-Response Window is running
  1> if notification of a reception of a PDCCH transmission on the search space indicated by recoverySearchSpaceId is received from lower layers on the Serving Cell where the preamble was transmitted; and
  1> if PDCCH transmission is addressed to the C-RNTI; and
  1> if the contention-free Random Access Preamble for beam failure recovery request was transmitted by the MAC entity:
    2> consider the Random Access procedure successfully completed.
  1> else if a downlink assignment has been received on the PDCCH for the RA-RNTI and the received TB is successfully decoded:
    2> if the Random Access Response contains a MAC subPDU with Backoff Indicator:

3> set the PREAMBLE_BACKOFF to value of the BI field of the MAC subPDU using Table 7.2-1, multiplied with SCALING_FACTOR_BI.
2> else:
3> set the PREAMBLE_BACKOFF to 0 ms.
2> if the Random Access Response contains a MAC subPDU with Random Access Preamble identifier corresponding to the transmitted PREAMBLE_INDEX (see subclause 5.1.3):
3> consider this Random Access Response reception successful.
2> if the Random Access Response reception is considered successful:
3> if the Random Access Response includes a MAC subPDU with RAPID only:
4> consider this Random Access procedure successfully completed;
4> indicate the reception of an acknowledgement for SI request to upper layers.
3> else:
4> apply the following actions for the Serving Cell where the Random Access Preamble was transmitted:
5> process the received Timing Advance Command (see subclause 5.2);
5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
5> if the Serving Cell for the Random Access procedure is SRS-only SCell:
6> ignore the received UL grant.
5> else:
6> process the received UL grant value and indicate it to the lower layers.
4> if the Random Access Preamble was not selected by the MAC entity among the contention-based Random Access Preamble(s):
5> consider the Random Access procedure successfully completed.
4> else:
5> set the TEMPORARY_C-RNTI to the value received in the Random Access Response;
5> if this is the first successfully received Random Access Response within this Random Access procedure:
6> if the transmission is not being made for the CCCH logical channel:
7> indicate to the Multiplexing and assembly entity to include a C-RNTI MAC CE in the subsequent uplink transmission.
6> obtain the MAC PDU to transmit from the Multiplexing and assembly entity and store it in the Msg3 buffer.
NOTE: If within a Random Access procedure, an uplink grant provided in the Random Access Response for the same group of contention-based Random Access Preambles has a different size than the first uplink grant allocated during that Random Access procedure, the UE behavior is not defined.
1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or 1> if ra-Response Window configured in RACH-ConfigCommon expires, and if the Random Access Response containing Random Access Preamble identifiers that matches the transmitted PREAMBLE_INDEX has not been received:
2> consider the Random Access Response reception not successful;
2> increment PREAMBLE_TRANSMISSION_COUNTER by 1;
2> if PREAMBLE_TRANSMISSION_COUNTER= preambleTransMax+1:
3> if the Random Access Preamble is transmitted on the SpCell:
4> indicate a Random Access problem to upper layers;
4> if this Random Access procedure was triggered for SI request:
5> consider the Random Access procedure unsuccessfully completed.
3> else if the Random Access Preamble is transmitted on a SCell:
4> consider the Random Access procedure unsuccessfully completed.
2> if the Random Access procedure is not completed:
3> select a random backoff time according to a uniform distribution between 0 and the PREAMBLE_BACKOFF;
3> if the criteria (as defined in subclause 5.1.2) to select contention-free Random Access Resources is met during the backoff time:
4> perform the Random Access Resource selection procedure (see subclause 5.1.2); 3> else:
4> perform the Random Access Resource selection procedure (see subclause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX. HARQ operation is not applicable to the Random Access Response reception.

RACH report in NR has not yet been standardized, but RAN2 has made the following agreements so far regarding RACH report (text proposal for RACH optimization, agreed in R3-193187), including the following:

Need for reporting of PRACH configuration from DU to CU and from CU to neighbouring RAN nodes;

Information included in the RACH Report, such as
  Indexes of the SSBs and number of RACH preambles sent on each tried SSB listed in chronological order of attempts
  The frequency (NR ARFCN) of tried SSBs
  The beam quality of each tried SSB (i.e., beam level measurement during RACH attempts such as BRSRP, BRSRQ, BSINR)
  Indication whether the selected SSB is above or below the rsrp-ThresholdSSB threshold
  Elapsed time from the last measurement prior to the beam selection time
  Number of RACH preambles sent on SUL
  Number of RACH preambles sent on NUL
  Total number of fallbacks between Contention Based RACH Access (CBRA) and Contention Free RACH Access (CFRA) Contention detection indication LTE Dual Connectivity (DC)

In Rel-12 Dual Connectivity has been standardized for LTE whereby a multiple Rx/Tx UE in RRC_CONNECTED is configured to utilize radio resources provided by two distinct schedulers, located in two eNBs connected via a non-ideal backhaul over the X2 interface. The overall E-UTRAN architecture as specified in section 4 and depicted in FIG. 4-1 is applicable for DC as well. eNBs involved in DC for a certain UE may assume two different roles: an eNB may either act as an MeNB or as an SeNB. In DC a UE is connected to one MeNB and one SeNB.

In DC, the radio protocol architecture that a particular bearer uses depends on how the bearer is setup. Three bearer types exist: MCG bearer, SCG bearer and split bearer. Those three bearer types are depicted on FIG. 6a. RRC is located in MeNB and signalling radio bearers (SRB) are always configured as MCG bearer type and therefore only use the radio resources of the MeNB.

As it can be seen in the FIG. 6a above, two MAC entities may exist: one for the primary cell (PCell) and another for the primary secondary cell (PSCell).

Inter-eNB control plane signalling for DC is performed by means of X2 interface signalling. Control plane signalling towards the MME is performed by means of S1 interface signalling. There is only one S1-MME connection per DC UE between the MeNB and the MME. Each eNB should be able to handle UEs independently, i.e. provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signalling. FIG. 6b shows C-plane connectivity of eNBs involved in DC for a certain UE: the S1-MME is terminated in MeNB and the MeNB and the SeNB are interconnected via X2-C.

NR Dual Connectivity and MR-DC

There are different ways to deploy 5G network with or without interworking with LTE and evolved packet code (EPC). So far in 3GPP, the main focus has been on three options depicted in FIG. 6c. In principle, NR and LTE can be deployed without any interworking, denoted by NR stand-alone (SA) operation, that is a gNB in NR can be connected to 5G core network (5GC) and eNB can be connected to EPC with no interconnection between the two (as depicted in FIG. 6c with Option 1 and Option 2 respectively). On the other hand, the first supported version of NR is the so-called EN-DC (EUTRAN-NR Dual Connectivity), illustrated by Option 3. In such a deployment, dual connectivity between NR and LTE is applied with LTE as the master node (MN) and NR as the secondary node (SN). The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but a UE cannot camp on these NR cells or even be handed over to it.

As the deployment or migration for these options may differ from different operators, it is possible to have deployments with multiple options in parallel in the same network. In combination with dual connectivity solutions between LTE and NR it is also possible to support CA (Carrier Aggregation) in each cell group (i.e. MCG and SCG) and dual connectivity between nodes on same RAT (e.g. NR-NR DC). For the NR cells, a consequence of these different deployments is the co-existence of NR cells supporting SA only, NSA only or both SA/NSA.

There are also other architecture alternatives for dual connectivity and the general term multi-RAT dual connectivity (MR-DC) is used to describe them. This is illustrated in FIG. 6d.

FIG. 6d,a is the EN-DC option discussed above and shown here for comparison purposes. Unlike EN-DC, where the NR is operating in a non-stand alone (NSA) mode and have no direct interface with the CN, in the NR-E-UTRA Dual Connectivity (NE-DC) shown in FIG. 6d,b, NR has a direct interface with the 5GC and acts as the MN while LTE is the SN. In FIG. 6d,c, an architecture option referred to as Next Generation EN-DC (NGEN-DC), LTE is the MN and NR is the SN (just like in EN-DC). However, in this case, the LTE node is connected to 5GC instead of EPC.

Another architecture option (not shown in the above figures) is NR-NR DC, where both the MN and SN are NR nodes. The architecture details of this option are still being discussed in 3GPP, and the control plane, which is the most relevant for our discussion here, could end up being designed in the LTE DC fashion (i.e. UE has only one RRC terminated at the MN), or like in EN-DC (i.e. UE has two RRC terminations, one at the MN and another at the SN).

DC Operations

The general operations related to MR-DC are captured in TS 37.340 v.15.4.0 and the ones related to MR-DC with 5GC this are reproduced in this section (while for EN-DC procedures slightly differ and can be found in clause 10 from TS 37.340 v.15.4.0).

Secondary Node Addition,

The Secondary Node (SN) Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 6e shows the SN Addition procedure.

1. The MN decides to request the target SN to allocate radio resources for one or more specific PDU Sessions/QoS Flows, indicating QoS Flows characteristics (QoS Flow Level QoS parameters, PDU session level TNL address information, and PDU session level Network Slice info). In addition, for bearers requiring SCG radio resources, MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN always provides all the needed security information to the SN (even if no SN terminated bearers are setup) to enable SRB3 to be setup based on SN decision. For bearer options that require Xn-U resources between the MN and the SN, MN needs to provide Xn-U TNL address information, Xn-U DL TNL address information for SN terminated bearers and Xn-U UL TNL address information for MN terminated bearers. The SN may reject the request.

NOTE 1: For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in step 1 by the QoS Flow parameters signalled to the SN, which may differ from QoS Flow parameters received over NG.

NOTE 2: For a specific QoS flow, the MN may request the direct establishment of SCG and/or split bearers, i.e. without first having to establish MCG bearers. It is also allowed that all QoS flows can be mapped to SN terminated bearers, i.e. there is no QoS flow mapped to an MN terminated bearer.

2. If the RRM entity in the SN is able to admit the resource request, it allocates respective radio resources and, dependent on the bearer type options, respective transport network resources. For bearers requiring SCG radio resources the SN triggers UE Random Access so that synchronisation of the SN radio resource configuration can be performed. The SN decides for the PScell and other SCG Scells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN terminated bearers, Xn-U DL TNL address information for MN terminated bearers. For SN terminated bearers, the SN provides the NG-U DL TNL address information for the respective PDU Session and security algorithm. If SCG radio resources have been requested, the SCG radio resource configuration is provided.

NOTE 3: In case of MN terminated bearers, transmission of user plane data may take place after step 2.

NOTE 4: In case of SN terminated bearers, data forwarding and the SN Status Transfer may take place after step 2.

NOTE 5: For MN terminated NR SCG bearers for which PDCP duplication with CA is configured the MN allocates 2 separate Xn-U bearers.

For SN terminated NR MCG bearers for which PDCP duplication with CA is configured the SN allocates 2 separate Xn-U bearers.

3. The MN sends the MN RRC reconfiguration message to the UE including the SN RRC configuration message, without modifying it.

4. The UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure.

5. The MN informs the SN that the UE has completed the reconfiguration procedure successfully via SN Reconfiguration Complete message, including the encoded SN RRC response message, if received from the UE.

6. If configured with bearers requiring SCG radio resources, the UE performs synchronisation towards the PSCell configured by the SN. The order the UE sends the MN RRC reconfiguration complete message and performs the Random Access procedure towards the SCG is not defined. The successful RA procedure towards the SCG is not required for a successful completion of the RRC Connection Reconfiguration procedure.

7. In case of SN terminated bearers using RLC AM, the MN sends SN Status Transfer.

8. In case of SN terminated bearers using RLC AM, and dependent on the bearer characteristics of the respective QoS Flows, the MN may take actions to minimise service interruption due to activation of MR-DC (Data forwarding).

9-12. For SN terminated bearers, the update of the UP path towards the 5GC is performed via PDU Session Path Update procedure.

Secondary Node Release (MN Initiated)

The SN Release procedure may be initiated either by the MN or by the SN and is used to initiate the release of the UE context and relevant resources at the SN. The recipient node of this request can reject it, e.g., if a SN change procedure is triggered by the SN.

MN initiated SN Release FIG. 6f.

FIG. 6f shows an example signalling flow for the MN initiated SN Release procedure.

1. The MN initiates the procedure by sending the SN Release Request message. If data forwarding is requested, the MN provides data forwarding addresses to the SN.

2. The SN confirms SN Release by sending the SN Release Request Acknowledge message. If appropriate, the SN may reject SN Release, e.g., if the SN change procedure is triggered by the SN.

3/4. If required, the MN indicates in the MN RRC reconfiguration message towards the UE that the UE shall release the entire SCG configuration. In case the UE is unable to comply with (part of) the configuration included in the MN RRC reconfiguration message, it performs the reconfiguration failure procedure.

NOTE 1: If data forwarding is applied, timely coordination between steps 1 and 2 may minimize gaps in service provision, this is however regarded to be an implementation matter.

5. If the released bearers use RLC AM, the SN sends the SN Status transfer.

6. Data forwarding from the SN to the MN takes place.

7. If applicable, the PDU Session path update procedure is initiated.

8. Upon reception of the UE Context Release message, the SN can release radio and C-plane related resource associated to the UE context. Any ongoing data forwarding may continue.

Secondary Node Change (MN/SN Initiated)

MN Initiated SN Change

The MN initiated SN change procedure is used to transfer a UE context from the source SN to a target SN and to change the SCG configuration in UE from one SN to another.

The Secondary Node Change procedure always involves signalling over MCG SRB towards the UE.

FIG. 6g shows an example signalling flow for the SN Change initiated by the MN:

1/2. The MN initiates the SN change by requesting the target SN to allocate resources for the UE by means of the SN Addition procedure. The MN may include measurement results related to the target SN. If data forwarding is needed, the target SN provides data forwarding addresses to the MN. The target SN includes the indication of the full or delta RRC configuration.

NOTE: The MN may send the SN Modification Request message (to the source SN) to request the current SCG configuration before step 1.

3. If the allocation of target SN resources was successful, the MN initiates the release of the source SN resources including a Cause indicating SCG mobility. The Source SN may reject the release. If data forwarding is needed the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE and, if applicable, to start data forwarding.

4/5. The MN triggers the UE to apply the new configuration. The MN indicates the new configuration to the UE in the MN RRC reconfiguration message including the target SN RRC configuration message. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

6. If the RRC connection reconfiguration procedure was successful, the MN informs the target SN via SN Reconfiguration Complete message with the encoded SN RRC response message for the target SN, if received from the UE.

7. If configured with bearers requiring SCG radio resources the UE synchronizes to the target SN.

8. For SN terminated bearers using RLC AM, the source SN sends the SN Status transfer, which the MN sends then to the target SN.

9. If applicable, data forwarding from the source SN takes place. It may be initiated as early as the source SN receives the SN Release Request message from the MN.

10-14. If one of the PDU session/QoS Flow was terminated at the source SN, path update procedure is triggered by the MN.

15. Upon reception of the UE Context Release message, the source SN can release radio and C-plane related resource associated to the UE context. Any ongoing data forwarding may continue SN Initiated SN Change The SN initiated SN change procedure is used to transfer a UE context from the source SN to a target SN and to change the SCG configuration in UE from one SN to another.

FIG. 6h shows an example signalling flow for the SN Change initiated by the SN:

1. The source SN initiates the SN change procedure by sending the SN Change Required message, which contains a candidate target node ID and may include the SCG configuration (to support delta configuration) and measurement results related to the target SN.

2/3. The MN requests the target SN to allocate resources for the UE by means of the SN Addition procedure, including the measurement results related to the target SN received from the source SN. If data forwarding is needed, the target SN provides data forwarding addresses to the MN. The target SN includes the indication of the full or delta RRC configuration.

4/5. The MN triggers the UE to apply the new configuration. The MN indicates the new configuration to the UE in the MN RRC reconfiguration message including the SN RRC configuration message generated by the target SN. The UE applies the new configuration and sends the MN RRC reconfiguration complete message, including the encoded SN RRC response message for the target SN, if needed. In case the UE is unable to comply with (part of) the configuration included in the MN RRC reconfiguration message, it performs the reconfiguration failure procedure.

6. If the allocation of target SN resources was successful, the MN confirms the change of the source SN. If data forwarding is needed the MN provides data forwarding addresses to the source SN. If direct data forwarding is used for SN terminated bearers, the MN provides data forwarding addresses as received from the target SN to source SN. Reception of the SN Change Confirm message triggers the source SN to stop providing user data to the UE and, if applicable, to start data forwarding.

7. If the RRC connection reconfiguration procedure was successful, the MN informs the target SN via SN Reconfiguration Complete message with the encoded SN RRC response message for the target SN, if received from the UE.

8. The UE synchronizes to the target SN.

9. For SN terminated bearers using RLC AM, the source SN sends the SN Status transfer, which the MN sends then to the target SN.

10. If applicable, data forwarding from the source SN takes place. It may be initiated as early as the source SN receives the SN Change Confirm message from the MN.

11-15. If one of the PDU session/QoS Flow was terminated at the source SN, path update procedure is triggered by the MN.

16. Upon reception of the UE Context Release message, the source SN can release radio and C-plane related resource associated to the UE context. Any ongoing data forwarding may continue.

DC Coordination

In order to not exceed UE capabilities, MN and SN coordinate among e.g. band combinations, measurements, and the maximum power for FR1 the UE can use in SCG. In RRC, the MN sends restrictions concerning SCG configuration to the SN in CG-ConfigInfo message. The SN responds with CG-Config message and may request for configurations outside the scope of the restricted configuration indicated by the MN. However, it is up to the MN to decide on how to resolve the dependency between MN and SN configurations. The MN then provides the resulting UE capabilities usable for SCG configuration to the SN.

SUMMARY

A solution for optimizing RACH parameters is logging at the UE of a RACH report that may be requested by the network, as described in the background. However, there could be scenario where the UE maintains multiple MAC entities. For example, in multi-radio connectivity (MR-DC) scenarios, the UE has more than one MAC entity (and more than one random access like processes) and becomes quite unclear how to handle information reported in RACH reports. Also, in some of these MR-DC scenarios, the multiple MAC entities may even be associated to different RATs where the RACH related information may differ (e.g. in NR there could be beam information in RACH reports). Below have we identified problems in existing solutions.

A first problem that has been identified is: RACH report was introduced in Rel-9 i.e. before Dual Connectivity (DC) or carrier aggregation (CA) have been standardized. Hence, the current text in 36.331 says that whatever RACH information is reported would be about the last successfully completed random access procedure, as shown below:

5.6.5.3 Reception of the UEInformationRequest Message

Upon receiving the UEInformationRequest message, the UE shall, only after successful security activation:

1> if rach-ReportReq is set to true, set the contents of the rach-Report in the UEInformationResponse message as follows:

2> set the numberOfPreamblesSent to indicate the number of preambles sent by MAC for the last successfully completed random access procedure;

2> if contention resolution was not successful as specified in TS 36.321 [6] for at least one of the transmitted preambles for the last successfully completed random access procedure:

3> set the contentionDetected to true;

2> else:

3> set the contentionDetected to false;

. . .

1> else:
2> submit the UEInformationResponse message to lower layers for transmission via SRB1;

Hence, if the UE is in LTE DC (introduced in Rel-12) and the network requests a RACH report, it is not clear whether that is associated to the MN's or the SN's since the UE may have two MAC entities (one MAC entity for the PCell, associated to an MeNB, and another MAC entity for the PSCell, associated to an SeNB), as shown in FIG. 6*a*:

RACH report becomes then problematic as some UE implementations may interpret that the "the last successfully completed random access procedure" is only related to the MN, since the feature was only standardized before Rel-12 (i.e. before DC was introduced) or, some UE implementations could interpret that "the last successfully completed random access procedure" is the one for any of its MAC entities the UE may have configured i.e. either the MN's MAC or the SN's MAC entity. Hence, existing solution for RACH report is ambiguous to indicate for which MAC entity the report is associated to, and consequently, which node at the network side (e.g. MN or SN) should take counter-actions to optimize RACH parameters.

To make things even worse, the existing solution for the RACH report does not contain any information regarding the cell the latest procedure is associated to, i.e., even in the case the UE has a single MAC entity, such as when the UE has configured a PCell and associated SCells (e.g. cells in the same cell group, like a Master Cell Group—MCG) and possibly a Secondary Cell Group (SCG) with associated SCell(s), it is not possible to identify to which cell the random access procedure in the RACH report is associated to. Notice that this may be relevant, since the RACH configuration for these different types of cells may be different, not only in LTE but also in NR.

Furthermore, a second problem has been identified with existing solutions. Currently, RACH report can only be transmitted over SRB1 (or more precisely, the UEInformationResponse message including the report and the UEInformationRequest message. However, as shown above in the 5G protocol architecture options for Dual Connectivity, such as EN-DC (or other MR-DC architecture options), there is some higher level of independency between the control entities in the MN and the SN (compared to the LTE Rel-12 DC protocol architecture). Hence, with current solution, only the MN could request a report to the UE, while the real entity interested in optimizing RACH parameters in EN-DC for the SCell addition or SCG addition is the SN. Also, the format of the existing report is not suitable for MR-DC, since in NR there will be specific information, for example, related to beam selection procedures.

In addition is a third problem identified. Current RACH report can only be requested/reported per RAT, in an independent manner, while in 5G there may be use cases related to Multi-Radio DC (MR-DC) where there are more than one MAC entity and each of these may be related to a different RAT.

An object of embodiments herein is to provide a mechanism for improving, in an efficient manner, performance of a random access procedure in the wireless communication network.

According to an aspect the object is achieved by providing a method performed by a UE for handling access to one or more radio network nodes. The UE initiates a RA procedure associated to a cell and according to a first configuration for a second RAT while the UE is already connected to at least one cell of a first RAT. The UE logs random access related information of the random access procedure while the UE already has a RACH report stored for the first RAT. The UE further transmits a RACH report based on the logged random access information or the stored RACH report, upon request from a radio network node when the UE has more than one MAC entity. Furthermore, the UE signals to the radio network node, an indication that highlights for what RAT or radio network node the transmitted RACH report was constructed.

According to another aspect the object is achieved by providing a method performed by a radio network node e.g. a master node or a secondary node, for handling access of a UE. The radio network node transmits to the UE, a request to transmit a RACH report when the UE has more than one MAC entity; and receives from the UE, a RACH report when the UE has more than one MAC entity, and an indication that highlights for what RAT or radio network node the RACH report was constructed.

It is furthermore provided herein a computer program product comprising instructions, which, when executed on at least one processor, cause the at least one processor to carry out any of the methods above, as performed by the UE or the radio network node, respectively. It is additionally provided herein a computer-readable storage medium, having stored thereon a computer program product comprising instructions which, when executed on at least one processor, cause the at least one processor to carry out the method according to any of the methods above, as performed by the UE or the radio network node, respectively.

According to yet another aspect the object is achieved by providing a UE for handling access to one or more radio network nodes. The UE is configured to initiate a RA procedure associated to a cell and according to a first configuration for a second RAT, while the UE is already connected to at least one cell of a first RAT. The UE is further configured to log random access related information of the RA procedure while the UE already has a RACH report stored for the first RAT. The UE is further configured to, upon request from a radio network node when the UE has more than one MAC entity, transmit a RACH report based on the logged random access information or the stored RACH report, and signal to the radio network node, an indication that highlights for what RAT or radio network node the RACH report was constructed.

According to still another aspect the object is achieved by providing a radio network node for handling access of a UE, wherein the radio network node is configured to transmit to the UE, a request to transmit a RACH report when the UE has more than one MAC entity. The radio network node is further configured to receive a RACH report from the UE when the UE has more than one MAC entity, and an indication that highlights for what RAT or radio network node the RACH report was constructed.

Embodiments herein may provide a method executed by a UE for enabling RACH parameters optimization. The method may comprise:

Initiating a Random Access procedure associated to a cell and according to a specific configuration, while the UE is already connected to at least one cell;

Logging (and storing) random access related information while the UE already has a RACH report stored;

Receiving a request from a network to transmit at least a RACH report when the UE has multiple MAC entities;

Transmitting a RACH report upon request from the network when the UE has multiple MAC entities.

A main use case where the UE maintains multiple MAC entities is when the UE is in any kind of Dual Connectivity, such as Multi-Radio Dual Connectivity (MR-DC).

Embodiments herein enable an efficient handling of RACH reports of different cells and/or RATs, thereby leading to an improved performance of the wireless communication network.

BRIEF DESCRIPTION OF THE DRAWINGS

Embodiments will now be described in more detail in relation to the enclosed drawings, in which:

FIGS. 14 to 17 are flowcharts illustrating methods implemented in a communication system including a host computer, a base station and a user equipment.

DETAILED DESCRIPTION

Figure 7A:
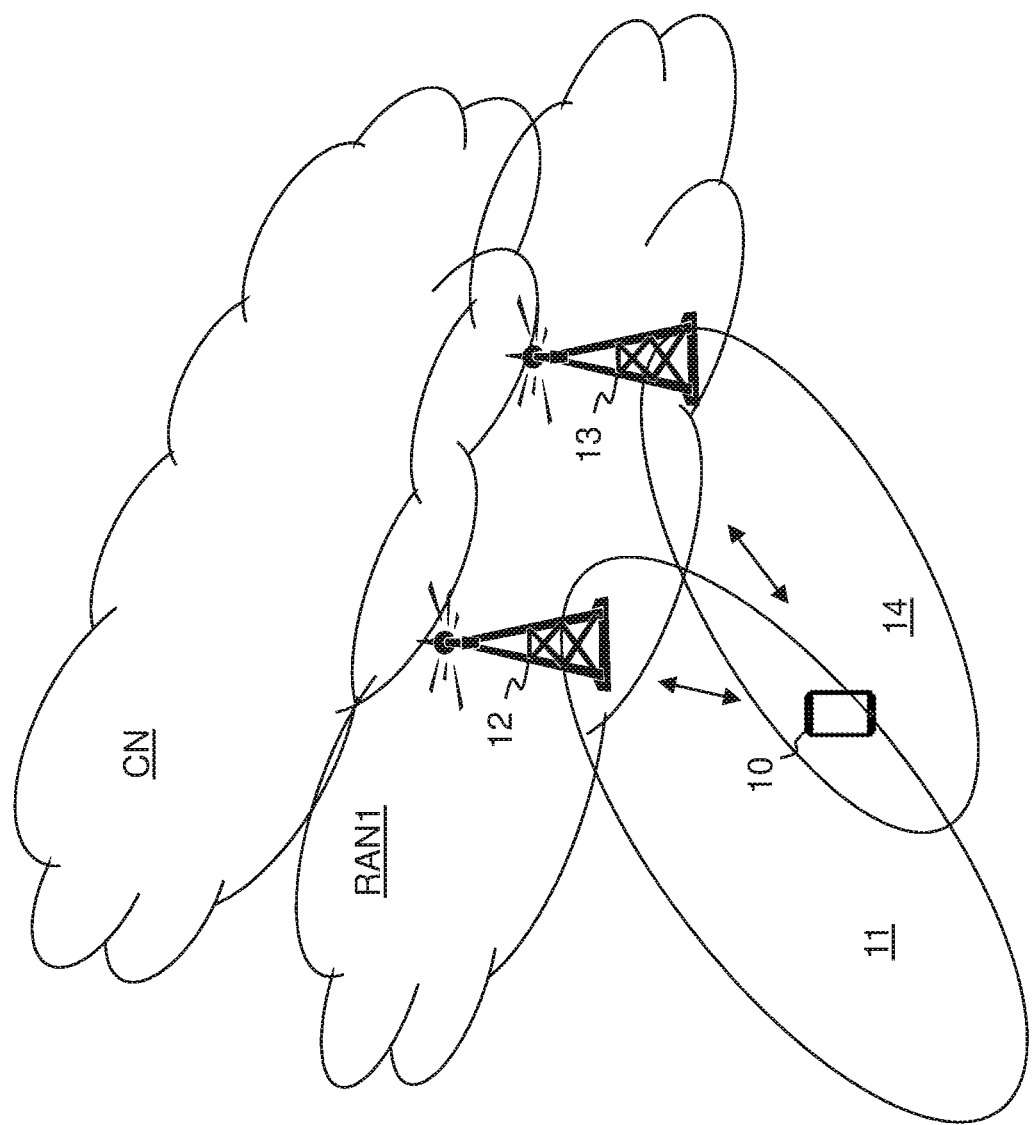
FIG. 7a shows a schematic overview depicting a wireless communication network according to embodiments herein.

Embodiments herein relate to wireless communication networks in general. FIG. 7a is a schematic overview depicting a wireless communication network 1. The wireless communication network 1 comprises one or more RANs e.g. a first RAN (RAN1), connected to one or more CNs. The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a UE 10 such as a mobile station, a non-access point (non-AP) station (STA), a STA, a UE and/or a wireless terminal, are connected via the one or more RANs, to the one or more CNs. It should be understood by those skilled in the art that "UE" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a first radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the first radio network node 12 depending e.g. on the radio access technology and terminology used and may be denoted as a primary radio network node. The first radio network node 12 may alternatively be denoted as a serving radio network node or a MN providing a primary cell for the UE 10.

The wireless communication network 1 comprises a second radio network node 13. The second radio network node 13 is exemplified herein as a second RAN node providing radio coverage over a geographical area, a second service area 14, of a second RAT, such as NR, LTE, UMTS, Wi-Fi or similar. The second radio network node 13 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the second radio network node 13 depending e.g. on the radio access technology and terminology used and may be denoted as a secondary radio network node. The radio network node 12 may alternatively be denoted as a serving radio network node providing a secondary cell, e.g. primary secondary cell or a SN, for the UE 10.

It should be noted that a service area may be denoted as cell, beam, beam group or similar to define an area of radio coverage. The first RAT may the same or different RAT as the second RAT.

Embodiments herein comprise a method for handling access to one or more radio network nodes executed by the UE 10, the method comprising: —initiating a Random Access procedure associated to a cell and according to a first configuration for the second RAT, while the UE is already connected to at least one cell of the first RAT; —logging (storing) random access related information while the UE already has a RACH report stored for the first RAT; —transmitting a RACH report upon request from the network, e.g. receiving a request from a network to transmit at least a RACH report, when the UE is in Dual Connectivity and/or has multiple MAC entities; —signalling to the radio network node, an indication that highlights for what RAT or radio network node the RACH report was constructed. The RACH report may e.g. indicate which MAC entity it relates to. In one solution the UE 10 provides a RACH report to one of MN or SN and either as part of the RACH report or as different information, the signalling from the UE 10 highlights for what MAC entity RACH access the report was constructed. The UE may signal the indication to the network once the UE is connected to an appropriate RAT.

Embodiments herein disclose a solution for one or more of the above mentioned problems. E.g. a solution for optimizing RACH parameters is the logging, at the UE 10, of a RACH report that may be requested by the network, as described in the background. However, in multi-radio connectivity scenarios e.g. in MR-DC, where the UE 10 has more than one MAC entity e.g. one for the first radio network node and a second for the second radio network node, and more than one random access like processes, it becomes quite unclear how to handle information reported in RACH reports. Also, in some of these MR-DC scenarios, the multiple MAC entities may even be associated to different RATs where the RACH related information may differ, e.g. in the second RAT such as NR there could be beam information in RACH reports but not in a first RAT such as LTE. Below problems are identified in the existing solutions as follows.

A first problem addressed by embodiments herein is that RACH report was introduced in Rel-9 i.e. before Dual Connectivity (DC) or carrier aggregation (CA) have been standardized. Hence, the current text in standard TS 36.331 v12.0.0. says that whatever RACH information is reported would be about the last successfully completed random access procedure, which is quite ambiguous. So the first advantage of the method proposed herein is to avoid the ambiguity by associating one or multiple RACH reports to an exact instance at the network side that needs to be optimized.

Hence, if the UE is in LTE DC, introduced in release (Rel)-12, and the network requests a RACH report, it would be very clear according to the proposed method if that RACH report is associated to the MN's or the SN's.

Another advantage related to another problem in prior art, where the RACH report does not contain any information regarding the cell the latest procedure is associated to, i.e., even in the case the UE has a single MAC entity, such as when the UE has configured a PCell and associated SCells, e.g. cells in the same cell group, like a Master Cell Group (MCG), and possibly a Secondary Cell Group (SCG) with associated SCell(s), it is not possible to identify to which cell the random access procedure in the RACH report is associated to. Notice that this may be relevant, since the RACH configuration for these different types of cells may be different, not only in LTE but also in NR. According to the method, each possibly transmitted RACH report may contain an identification that enables the network to knows what exact entity/procedure/node needs to be optimized, avoiding a misuse of reported RACH reports.

Another advantage is the flexibility to transmit a RACH report, especially in MR-DC scenarios. Currently in state of the art, RACH report can only be transmitted over SRB1, or more precisely, the UEInformationResponse message including the RACH report and the UEInformationRequest message. However, as shown above in the 5G protocol architecture options for Dual Connectivity, such as EN-DC (or other MR-DC architecture options), there is some higher level of independency between the control entities in the MN and the SN, compared to the LTE Rel-12 DC protocol architecture. Hence, with current solution, only the MN could request a report to the UE, while the real entity interested in optimizing RACH parameters in EN-DC for the SCell addition or SCG addition is the SN. Also, the format of the existing report is not suitable for MR-DC, since in NR there will be specific information, for example, related to beam selection procedures. The proposed method herein allows the transmission of RACH reports via SRB1, SRB2 or SRB3.

A use case is where the UE 10 maintains multiple MAC entities, more than one MAC entity is when the UE 10 is in e.g. Dual Connectivity, such as Multi-Radio Dual Connectivity (MR-DC) or carrier aggregation (CA).

Embodiments herein may thus comprise a method for handling access to one or more radio network nodes, e.g. RACH parameters optimization, executed by the first radio network node 12 (where a RACH report is received) and/or the second radio network node 13 (where RACH report is needed for RACH parameter optimization). The UE 10 may provide a RACH report to one of a MN, i.e. the first radio network node 12, or a SN, i.e. the second radio network node 13. Thus a radio network node receives the RACH report, and further receives the signalling from the UE 10 that highlights for what e.g. MAC entity RACH access the report was constructed e.g. once the UE is connected to an appropriate RAN. This may then be used for RACH parameters optimization.

Figure 7B:
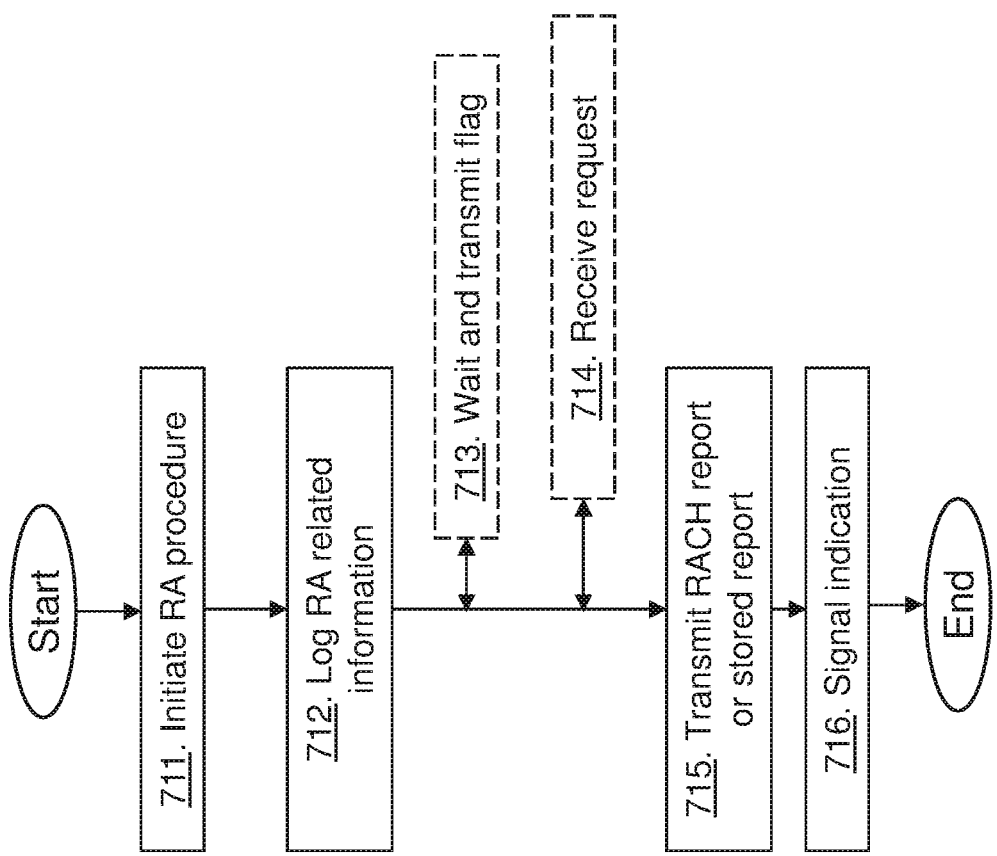
FIG. 7b is a flowchart depicting a method performed by a user equipment according to embodiments herein.

The method actions performed by the UE 10 for handling access to one or more radio network nodes, according to embodiments will now be described with reference to a flowchart depicted in FIG. 7b. The actions do not have to be taken in the order stated below, but may be taken in any suitable order. Actions performed in some embodiments are marked with dashed boxes.

Action 711. The UE 10 initiates a RA procedure associated to a cell, e.g. second cell 14, and according to the first configuration for the second RAT, while the UE is already connected to at least one cell of the first RAT, e.g. first cell 11.

Action 712. The UE 10 further logs random access related information of the RA procedure while the UE already has a RACH report stored for the first RAT.

Action 713. It should be noted that when the UE 10 is connected to a RAT different from the first RAT and for which the RACH report is stored, the UE 10 may not upload the RACH report for the different RAT, but will wait until the UE 10 is connected to the first RAT, and then transmit a flag indicating presence of the RACH report for the different RAT and then receive a request for the RACH report for the different RAT.

Action 714. The UE 10 may receive the request from the radio network node comprising an indication indicating which RACH report to transmit.

Action 715. The UE 10 transmits, upon request from the radio network node when the UE has more than one MAC entity, a RACH report, e.g. a new RACH report, based on the logged random access information or the stored report. The transmitted RACH report may be related to a latest successfully executed RA procedure in a cell. receiving t Action 716. Furthermore, the UE 10 signals to the radio network node, an indication that highlights for what RAT or radio network node the RACH report was constructed. In the prior art, it is not clear whether the UE 10 would override that RACH report information when a new random access procedure is executed. According to the method, it is herein proposed to make it unambiguous what would be the latest RACH report information the UE 10 has stored or to keep multiple RACH report information, per cell, cell group, per MAC entity, per RAT to avoid misinterpretations on the network side where the report is received. Hence, upon transmitting a RACH report and by signalling for what RAT or radio network node it is clear to the network what this report is associated to i.e. which cell, which cell group, which node, etc., so the correct parameters in the correct node related to the corrected cell are tuned.

Figure 7C:
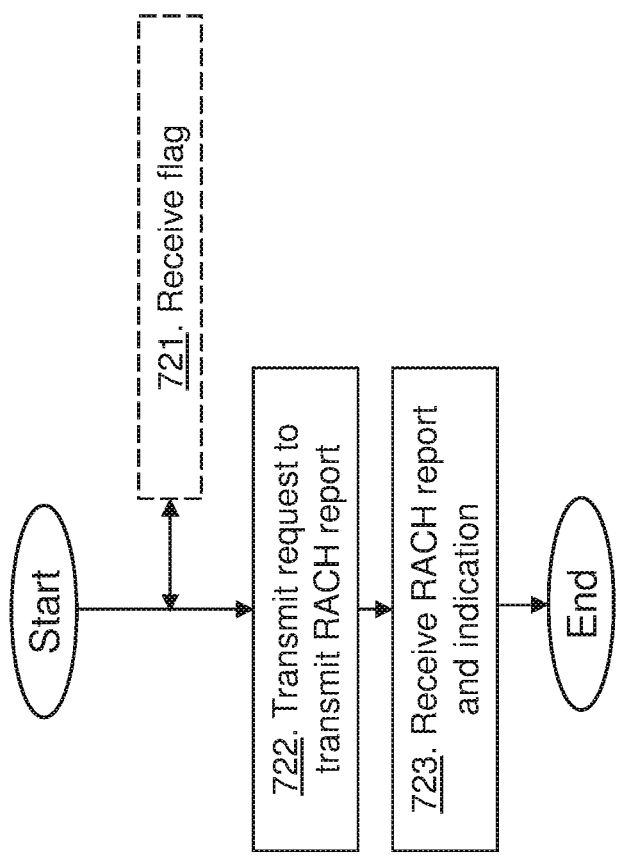
FIG. 7c is a flowchart depicting a method performed by a radio network node according to embodiments herein.

The method actions performed by the radio network node such as the first radio network node 12 or the second radio network node 13 for handling access of the UE according to embodiments will now be described with reference to a flowchart depicted in FIG. 7c. The radio network node may be denoted as RAN node herein. The actions do not have to be taken in the order stated below, but may be taken in any suitable order. Actions performed in some embodiments are marked with dashed boxes.

Action 721. The radio network node may receive a flag indicating presence of a RACH report stored at the UE 10.

Action 722. The radio network node transmits, to the UE 10, the request to transmit a RACH report when the UE has more than one MAC entity. The request to the UE may comprise an indication indicating which RACH report to transmit.

Action 723. The radio network node receives a RACH report from the UE when the UE has more than one MAC entity, and the indication that highlights for what RAT or radio network node the RACH report was constructed.

Figure 8:
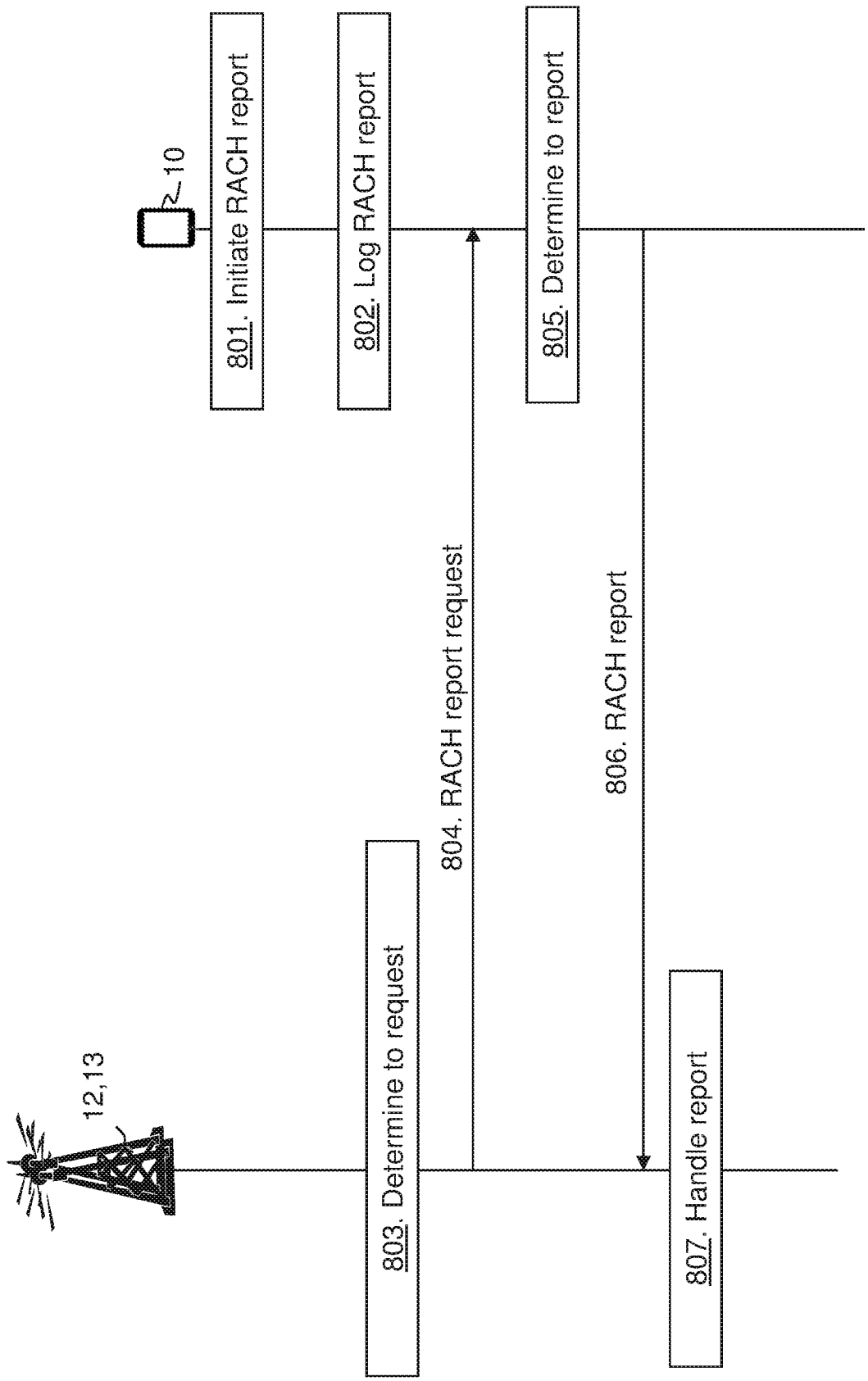
FIG. 8 shows a schematic combined signalling scheme and flowchart depicting some embodiments herein.

FIG. 8 is a schematic combined signalling scheme and flowchart depicting embodiments herein.

Action 801. The UE 10 initiates the RA procedure. Embodiments disclose a method for e.g. RACH parameters optimization executed by the UE, the UE 10 may initiate the RA procedure associated to a cell, e.g. second cell, of the radio network node and according to a specific, a first, configuration, while the UE 10 is already connected to at least one cell. The term while the UE 10 is already connected to at least one cell considers that the UE is in Connected state, possibly having at least an associated PCell when it initiate random access. That may occur in many use cases towards the same PCell, such as PDCCH order, beam recovery attempt, scheduling requests, etc., towards a different cell of the same group, e.g. an SCell of the MCG, due to PDCCH order, or towards a different cell to become a PSCell during SCG addition.

The term 'at least' in that sense, means that the UE may be connected to two cells (a PCell and a PSCell) or more cells when random access is initiated e.g. to change a PSCell, to change the PCell, towards an SCell of MCG, towards an SCell of the SCG, etc.

The term cell may refer to a cell, defined by a PCI and cell global identifier (CGI), or a cell, e.g. an MCG with a PCell and associated SCell(s), or an SCG with associated SCell(s). Defining that based on cell group would be equivalent to define that per MAC entity since each cell group may have its own MAC entity. The cell the UE 10 initiates random access to may be any of the same cells the UE is already connected to or a different cell, e.g. when the UE is adding a cell, like in SCG addition, or mobility use cases, etc.

The term according to a specific, a first, configuration refers to the fact that random access may be used in different procedures, possibly with different configurations. For example, there is a RACH configuration to be used by Idle/Inactive state UEs when they need to transition to Connected state, where that configuration is provided in SIB. Meanwhile, there is another RACH to be used by Connected state UEs for beam recovery, when beam failure is detected, and so on.

Examples are shown in FIG. 9a-9d to illustrate the possible use cases.

Figures 9A, 9B:
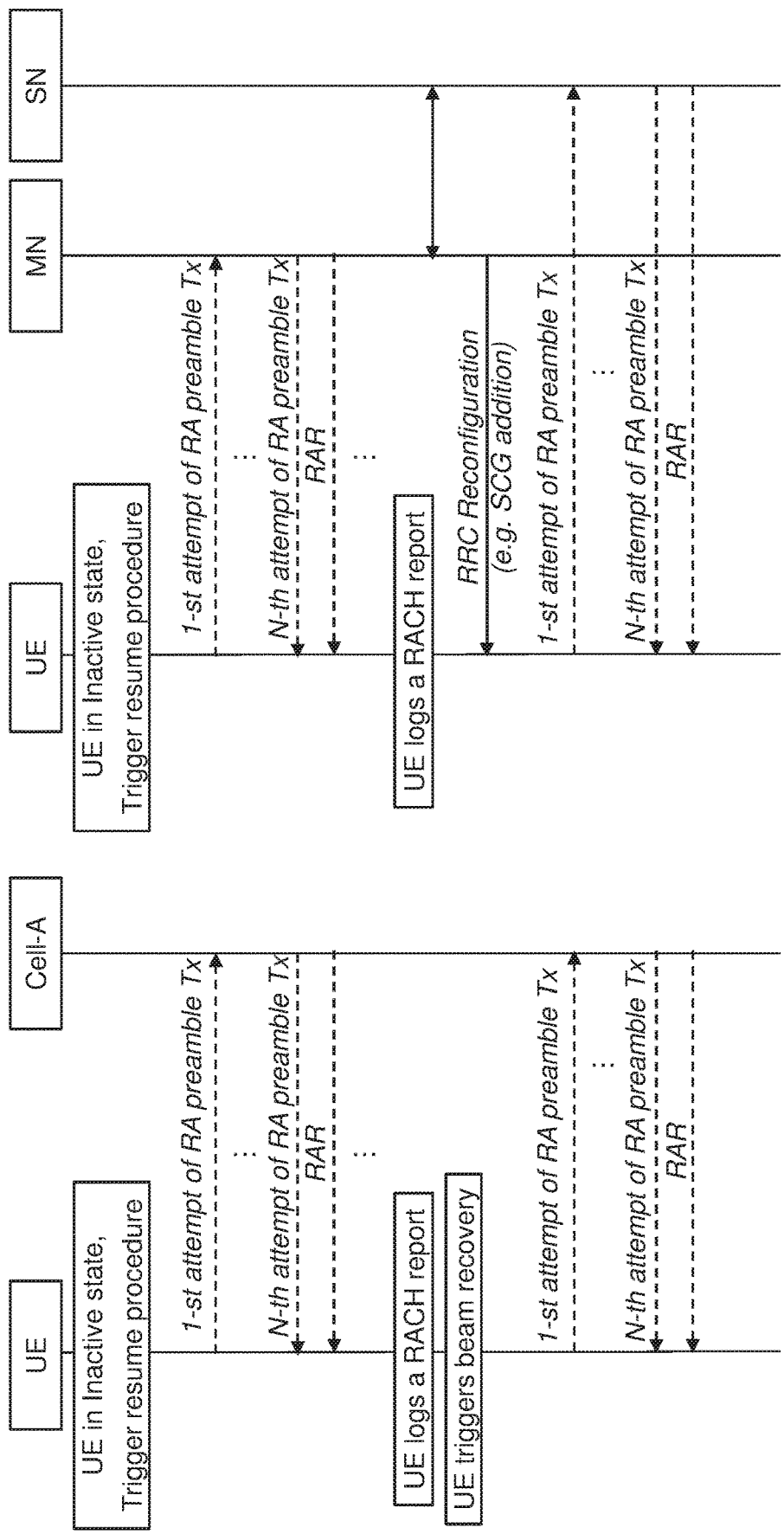
FIGS. 9a-9l show signalling scheme according to embodiments herein.

FIG. 9a shows a use case when the UE is in inactive state and triggers resume procedure. The UE performs a number of RA tries and receives a RAR from Cell-A. The UE logs a RACH report and then triggers a beam recovery wherein the UE further performs a number of RA tries. FIG. 9b shows a use case when the UE is in inactive state and triggers resume procedure. The UE performs a number of RA tries and receives a RAR from the MN. The MN and SN exchange information and the UE logs a RACH report. The MN transmits an RRC reconfiguration e.g. SCG addition to the UE. The UE then performs a number of RA tries to the SN and receives a RAR from the SN.

The UE 10 may establish parallel MAC entities upon that step, such as in at least one of the cases:

Each MAC entity is associated to a cell group, such as:
  MAC entity for an MCG;
  MAC entity for an SCG;
There could be different bearers associated such as (According to the bearer harmonization concept in NR):
  MN terminated MCG bearer;
  MN terminated SCG bearer;
  SN terminated MCG bearer;
  SN terminated SCG bearer;
(Example of a single RAT) If the UE 10 is connected to one PCell of a first RAT, e.g. LTE or NR, and has a MAC entity for the PCell, e.g. MCG MAC entity, upon being configured to add another cell (or any other procedure requiring the UE to perform random access with another cell), like a PSCell for SCG addition of the same RAT, e.g. LTE, the UE initiates random access and starts a new MAC entity for the new cell of that same RAT, e.g. LTE or NR;
(Example of multi-RAT) If the UE is connected to one PCell of a first RAT, e.g. LTE or NR, and has a MAC entity for that first RAT PCell, upon being configured to add another cell, like a PScell for SCG addition of another RAT, e.g. NR or LTE, the UE 10 initiates random access and starts a new MAC entity for the new cell of that new RAT (e.g. NR, LTE);

The point of this action is that the UE 10 initiates a random access procedure, associated to a cell, while it may have already stored RACH report information for the latest random access procedure it has performed.

Action 802. The UE logs (stores) random access related information while the UE already has a RACH report stored. The terms logging (or storing) refers to the UE 10 storing in its memory information regarding multiple random access procedure(s) executed, without necessarily overriding an existing RACH report that may be stored (associated to a previously executed random access procedure).

Embodiments comprise the possibility that the UE 10 may store/log multiple RACH reports, e.g. in multiple UE variables or in a list of UE variable for RACH report. In this case, the solution comprises manners to distinguish these multiple RACH reports once they are provided to the network, so that the network knows to which procedure the reports refer to so the network is able to optimize the associated parameters i.e. for the correct node, correct cell, correct use case, etc.

Based on multiple RACH reports, there may be one RACH report per granular entity, where a granular entity may be a cell, a cell group, MAC entity, a RAT, a configuration/procedure, etc. For example:

There may be multiple RACH reports, but one per cell. In that case, the UE may store/per cell in the RACH report information related to a latest successfully executed RA procedure in that cell. Hence, if the UE 10 has stored a RACH report for cell X, and another RA procedure is initiated for cell X, new RA information for that new procedure overrides that RACH report with new information. For example, an Idle/Inactive UE may have transition to Connected in cell X, after RA, logging a RACH report (e.g. in a UE variable). Then, while in Connected, at t0 the network reconfigures the UE to add cell Y so the UE triggers RA in the cell Y, logging another RACH report (now for cell Y). Later on, while the UE is in Dual Connectivity with cell X and cell Y, another RA towards cell X is initiated e.g. due to beam recovery. According to some embodiments herein, a new RA procedure in cell X overrides or overwrites the RACH report for cell X with new information, for the latest RA procedure.

There may be multiple RACH reports, but one per cell group, such as Master Cell Group (MCG) and Secondary Cell Group (SCG). In that case, the UE 10 stores e.g. per cell in the RACH report information related to the latest successfully executed RA procedure in that cell group, for example, one for MCG and another for SCG. For example, if the UE 10 has stored a RACH report associated to cell X of an MCG, and another RA procedure is initiated for cell Y, but within the same cell group, e.g. the MCG, new RA information for that new procedure may override or overwrite that RACH report with new information, e.g. even if these are associated to different cells, like a PCell and an SCell in the MCG. In another example, if the UE 10 has stored a RACH report associated to cell X of an MCG, and another RA procedure is initiated for cell Y, to be added as a PSCell new RA information for that new procedure will lead to the logging of a new RACH report associated now to an SCG.

There may be multiple RACH reports, but one per MAC entity, such as MCG and SCG. In that case, the UE may store e.g. per cell in the RACH report information related to the latest successfully executed RA procedure in that MAC entity, for example, one for MCG MAC entity and another for SCG MAC entity.

There may be multiple RACH reports, but one per RAT such as LTE and NR, for the case of Multi-Radio Dual Connectivity (MR-DC) or inter-RAT. In that case, the UE 10 store e.g. per cell in the RACH report information related to the latest successfully executed RA procedure per RAT, for example, one for LTE and another for NR. For example, if the UE has stored a RACH report associated to cell X in LTE, and another RA procedure is initiated for an LTE cell Y, new RA information for that new procedure overrides that RACH report with new information. In another example, if the UE has stored a RACH report associated to cell X of LTE, and another RA procedure is initiated for an NR cell Y, to be added as a PSCell, new RA information for that new procedure will lead to the logging of a new RACH report associated now to NR.

There may be multiple RACH reports, but one per configuration/procedure, such as beam recovery, CBRA for transition from Inactive/Idle to Connected. In that case, the UE stores e.g. per cell in the RACH report information related to the latest successfully executed RA procedure for a given procedure (or based on a given configuration) for example, one for idle/inactive to connected transitions, and another for beam recovery. For example, if the UE 10 has stored a RACH report associated to a RA when it transitions from idle to Connected in cell X, and after some time the UE is release/suspended and tries to connect again in another cell Y, new RA information for that new procedure overrides that RACH report with new information. In another example, if the UE has stored a RACH report associated to cell X (for inactive to connected transition), and another RA procedure is initiated for the same cell X but now for beam recovery, new RA information for that new procedure will lead to the logging of a new RACH report associated now to beam recovery.

Figure 9C:
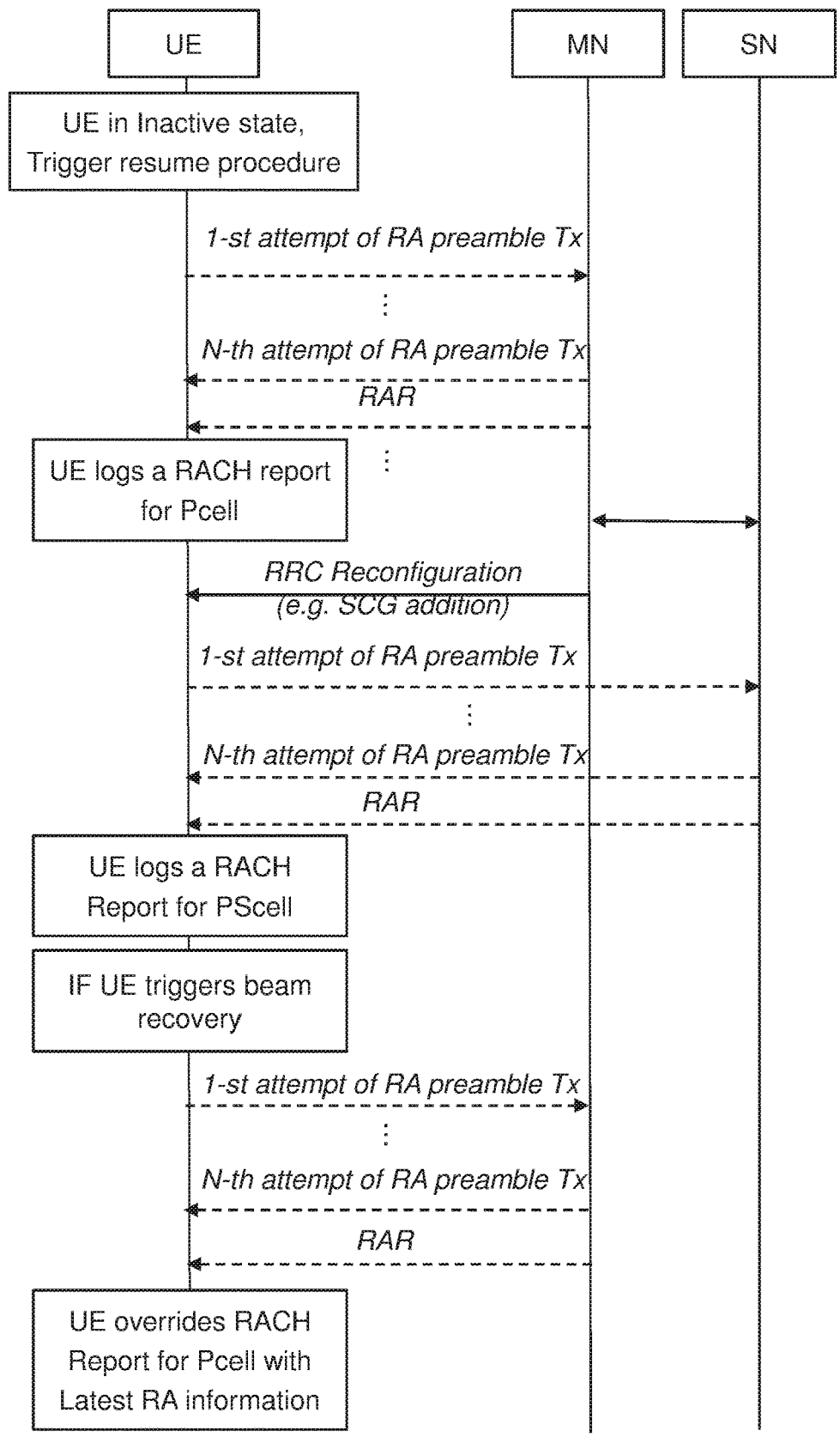

This concept is illustrated in the FIG. 9c, for the example where the granular entity is a cell group. So, the UE is connected to a PCell and has an associated RACH report and is configured to add an PSCell, logging then a second RACH report. Later, if that UE trigger RA again towards the PCell, that overrides the previous RACH report, as shown in FIG. 9c. FIG. 9c shows a use case when the UE is in inactive state and triggers resume procedure. The UE performs a number of RA tries and receives a RAR from the MN. The MN and SN exchange information and the UE logs a RACH report. The MN transmits an RRC reconfiguration e.g. SCG addition to the UE. The UE then performs a number of RA tries to the SN and receives a RAR from the SN. The UE logs another RACH report for PScell. If the UE triggers a beam recovery the UE then performs a number of RA tries to the MN and receives a RAR from the MN. The UE may then override the RACH report for the Pcell with latest RA information.

In some embodiments, based on multiple RACH reports, there may be multiple RACH reports even "per granular entity", where a granular entity may be a cell, a cell group, MAC entity, a RAT, a configuration/procedure, etc. For example:

There may be multiple RACH reports, even for the same cell. Embodiments may comprise means to distinguish different reports in another domain e.g. in time.

There may be multiple RACH reports, even for the same cell group. Embodiments may comprise means to distinguish different reports in another domain e.g. in time.

There may be multiple RACH reports, even for the same RAT. Embodiments may comprise means to distinguish different reports in another domain e.g. in time.

There may be multiple RACH reports, even for the same MAC entity. Embodiments may comprise means to distinguish different reports in another domain e.g. in time.

There may be multiple RACH reports, even for the same RACH configuration. Embodiments may comprise means to distinguish different reports in another domain e.g. in time.

In any of these cases, there may be a list per granular entity, where each element in the list of RACH report is distinguished by other means, such as time stamp or another identifier e.g. a cell identifier in the case of a list per cell group.

Figure 9D:
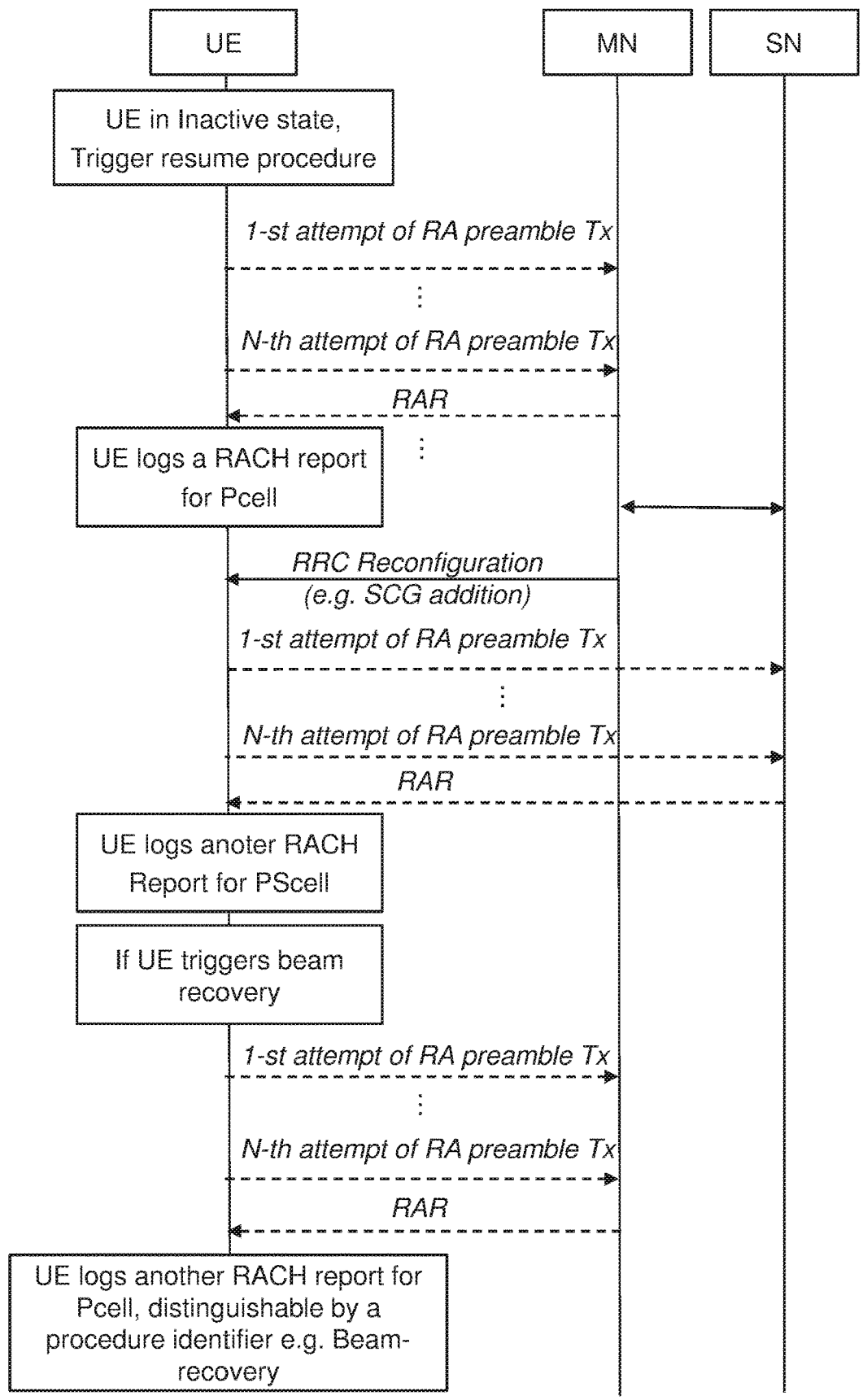
Figure 9F:
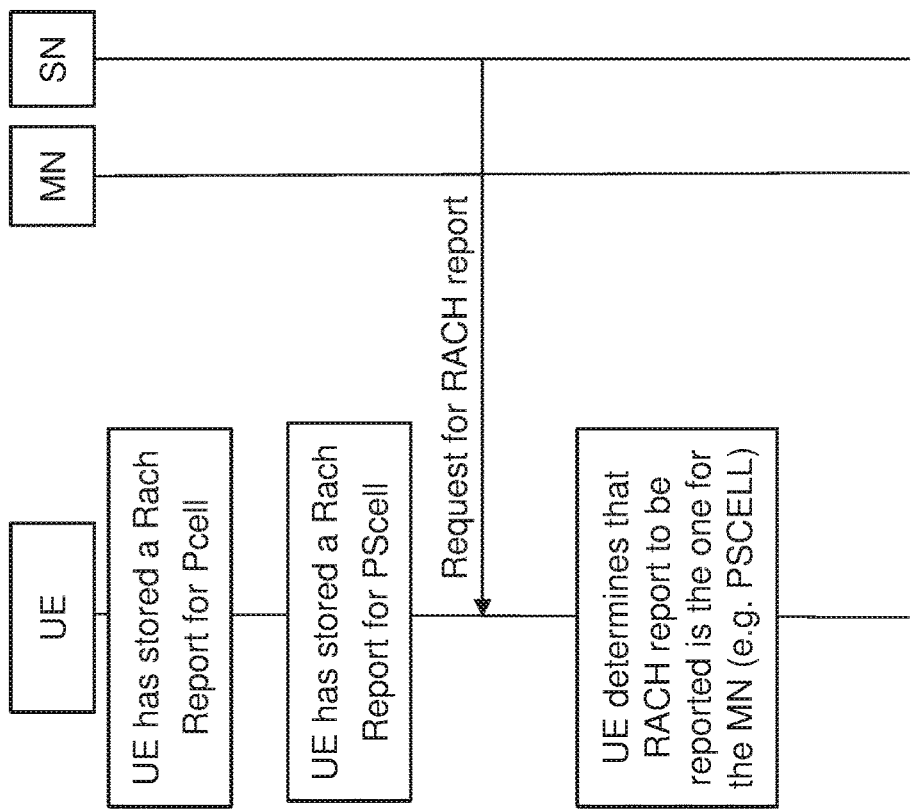
Figure 9E:
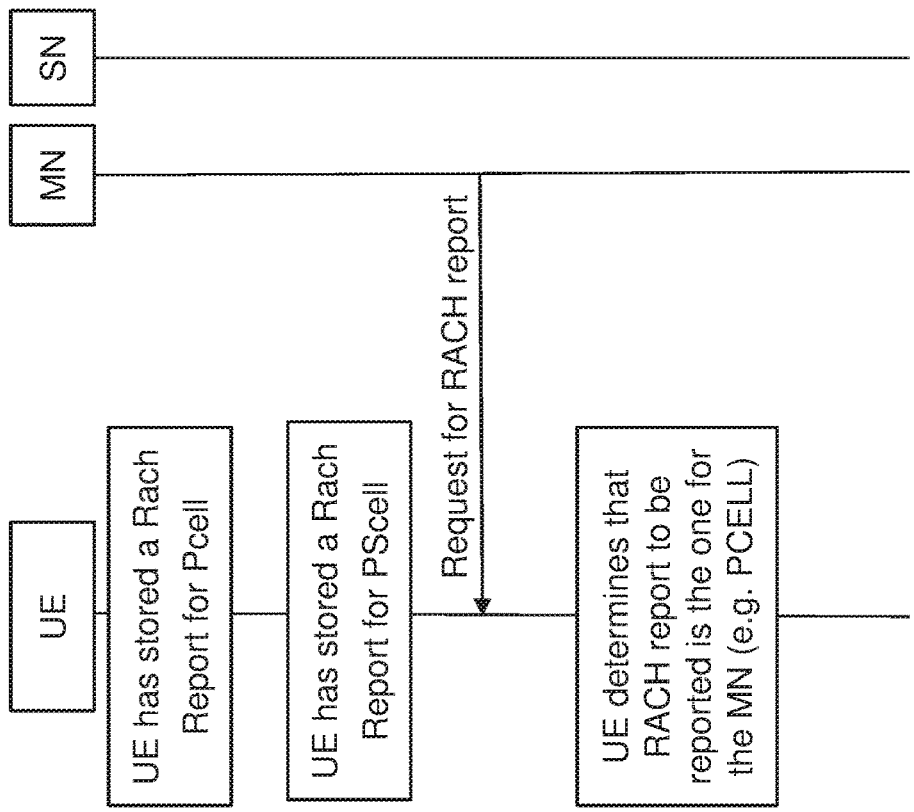

This concept is illustrated in FIG. 9d, for the example where the granular entity is a cell group. So, the UE is connected to a PCell and has an associated RACH report and is configured to add an PSCell, logging then a second RACH report. Later, if that UE 10 triggers a RA again towards the PCell, that does not override the previous RACH report, but rather adds another report associated to that cell group, the MCG in this example, as associated to the PCell. FIG. 9d shows a use case when the UE is in inactive state and triggers resume procedure. The UE performs a number of RA tries and receives a RAR from the MN. The MN and SN exchange information and the UE logs a RACH report. The MN transmits an RRC reconfiguration e.g. SCG addition to the UE. The UE then performs a number of RA tries to the SN and receives a RAR from the SN. The UE logs another RACH report for PScell. If the UE triggers a beam recovery the UE then performs a number of RA tries to the MN and receives a RAR from the MN. The UE may then log another RACH report for the Pcell, which is distinguishable by a procedure identifier e.g. beam recovery.

Embodiments comprise the possibility that the UE 10 may store and/or log identification information for a RACH report in the scenario, such as at least one of the following:
- Time stamp indicating when the procedure has been executed e.g. time when the procedure successfully ended. For example, the time when the UE 10 receives a MSG.4 (contention resolution) in the case of contention-based random access (CBRA) or when the UE 10 receives a RA response (contention resolution) in the case of contention-free (CFRA). For example, the time when the RA procedure starts, like when the UE 10 transmits a preamble.
- Cell information indicating to which cell a RACH report to be stored is associated i.e. in which cell RA has been performed, like a cell identifier. For example, the UE 10 may receive an radio resource control (RRC) Reconfiguration indicating that it needs to add an SCG i.e. requiring the UE to initiate RA with a new cell (to become a PSCell); hence, the identification may be a cell identifier like a PCI or a CGI. Embodiments may also comprise the inclusion of further network identifiers, such as tracking area code(s), Public land mobile network (PLMN) identifiers, etc.
- RAT information indicating to which RAT a RACH report to be stored is associated i.e. in which RAT RA has been performed, like a RAT identifier, e.g. NR, LTE, UTRA, or an implicit identifier, if the RACH reports have different formats for different RATs. For example, the UE may be connected to LTE and receive an RRC Reconfiguration indicating that it needs to add an SCG i.e. requiring the UE to initiate RA with a new NR cell (to become a PSCell).
- Configuration information indicating to which RACH configuration the RACH report to be stored is associated i.e. based on which configuration the UE has stored (e.g. obtained via dedicated signalling or broadcasted). That may enable the network to identify the exact procedure that has triggered that random access, which may be useful considering that different RACH configurations may exist for the different use cases where RA is triggered, such as beam recovery procedure, handovers, SCG addition, etc.
- Having identifiers for different reports also enable the network to avoid the network to pool one by one the RACH reports, and rather configure the UE 10 to log multiple procedures. In that sense, embodiments may also comprise the definition of a maximum number of RACH reports the UE keeps stored.

Embodiments comprise reasoning to log information per entity could be related to the fact that each of these entities, at the network side, could be executed by different nodes, e.g. different basebands/distributed unities, which would optimize their own RACH parameters, possibly independently. For example, in the case of initiation an MR-DC scheme, one MAC entity may be associated to a cell, while another could be associated to another cell (or cell groups).

In the case of multi-RAT, one cell (or cell group) may be of one RAT, e.g. LTE, and another cell (or cell group) could be of another RAT, e.g. NR. Hence, there may be different RACH report formats, since each RACH report is associated to a RAT with possibly different RACH parameters e.g. there may be information specifically related to NR such as the beam related information, etc.

Embodiments may comprise the UE 10 transmitting a RACH report availability indication, e.g. the flag, from UE to the network, indicating the availability of RACH report in e.g. MR-DC.

That may be used to indicate the availability of RACH report per granular entity, per e.g. cell, MAC entity, cell group, RAT, etc. For example, when the UE is 10 or was in MR-DC, in case the UE maintains multiple MAC entities, such as when the UE is in Dual Connectivity.

That may be used to indicate the availability of RACH report per cell where random access has been performed which may be a PCell, an SCell associated to an MCG, a PSCell, an SCell associated to an SCG.

The indication, e.g. a flag bit, may explicitly indicate for which granular entity the RACH report(s) is(are) available. That explicit indication may be one or more of the following:
- Flag indicating for what MAC entity the UE shall transmit RACH report. For example, the request for the report is sent over the MN but may comprise an indication whether the RACH report is associated to the latest random access procedure performed at the MN, i.e. report for the MN MAC entity, like a random access related to the MCG, or the latest random access procedure performed at the SN, i.e. report is for the SN MAC entity, like a random access related to the SCG.
- Flag indicating for what RAT the UE logged/stored RACH report(s).
  - For example, the report is sent over the MN but contains an indication whether the RACH report is associated to the latest random access procedure performed at the MN, i.e. report for the MN MAC entity, or the latest random access procedure performed at the SN, i.e. report for the SN MAC entity.
  - For example, the report is sent over the SN but contains an indication whether the RACH report is associated to the latest random access procedure performed at the MN, i.e. report for the MN MAC entity, or the latest random access procedure performed at the SN, i.e. report for the SN MAC entity. E.g. an indication indicating which radio network node the report is associated with.

The indication may be designed to implicitly indicate for which MAC entity the report is available. That implicit indication may be one or more of the following:
- The availability indication flag may be sent over, which availability indication may be an indication to the network that the available RACH report is associated to the MAC entity of the MN i.e. the Master Cell Group.
- The availability indication may be sent over SRB3, which availability indication may be an indication to the network that the available RACH report is associated to the MAC entity of the SN i.e. the Secondary Cell Group;
- Depending on the value of availability flag a MN RAN node, e.g. the first radio network node 12, and a SN RAN node e.g. the second radio network node 13, may coordinate to solicit the available RACH report:

If the availability flag is explicit e.g., availability flag explicitly indicates RACH report belongs to a RACH performed over MN leg:
  If the availability flag is sent to MN RAN node, MN RAN node may send a request to the UE to solicit the available RACH report.
  If the availability flag is sent to SN RAN node, SN RAN node may send a signal to MN to inform the MN about the availability of RACH report associated to a RACH performed over MN leg. MN leg accordingly can send a request to the UE to solicit the RACH report from UE.
If the availability flag is explicit e.g., availability flag explicitly indicates RACH report belongs to a RACH performed over SN leg:
  If the availability flag is sent to SN RAN node, SN RAN node may send a request to the UE to solicit the available RACH report.
  If the availability indication is sent to MN RAN node, MN RAN node may send a signal to SN to inform the SN about the availability of RACH report associated to a RACH performed over SN leg. MN leg accordingly can send a request to the UE to solicit the RACH report from UE.
If the availability indication is implicit e.g., availability indication flag is sent over SRB1 which means RACH report is produced for a RACH performed over MN leg:
  MN may send a request to solicit the available RACH report
If the availability indication is implicit e.g., availability indication flag is sent over SRB3 which means RACH report is produced for a RACH performed over SN leg:
  SN may send a request to solicit the available RACH report.

Embodiments described herein are in the case of e.g. an addition of a secondary cell, e.g. a PSCell, when the UE 10 is in single connectivity and network configures the UE to operate in dual connectivity. However, there could be additional cases where there could be ambiguities in RACH reports due to the un-clarity of logged RACH information. For example, another case is when the UE 10 in single connectivity is handed over to a target cell (and that requires random access in the target cell) and, the target configuration contains an SCG configuration, i.e., the UE would add a PSCell to the new target (or any other cell requiring the UE to perform another random access procedure, e.g. associated to another MAC entity). Hence, having logs per MAC entity in these different use cases would be beneficial, like in this case where the UE has logged random access information for the first random access procedure with the target PCell and has logged random access information for the second random access procedure with the PSCell associated to the new target PCell.

Alternatively or additionally, in these DC like procedures, the UE 10 may keep a single logged random access information for a RACH report, which is related to the latest executed random access procedure, regardless if that is for the MN or the SN. For example, when the UE is connected to a PCell, i.e. with an MN, and receives a configuration from the MN that requires the initiation of random access with an SN, e.g. an SN addition configuration, like an RRC reconfiguration with a SCG configuration, the UE may perform random access with the SN and logs information for that random access procedure. Then, if later the UE 10 receives a single request for RACH report from the network, it is a common understanding between UE and the network that this RACH report is concerning the latest procedure, not per node, i.e., the one the UE executed with the SN.

Action 803. The radio network node, e.g. the first or the second radio network node, may determine to request a RACH report. E.g. upon initiating a cell coverage or similar.

Action 804. The radio network node, e.g. the first or the second radio network node, transmits a request for reporting random access procedure related data, e.g. a request a RACH report, to the UE 10. The request may indicate RAT and/or cell of the radio network node.

The UE 10 receiving a request from a network to transmit a RACH report when the UE is in Dual Connectivity;
  What is called here a "request from a network to transmit a RACH report" may be interpreted as a reporting configuration that may be included in a UEInformationRequest message.
  There could be different aspects such as:
    From which network entity the UE receives this request, in case the UE is in MR-DC, and connected to an MN PCell and SN PSCell.
      An MN terminated bearer;
      An SN terminated bearer;
      An MN MCG;
      An SN MCG;
    From which RAT the UE receives this request, in case the UE is in MR-DC, and connected to an MN LTE PCell and SN NR PSCell. The method comprises the UE receiving the RACH report from:
      An NR terminated bearer;
      An LTE terminated bearer;
      An NR MCG;
      An LTE MCG;
      An NR SCG;
      An LTE SCG;
    What information is in the request message.
      In some embodiments, the request may comprise an indication to transmit all RACH reports that are stored.
      In some embodiments, the request contains an indication to transmit RACH report(s) that are stored per granular entity (like a specific RAT, cell, cell group, etc.). For example, network may only request the UE to report NR RACH report(s), or LTE RACH report(s), or MCG RACH report(s), etc.
      In some embodiments, an MN may only request MN related RACH report(s) for other MN related entities, for examples, cells or cell groups associated to the MN. Which entity to report is indicated in the request;
      In some embodiments, an SN may only request SN related RACH report(s) for other SN related entities, for examples, cells or cell groups associated to the SN. Which entity to report is indicated in the request;
      In some embodiments, an MN may request SN related RACH report(s) for other SN related entities, for examples, cells or cell groups associated to the SN. Which entity to report is indicated in the request;
      In another embodiment, an SN may request MN related RACH report(s) for other MN related entities, for examples, cells or cell groups associated to the MN. Which entity to report is indicated in the request;

In some embodiments, a RAT could only request RAT related RACH report(s) for other RAT related entities, for examples, cells or cell groups associated to the RAT. Which entity to report is indicated in the request;

In some embodiments, a RAT could request RACH report(s) related to another RAT for other entities, for examples, cells or cell groups associated to the other RAT. Which entity to report is indicated in the request;

Whether the radio network node requesting (e.g. MN, SN), and/or the content of the request determines which RACH report the UE reports, e.g. in the case the UE has multiple RACH reports stored at the time it receives the request.

In some embodiments, if the request is received from a RAT, it implicitly indicates that the RACH report to be transmitted is about that same RAT.

In some embodiments, if the request is received from the MN, it implicitly indicates that the RACH report to be transmitted is about the MN.

In some embodiments, if the request is received from the SN, it implicitly indicates that the RACH report to be transmitted is about the SN.

In some embodiments, if the request is received from an MCG, it implicitly indicates that the RACH report to be transmitted is about the MCG.

In some embodiments, if the request is received from an SCG, it implicitly indicates that the RACH report to be transmitted is about the SCG.

In some embodiments, if the request is received from a cell, it implicitly indicates that the RACH report to be transmitted is about that same cell.

In more general terms, if the request is received from a granular entity, it implicitly indicates that the RACH report to be transmitted is about that same granular entity.

Whether the bearer from which the request is transmitted (e.g. SRB1, SRB3), and/or the content of the request determines what and how to report, e.g. in the case the UE has multiple RACH reports stored at the time it receives the request, and in the case the UE has multiple SRBs established.

If the request is received from SRB1, it implicitly indicates that the RACH report to be transmitted is about at least a cell from which SRB1 is terminated.

If the request is received from SRB3, it implicitly indicates that the RACH report to be transmitted is about at least a cell from which SRB3 is terminated.

In some embodiments, the request from the network may explicitly indicate for which MAC entity the report is about. That explicit indication may be one or more of the following:

Flag indicating for what MAC entity the UE 10 shall transmit RACH report. For example, the request for the report is sent over the MN but contains an indication whether the RACH report is associated to the latest random access procedure performed at the MN, i.e. report for the MN MAC entity, or the latest random access procedure performed at the SN, i.e. report for the SN MAC entity.

Flag indicating for what RAT the UE shall transmit RACH report. For example, the report is sent over the MN but contains an indication whether the RACH report is associated to the latest random access procedure performed at the MN, i.e. report for the MN MAC entity, or the latest random access procedure performed at the SN, i.e. report for the SN MAC entity.

The request may implicitly indicate for which MAC entity the report is about. That implicit indication may be at least one of the following:

The request being received over SRB1 is an indication to the UE that the request is for transmitting a RACH report associated to the MAC entity of the MN i.e. the Master Cell Group.

The request being received over an MCG, e.g. if an SRB1 or SRB3 split bearer, may be an indication to the UE that the request is for transmitting a RACH report associated to the MAC entity of the MN i.e. the Master Cell Group.

The request being received over SRB3 is an indication to the UE that the request is for transmitting a RACH report associated to the MAC entity of the SN i.e. the Secondary Cell Group;

The request may be received over an SCG, e.g. if an SRB3 or SRB1 split bearer, and may be an indication to the UE 10 that the request is for transmitting a RACH report associated to the MAC entity of the SN i.e. the Secondary Cell Group.

Figure 6A:
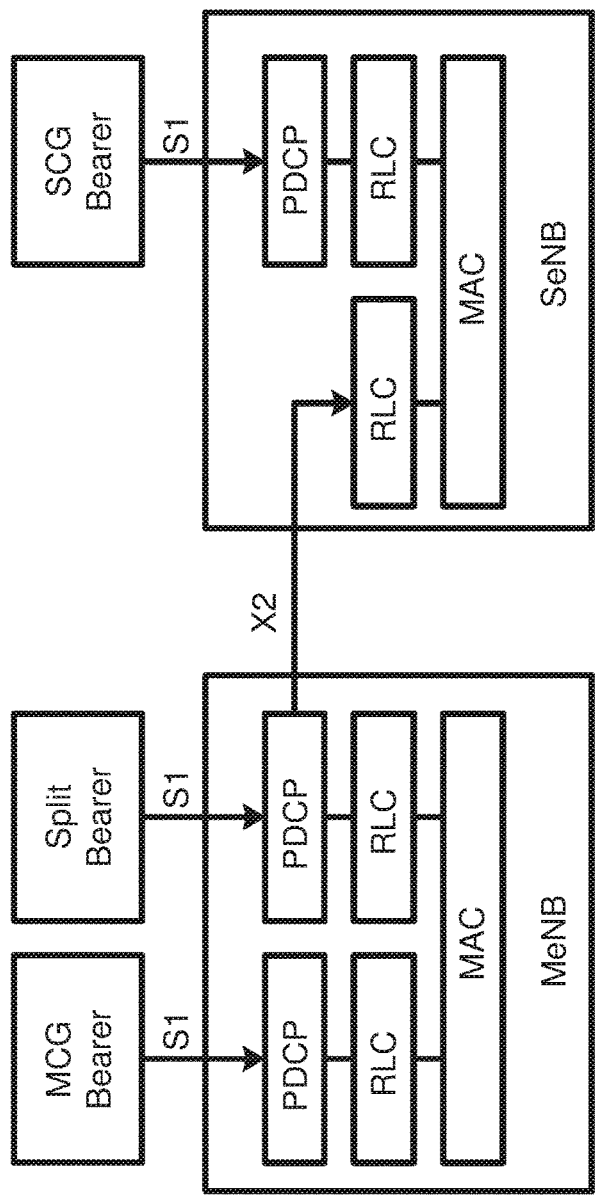
Figure 6B:
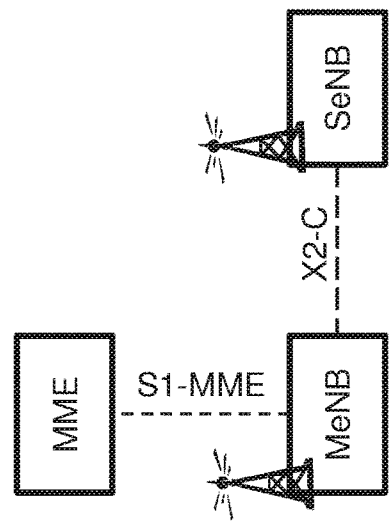
Figure 6C:
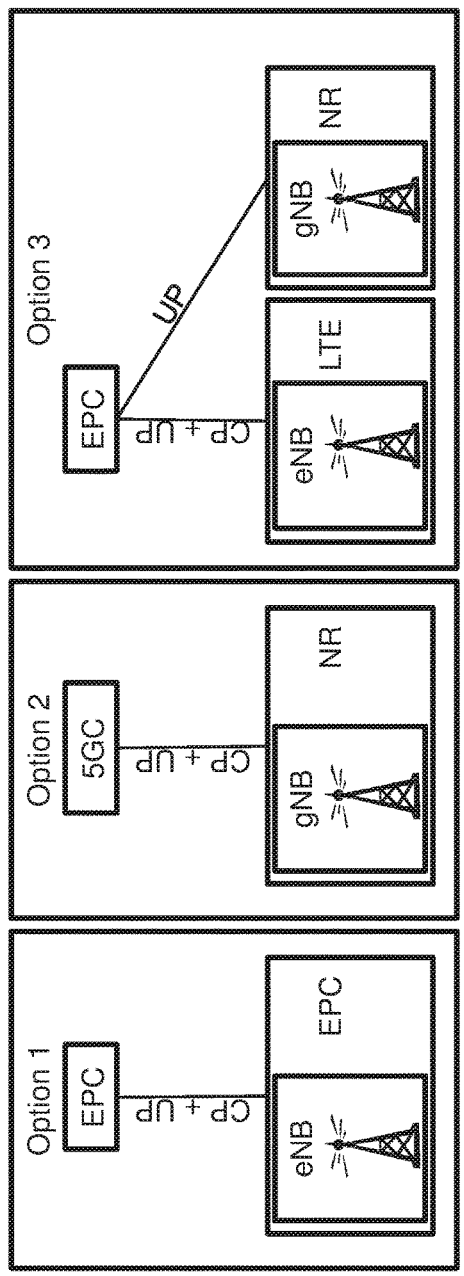
Figure 6D:
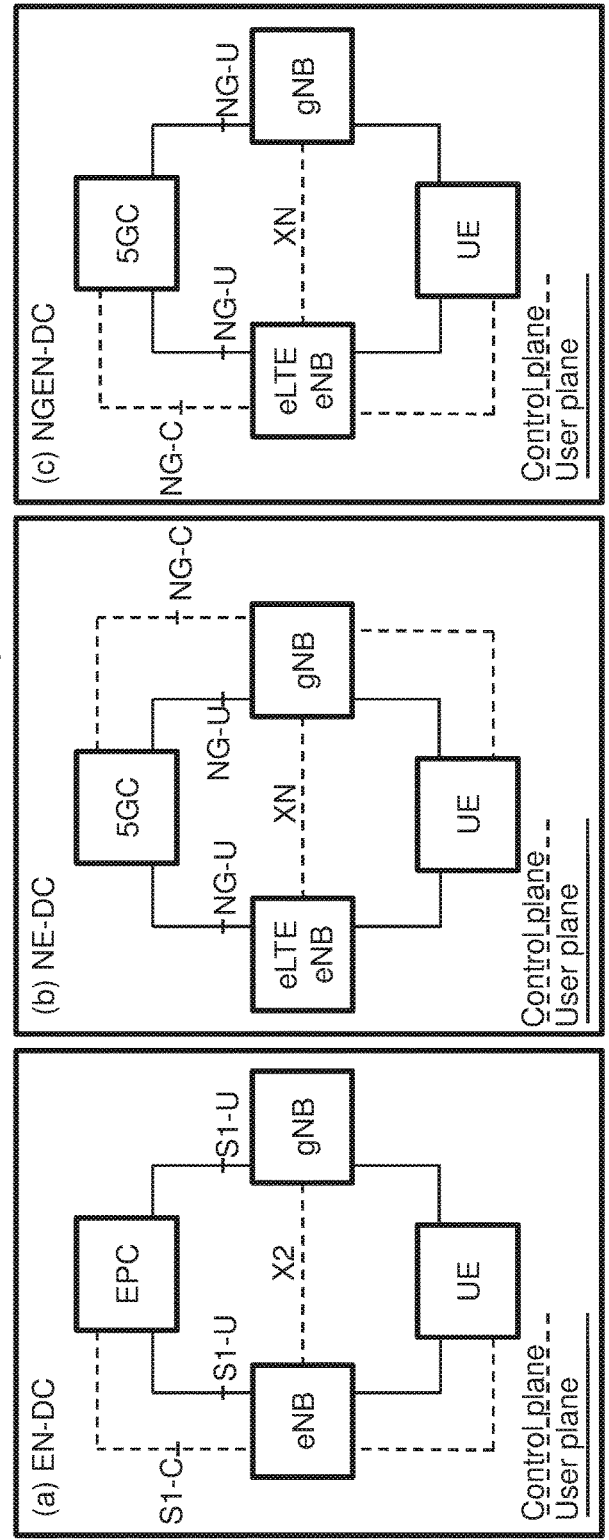
Figure 6E:
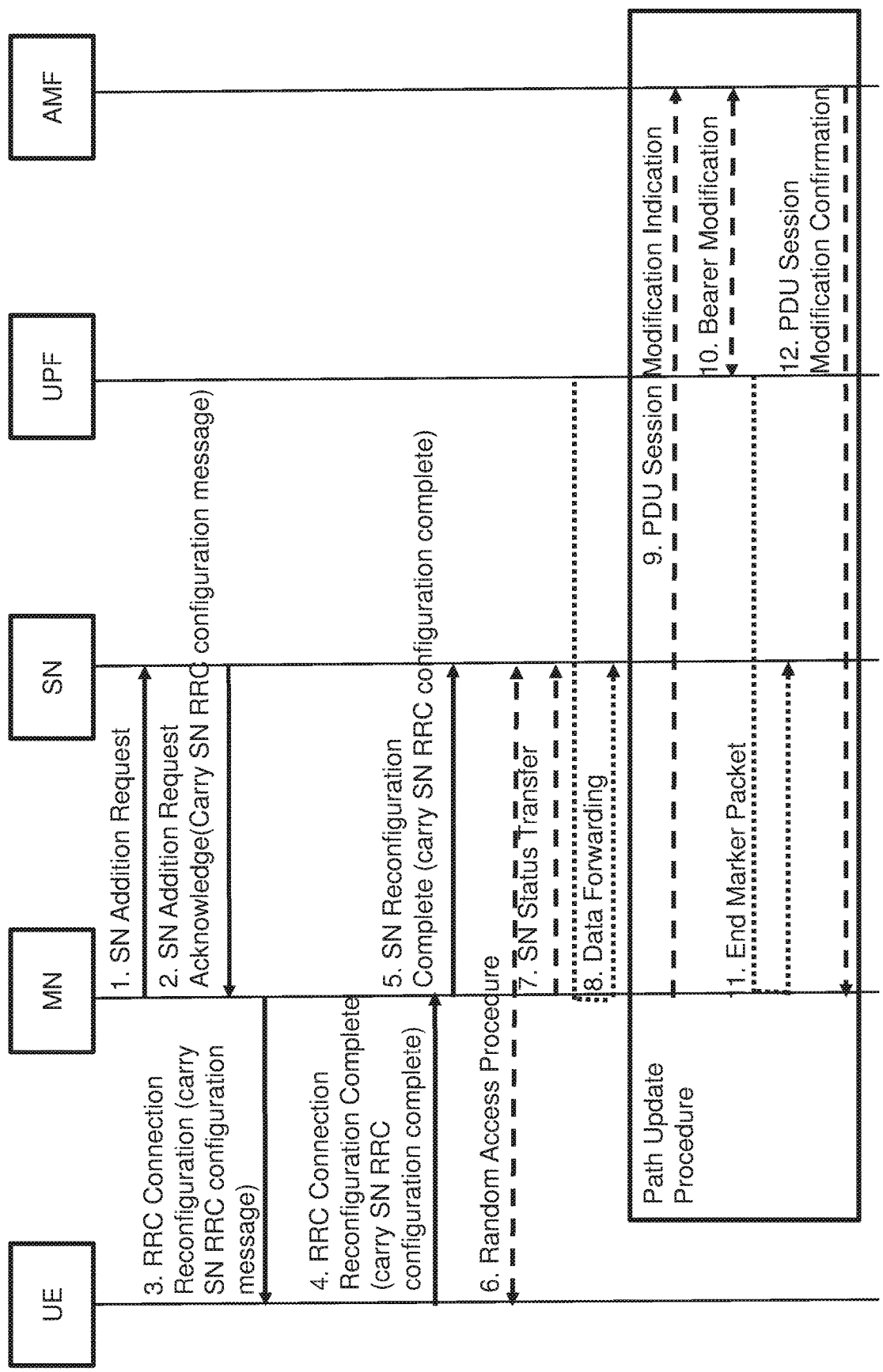
Figure 6F:
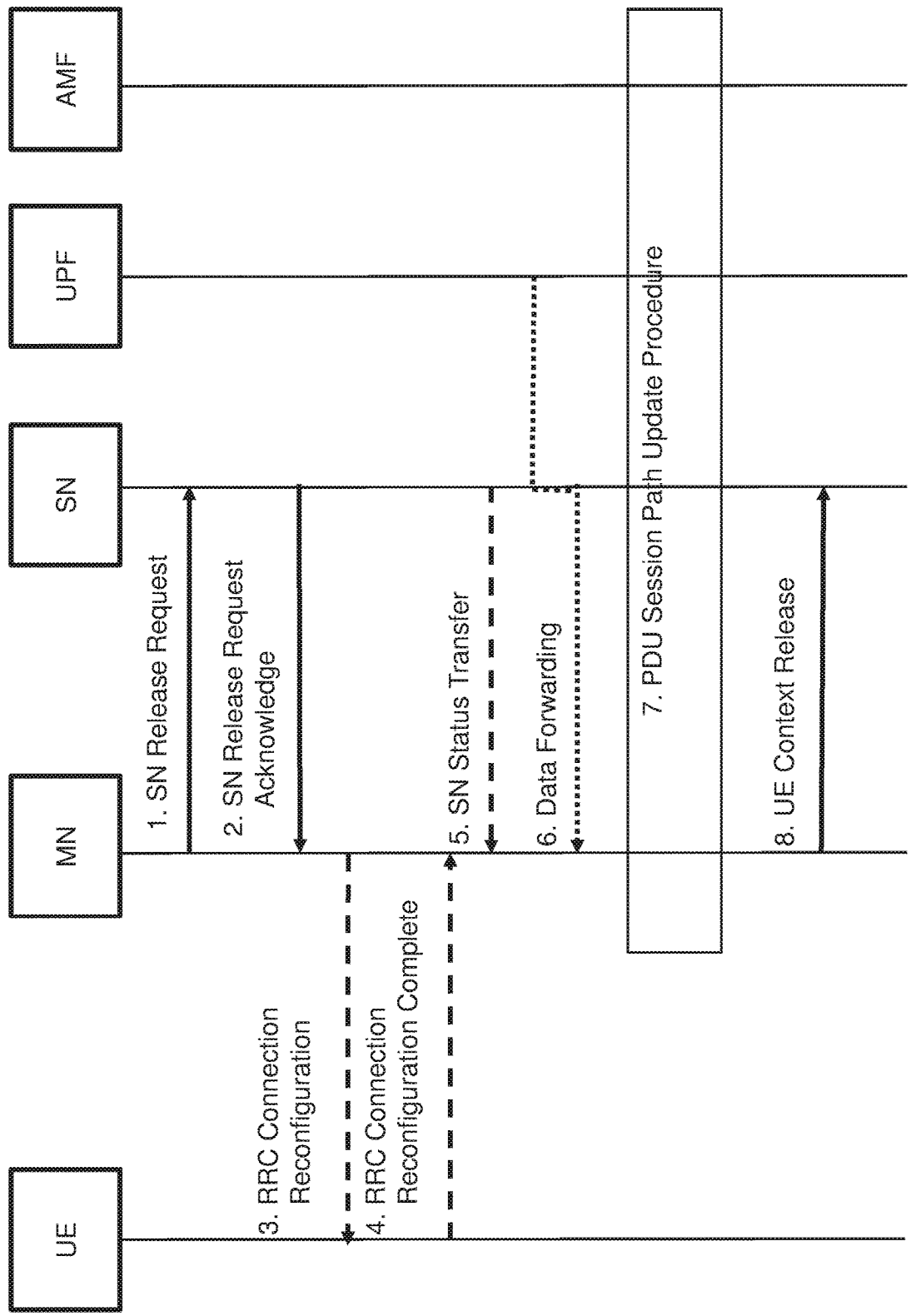
Figure 6G:
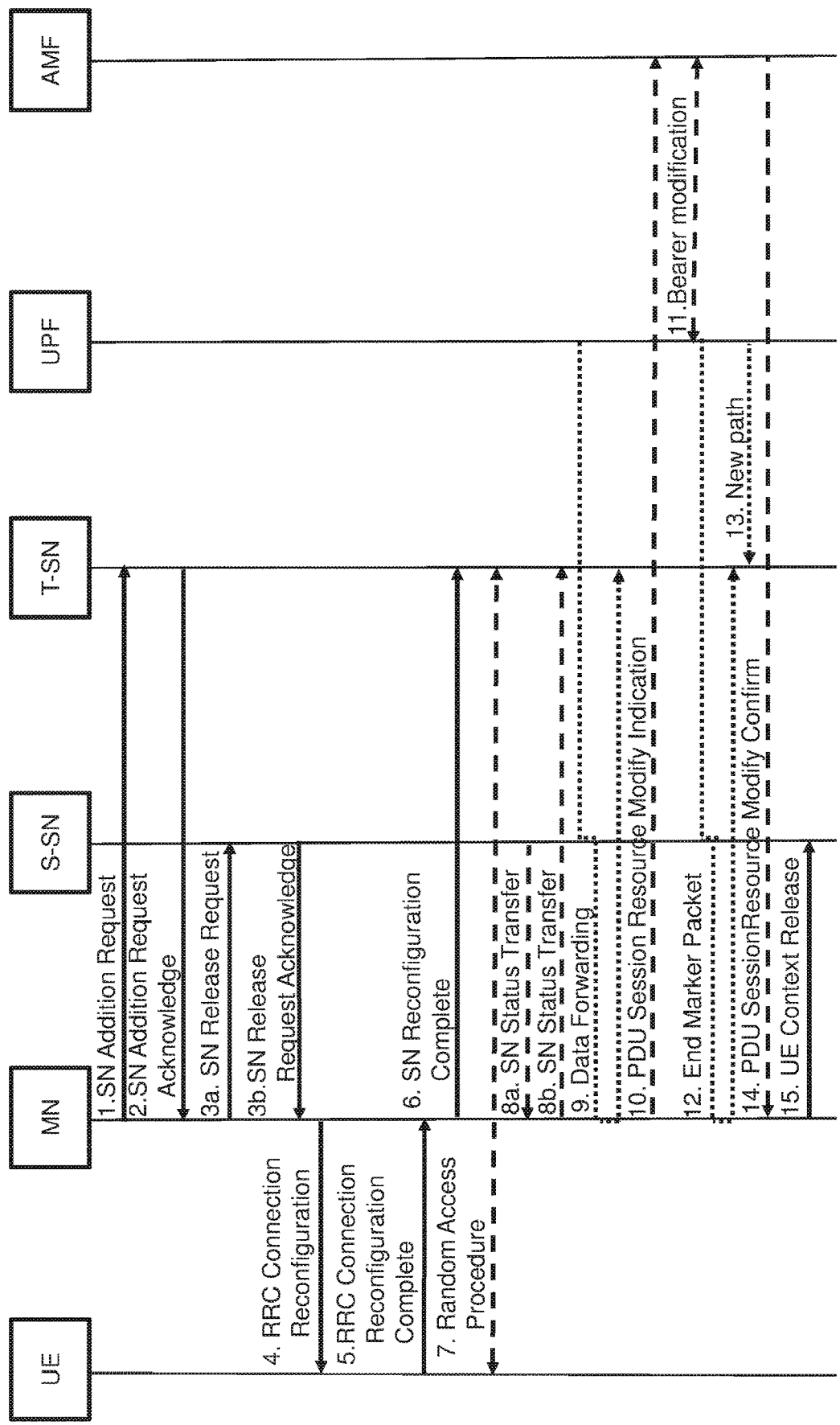
Figure 6H:
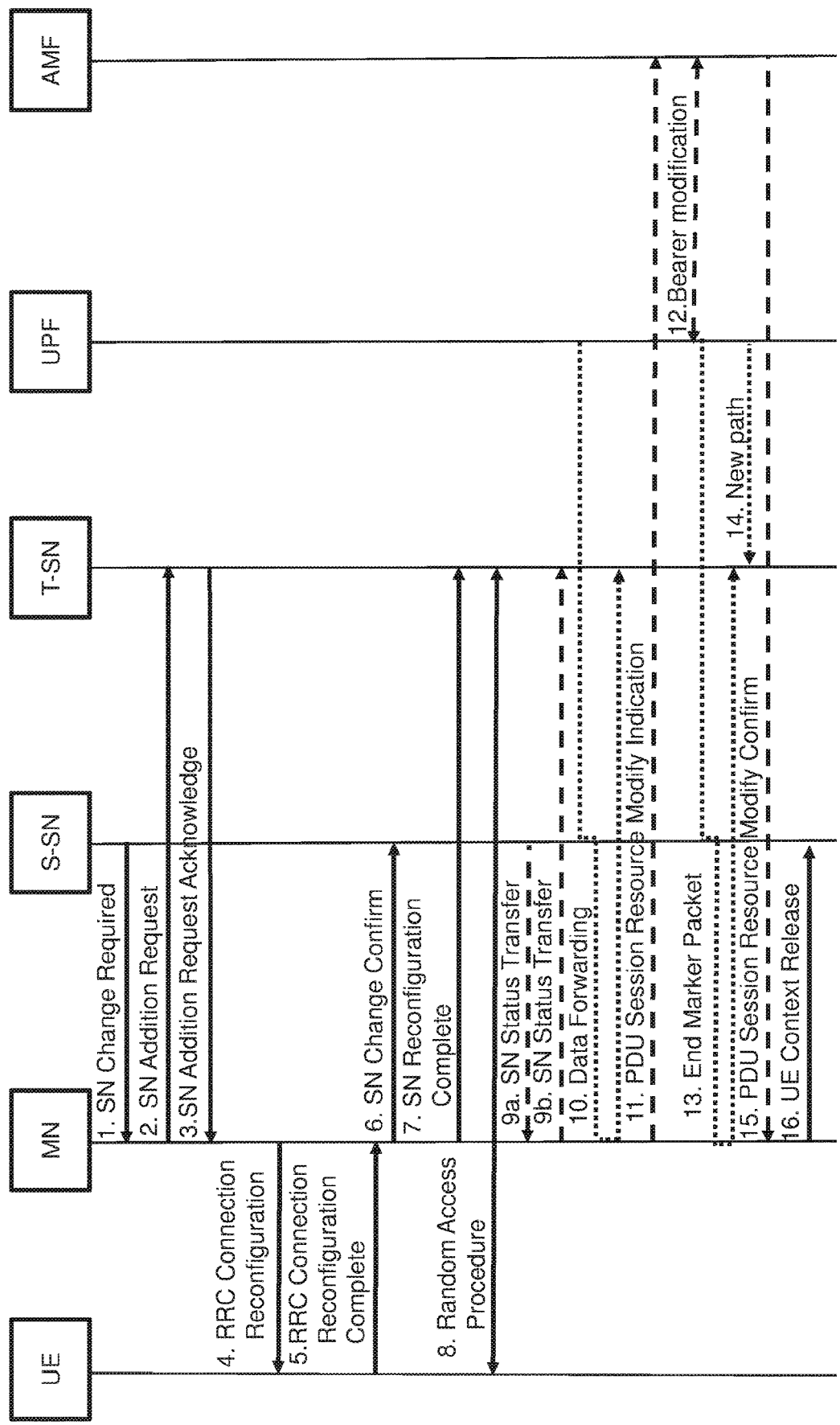

Action 805. The UE 10 may determine to transmit a report such as a RACH report to one of the radio network nodes. In one example shown in FIG. 6e, the UE 10 may have two RACH reports, one associated to a PCell and another associated to a PSCell. Hence, if the UE 10 receives the request via the MN it determines that the request is about a PCell RACH report, else if the UE receives the request via the SN it determines that the request is about a PSCell RACH report, as shown in FIG. 6f.

A possible change in the RRC specifications to implement some of the embodiment, assuming RACH report is requested via a UEInformationRequest message, is to consider that the message may be transmitted on SRB3 or SRB1 (while in current LTE specifications, that can only be transmitted on SRB1).

That implementation to LTE RRC may be as shown below:

UEInformationRequest

The UEInformationRequest is the command used by E-UTRAN to retrieve information from the UE.

Signalling radio bearer: SRB1 or SRB3.

RLC-SAP: AM

Logical channel: DCCH

Direction: E-UTRAN to UE

UEInformationRequest Message

```
-- ASN1START
UEInformationRequest-r9      ::=     SEQUENCE {
    rrc-TransactionIdentifier        RRC-TransactionIdentifier,
    criticalExtensions               CHOICE {
        c1                               CHOICE {
            ueInformationRequest-r9          UEInformationRequest-r9-IEs,
```

```
    spare3 NULL, spare2 NULL, spare1 NULL
  },
    criticalExtensionsFuture         SEQUENCE { }
  }
}
UEInformationRequest-r9-IEs ::=    SEQUENCE {
  rach-ReportReq-r9                BOOLEAN,
  rlf-ReportReq-r9                 BOOLEAN,
  nonCriticalExtension             UEInformationRequest-v930-IEs    OPTIONAL
}
UEInformationRequest-v930-IEs ::=  SEQUENCE {
  lateNonCriticalExtension         OCTET STRING                     OPTIONAL,
  nonCriticalExtension             UEInformationRequest-v1020-IEs   OPTIONAL
}
UEInformationRequest-v1020-IEs ::= SEQUENCE {
  logMeasReportReq-r10             ENUMERATED {true}                OPTIONAL,  --
Need ON
  nonCriticalExtension             UEInformationRequest-v1130-IEs   OPTIONAL
}
UEInformationRequest-v1130-IEs ::= SEQUENCE {
  connEstFailReportReq-r11         ENUMERATED {true}                OPTIONAL,  --
Need                               ON
  nonCriticalExtension             UEInformationRequest-v1250-IEs   OPTIONAL
}
UEInformationRequest-v1250-IEs ::= SEQUENCE {
  mobilityHistoryReportReq-r12     ENUMERATED {true}                OPTIONAL,  --
Need                               ON
  nonCriticalExtension             UEInformationRequest-v1530-IEs   OPTIONAL
}
UEInformationRequest-v1530-IEs ::= SEQUENCE {
  idleModeMeasurementReq-r15         ENUMERATED {true}              OPTIONAL,
  -- Need ON
  flightPathInfoReq-r15            FlightPathInfoReportConfig-r15   OPTIONAL,
  -- Need ON
  nonCriticalExtension             SEQUENCE { }                     OPTIONAL
}
-- ASN1STOP
```

| rach-ReportReq |
|---|
| This field is used to indicate whether the UE shall report information about the random access procedure. |

Figures 9G, 9H:
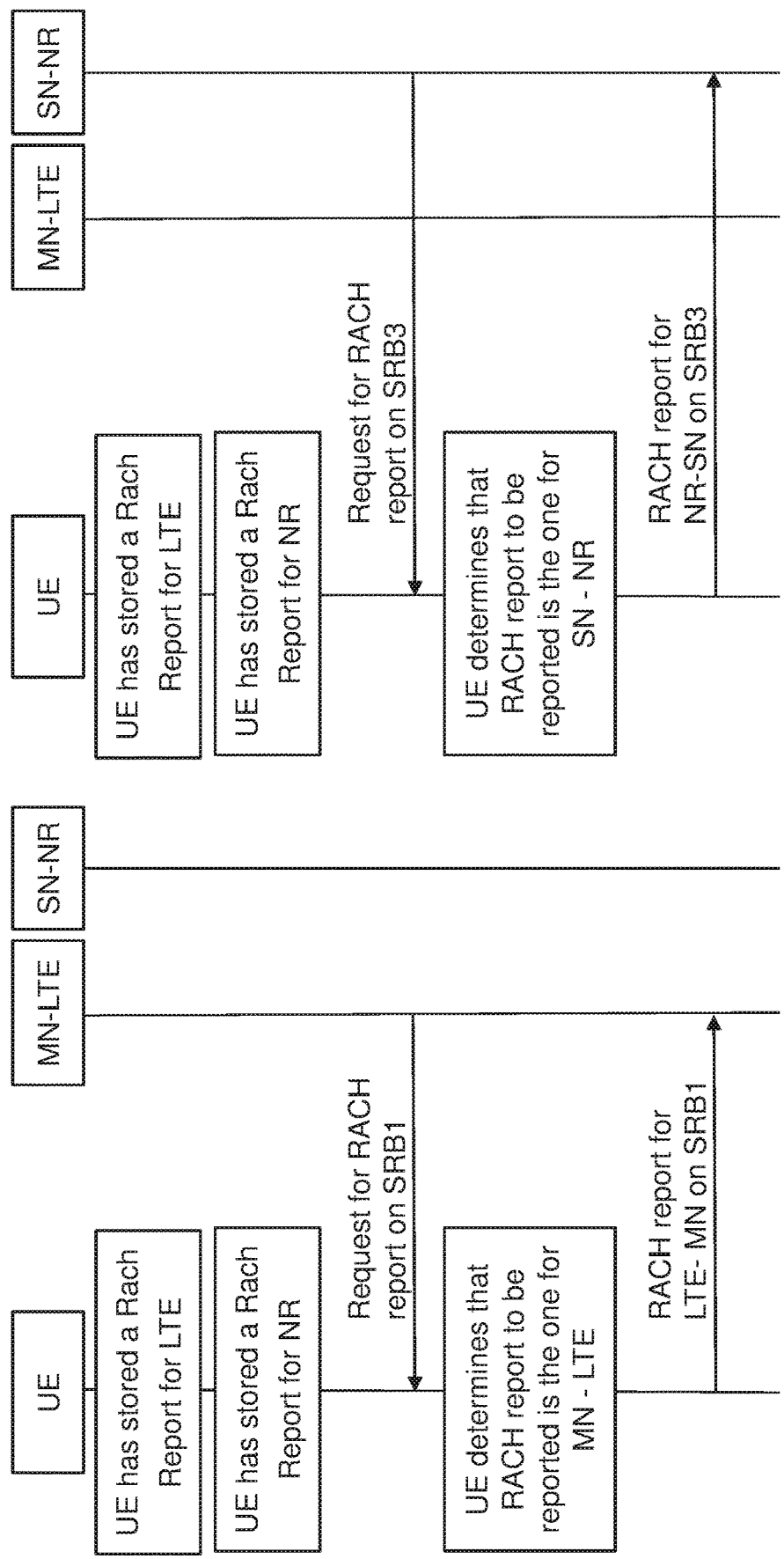

Action 806. The UE 10 then transmits a RACH report. The UE 10 may transmit a RACH report upon request from the network when the UE is in Dual Connectivity;
  In one solution the report is transmitted on the same SRB that the request has been received. For example:
    The report is transmitted on SRB1, if the request is received on SRB1.
    The report is transmitted on SRB3, if the request is received on SRB3.
    The report is transmitted on SRB, if the request is received on SRB2.
  In another solution the report is transmitted on an SRB that is indicated in the request.
  Illustrated in FIG. 9g-9h
  In one solution the report is transmitted on the same RAT that the request has been received. For example:
    The report is transmitted on LTE, if the request is received on LTE.
    The report is transmitted on NR, if the request is received on NR.
    The report is transmitted on SRB, if the request is received on SRB2.
  In another solution the report is transmitted on the SRB that is indicated in the request, which may be the same or a different RAT where the request is being provided.
  The solution may comprise clean up actions where the UE 10 may delete RACH report associated to a given entity when it is not connected any longer to that granular entity. For example, if the UE is in MR-DC and has a RACH report for LTE and another RACH report for NR, and is re-configured to remove EN-DC and get back to single LTE connectivity, the UE 10 may delete the NR RACH report.

UEInformationResponse

The UEInformationResponse message is used by the UE to transfer the information requested by the E-UTRAN.
  Signalling radio bearer: SRB1, SRB3 or SRB2 (when logged measurement information is included)
  RLC-SAP: AM
  Logical channel: DCCH
  Direction: UE to E-UTRAN UEInformationResponse Message

```
-- ASN1START
UEInformationResponse-r9 ::=       SEQUENCE {
  rrc-TransactionIdentifier          RRC-TransactionIdentifier,
  criticalExtensions                 CHOICE {
    c1                                 CHOICE {
      ueInformationResponse-r9           UEInformationResponse-r9-IEs,
      spare3 NULL, spare2 NULL, spare1 NULL
```

```
},
    criticalExtensionsFuture              SEQUENCE { }
    }
}
UEInformationResponse-r9-IEs ::=         SEQUENCE {
    rach-Report-r9                           SEQUENCE {
        numberOfPreamblesSent-r9                 NumberOfPreamblesSent-r11,
        contentionDetected-r9                    BOOLEAN
    }                                                                    OPTIONAL,
    rlf-Report-r9                            RLF-Report-r9               OPTIONAL,
    nonCriticalExtension                     UEInformationResponse-v930-IEs
    OPTIONAL
}
-- Late non critical extensions
UEInformationResponse-v9e0-IEs ::=       SEQUENCE {
    rlf-Report-v9e0                          RLF-Report-v9e0             OPTIONAL,
    nonCriticalExtension                     SEQUENCE { }                OPTIONAL
}
-- Regular non critical extensions
UEInformationResponse-v930-IEs ::=       SEQUENCE {
    lateNonCriticalExtension                 OCTET STRING (CONTAINING
UEInformationResponse-v9e0-IEs) OPTIONAL,
    nonCriticalExtension                     UEInformationResponse-v1020-IEs    OPTIONAL
}
UEInformationResponse-v1020-IEs ::=      SEQUENCE {
    logMeasReport-r10                        LogMeasReport-r10           OPTIONAL,
    nonCriticalExtension                     UEInformationResponse-v1130-IEs    OPTIONAL
}
UEInformationResponse-v1130-IEs: :=      SEQUENCE {
    connEstFailReport-r11                    ConnEstFailReport-r11       OPTIONAL,
    nonCriticalExtension                     UEInformationResponse-v1250-IEs    OPTIONAL
}
UEInformationResponse-v1250-IEs ::=      SEQUENCE {
    mobilityHistoryReport-r12                MobilityHistoryReport-r12
    OPTIONAL,
    nonCriticalExtension                     UEInformationResponse-v1530-IEs    OPTIONAL
}
UEInformationResponse-v1530-IEs ::=      SEQUENCE {
    measResultListIdle-r15                   MeasResultListIdle-r15      OPTIONAL,
    flightPathInfoReport-r15                 FlightPathInfoReport-r15    OPTIONAL,
    nonCriticalExtension                     SEQUENCE { }                OPTIONAL
}
. . .
```

Network Aspects of the Method

Embodiments comprise a method for RACH parameters optimization executed by the first radio network node, e.g. MN or SN where a RACH report is received, and the second radio network node, e.g. SN or MN where RACH report is needed for RACH parameter optimization. The method may comprise:

In one solution the UE 10 provides a RACH report to one of MN or SN and either as part of the RACH report or as different information, the signalling from the UE 10 may highlight for what MAC entity RACH access the report was constructed.

If the RACH report was received at the MN but it was constructed after RACH at the SN, the MN receiving the report would signal it to the SN via appropriate signalling over common interfaces such as the X2 or the Xn interface.

If the RACH report was received at the SN but it was constructed after RACH at the MN, the SN receiving the report would signal it to the MN via appropriate signalling over common interfaces such as the X2 or the Xn interface.

Figure 9I:
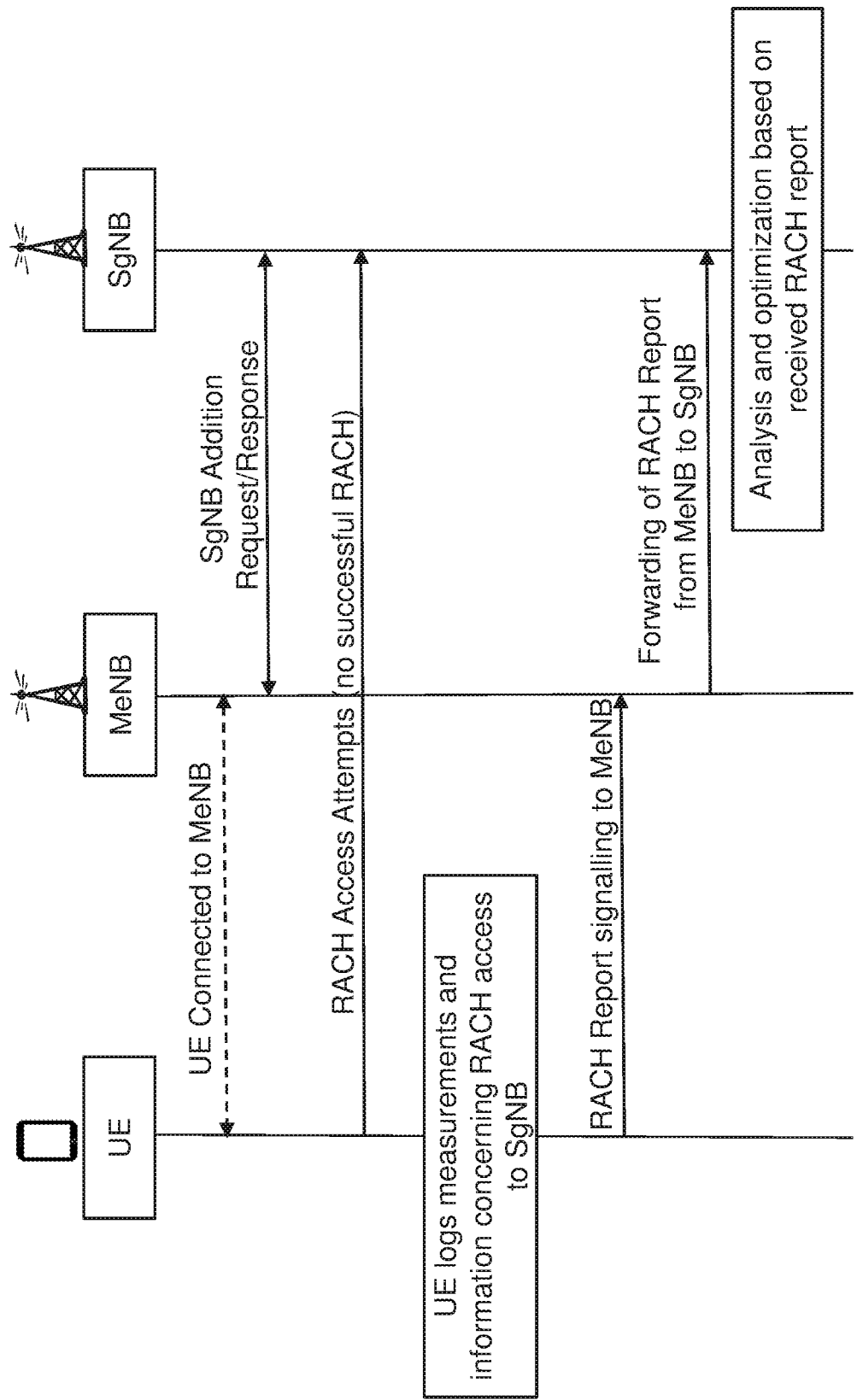

The RAN node receiving the report from the UE may not decode the report but may only retrieve from the UE signalling the information about the RAN node to which the report needs to be forwarded. This embodiment may apply for example to the case of EN-DC operation, where the RACH report was collected after UE RACH access to an SN and where the MN does not have the capabilities to decode the RACH Report for an NR RAN node. In this embodiment the only node that can benefit from the information in the RACH report is the node to whom the first RAN node receiving the report, from the UE, has forwarded the report itself. This node can optimize its cell and RACH configuration to address the issues highlighted by the RACH report, e.g. lack of UL or DL coverage, overlap of different beams coverage and RACH resources. This embodiment is described in the example FIG. 9i. FIG. 9i shows a use case where the UE is connected to the MeNB. The SgNB sends a SgNB addition response to a SgNB addition request from the MeNB. The UE performs RACH access attempts (no successful RACH). The UE logs measurements and information concerning RACH access to SgNB. The UE performs report signalling to MeNB. The MeNB forwards of RACH report from MeNB to SgNB. The SgNB performs analysis and optimization based on received RACH report.

Figure 9J:
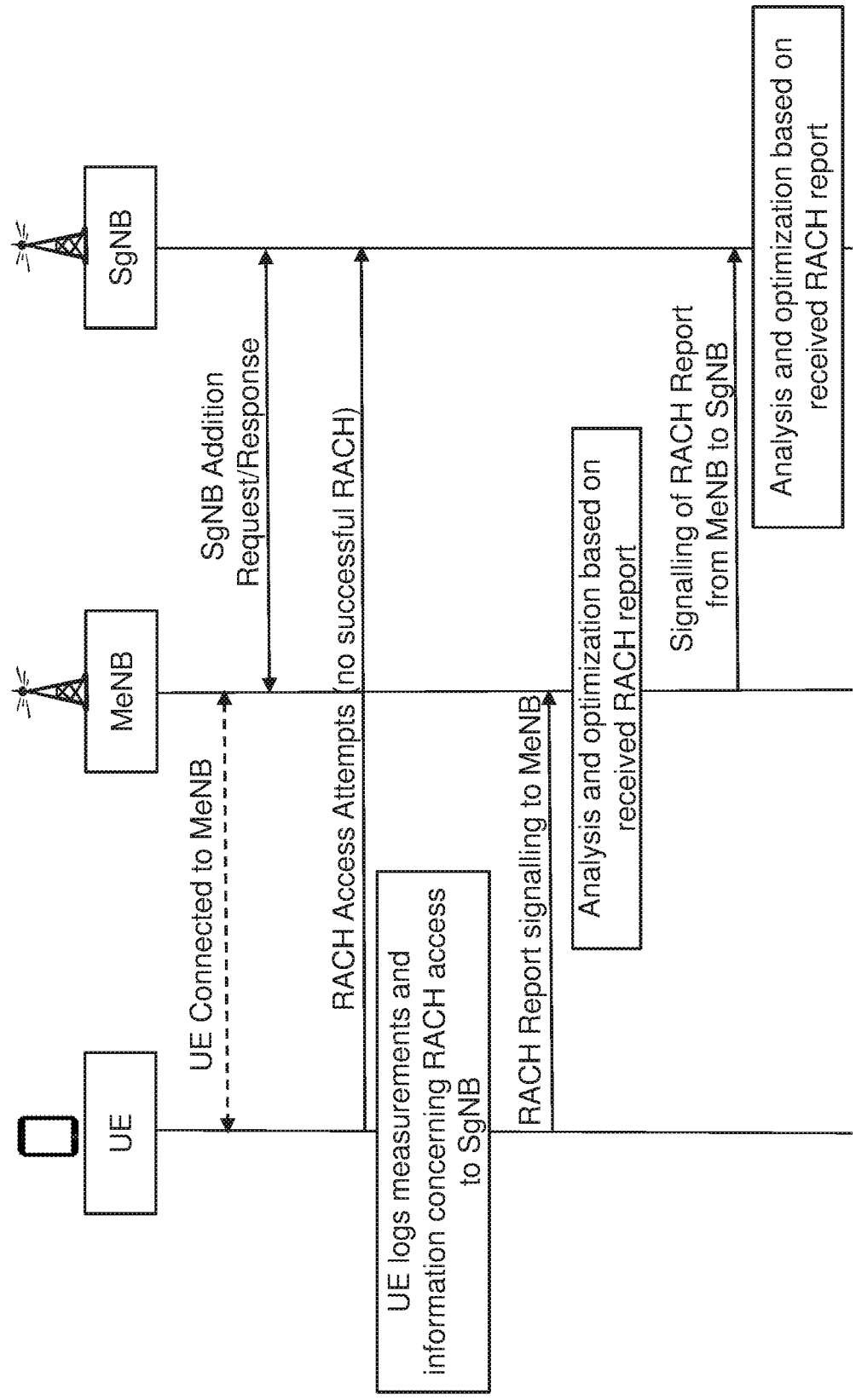

In another embodiment of this solution the RAN node receiving the RACH report can decode it and interpret the information contained in it. This may lead to optimization of e.g. cell configuration parameters also at the RAN node where the report was received but where the RACH access was not performed. As an example, the RAN node receiving the report may deduce that there is a coverage hole due to UE attempting without success to perform RACH on the other RAN node, while at the same time the RACH report reveals that the DL measurements from the UE do not show any good RS signal detected by the UE. The node receiving the report may change its cell configuration as a way to resolve such coverage issue. This embodiment is described in the example shown in the FIG. 9j. FIG. 9j shows a use case where the UE is connected to the MeNB. The SgNB sends a SgNB addition response to a SgNB addition request from the MeNB. The UE performs RACH access attempts (no successful RACH). The UE logs measurements and information concerning RACH access to SgNB. The UE performs report signalling to MeNB. The MeNB performs analysis and optimization based on received RACH report. The MeNB signals RACH report from MeNB to SgNB. The SgNB performs analysis and optimization based on received RACH report.

Action 807. The radio network node may receive and handle the report.

Thus, the radio network node may receive the RACH report and signal it to the network once the UE 10 is connected to an appropriate RAN.

The UE 10 may e.g. store a RACH report together with information of whether the report was collected while performing RACH access on an LTE cell or on an NR cell.

In one embodiment, if the UE is connected to a RAT different from the one for which the report was collected, the UE will not upload the report to that RAT, but it will wait until it will connect to the RAT for which the report was generated. Once the UE is connected to that RAT, the UE 10 may flag the presence of a RACH report and the radio network node receiving such flag will be able to pull the report from the UE 10.

Figure 9K:
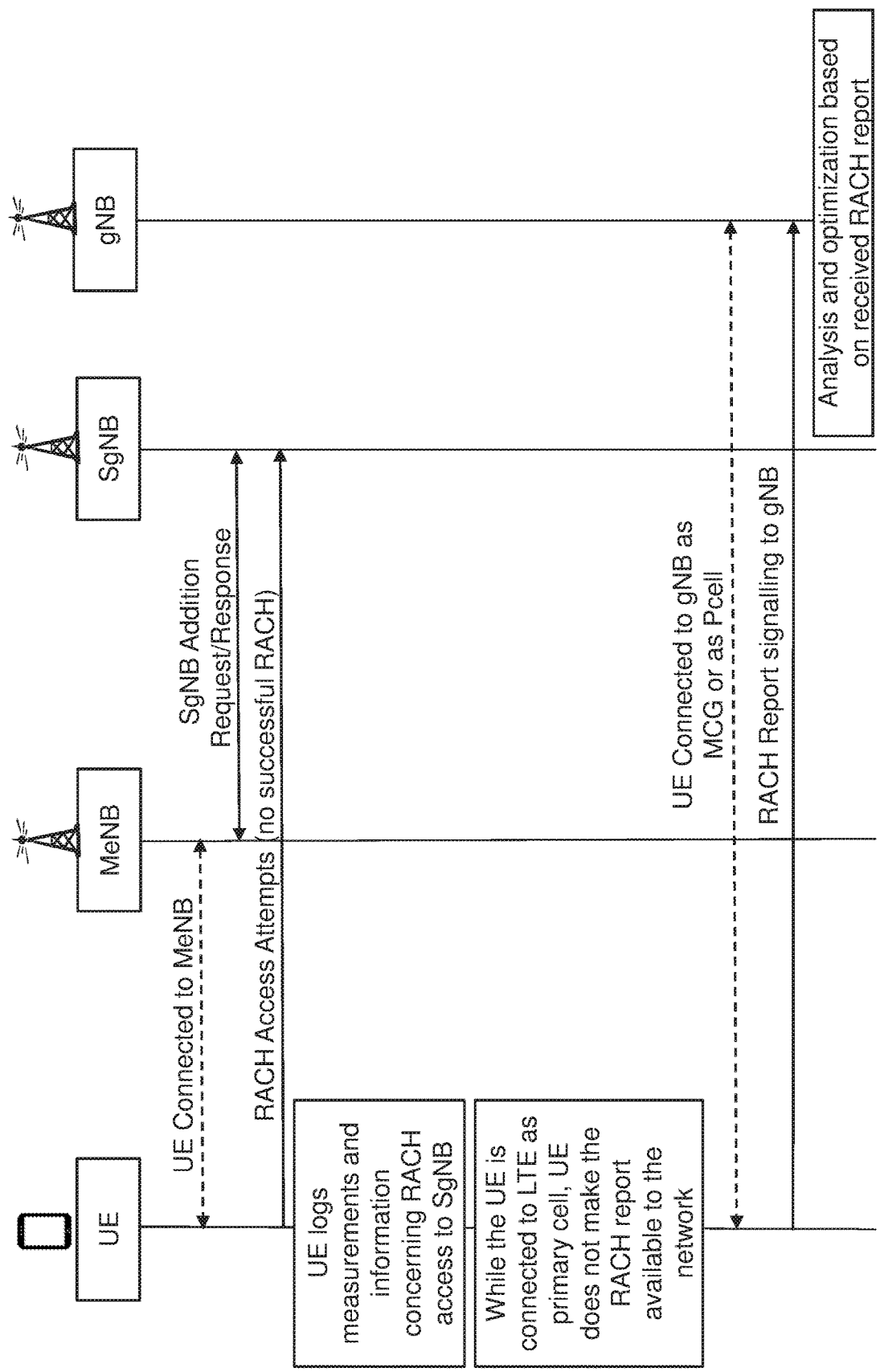
Figure 9L:
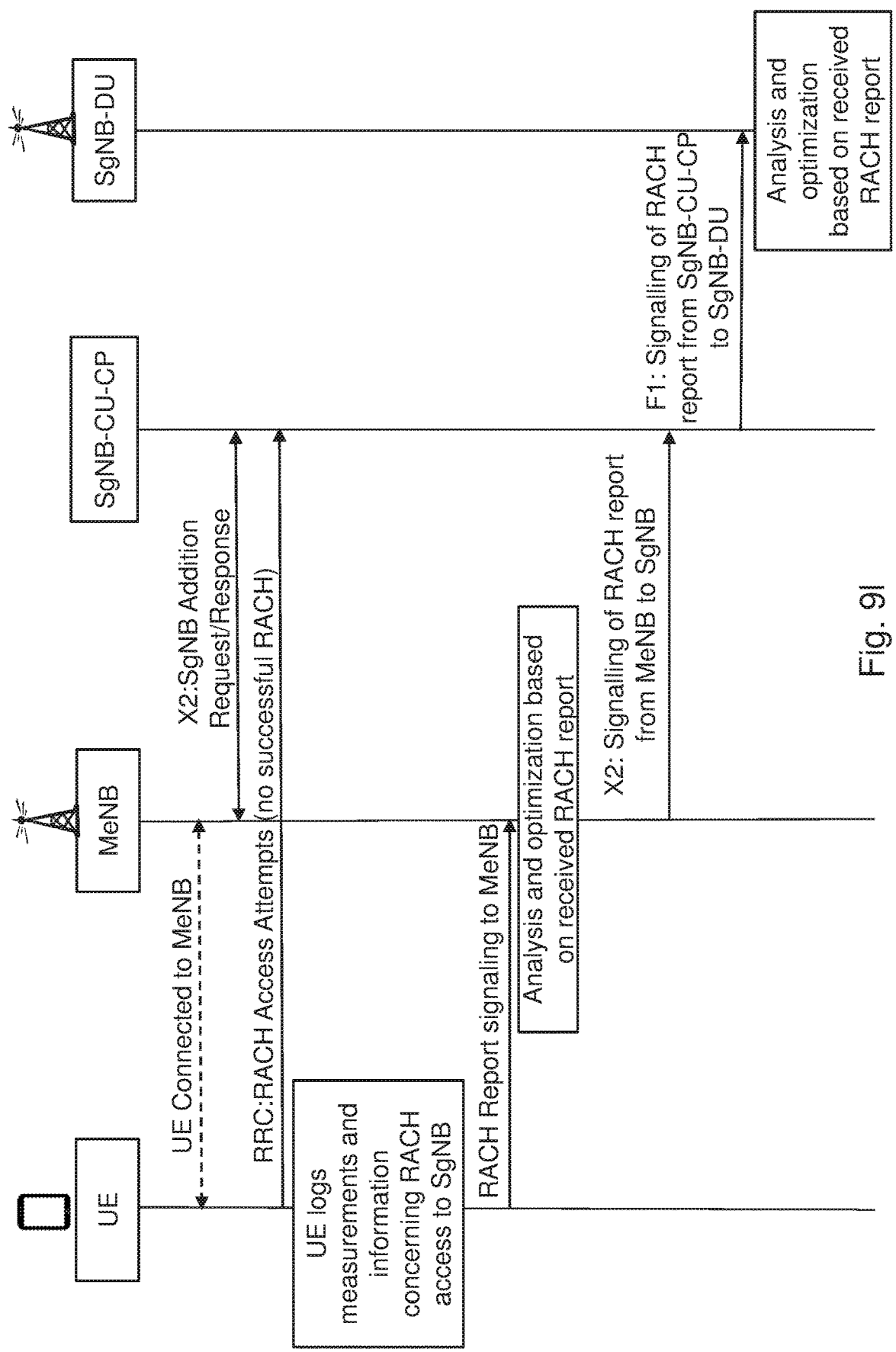

The UE may be served via EN-DC and connected to an MeNB, while the RACH report constructed by the UE is for RACH access to an SgNB. The UE will store the RACH report, which will be recognized by the UE as generated by RACH access on an NR cell, and it will flag its presence once it is connected to a gNB cell as MCG or as PCell. This embodiment is described in the example shown in the FIG. 9k. FIG. 9k shows a use case where the UE is connected to the MeNB. The SgNB sends a SgNB addition response to a SgNB addition request from the MeNB. The UE performs RACH access attempts (no successful RACH). The UE logs measurements and information concerning RACH access to SgNB. While the UE is connected to LTE as primary cell, the UE does not make the RACH report available to the network. The UE is then connected to gNB as MCG or a Pcell. The UE reports signalling to the gNB. The gNB performs analysis and optimization based on the received RACH report.

This embodiment is applicable for example to cases where the LTE implementation is not at all able to decode a RACH report constructed by the UE as consequence of NR RACH access.

Figure 1A:
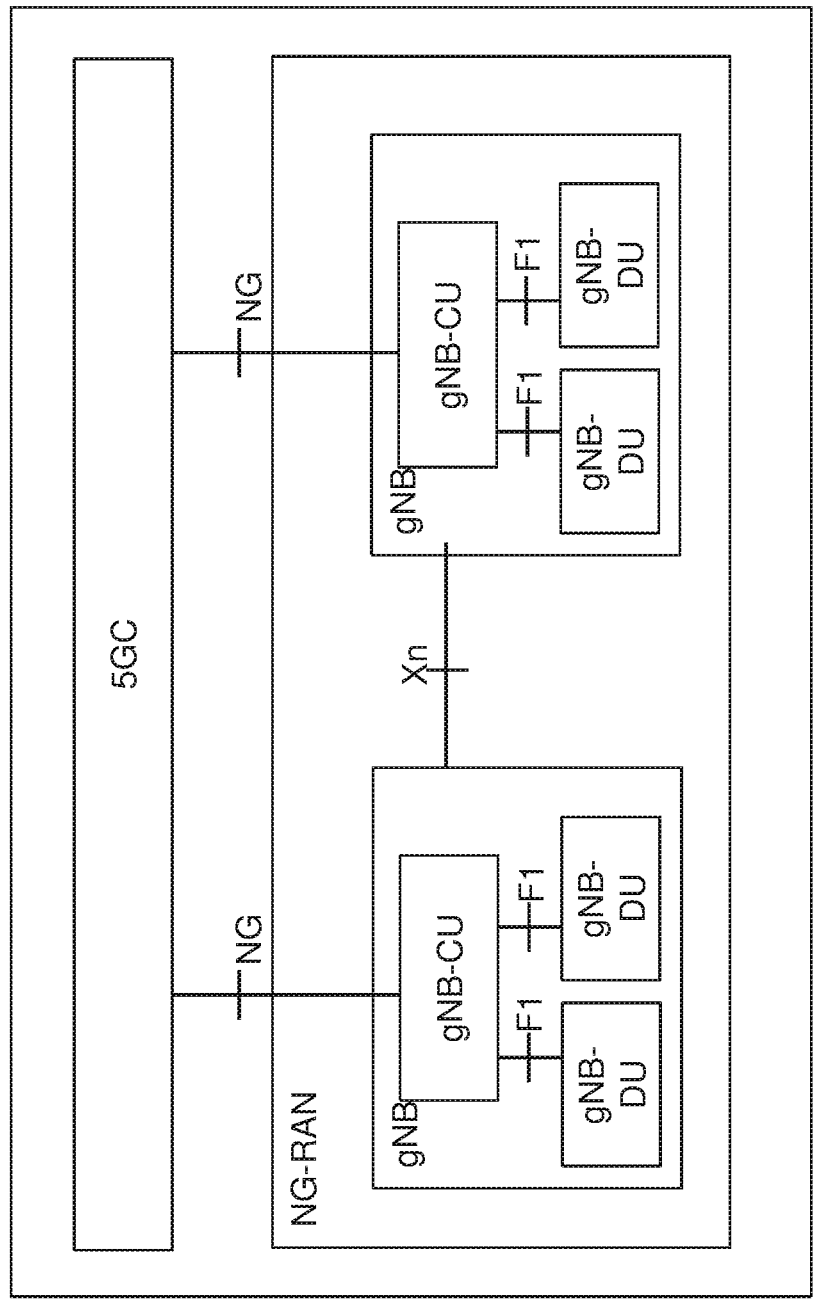
FIGS. 1-6 show different scenarios according to prior art.
Figure 1B:
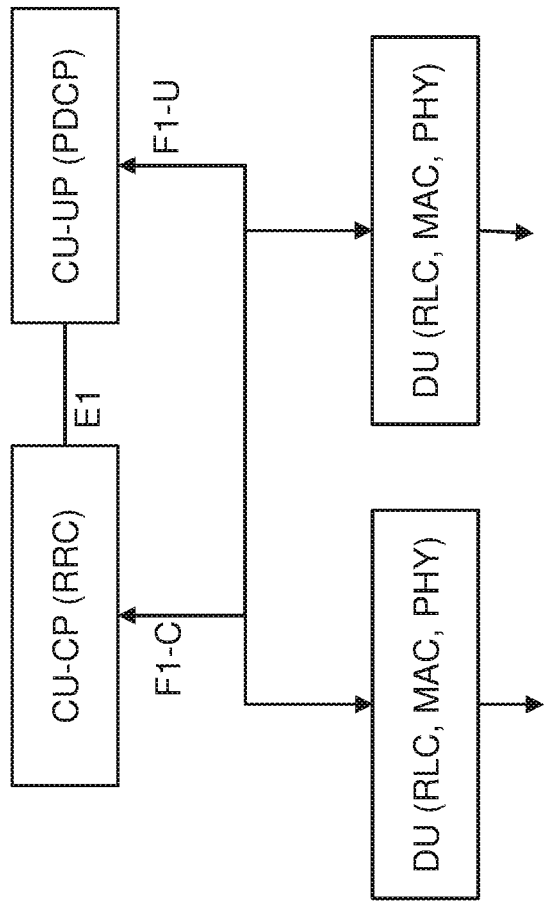
Figure 1C:
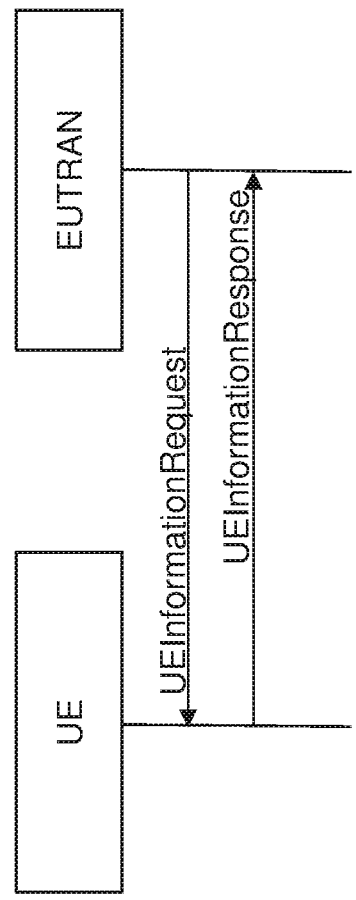
Figure 2:
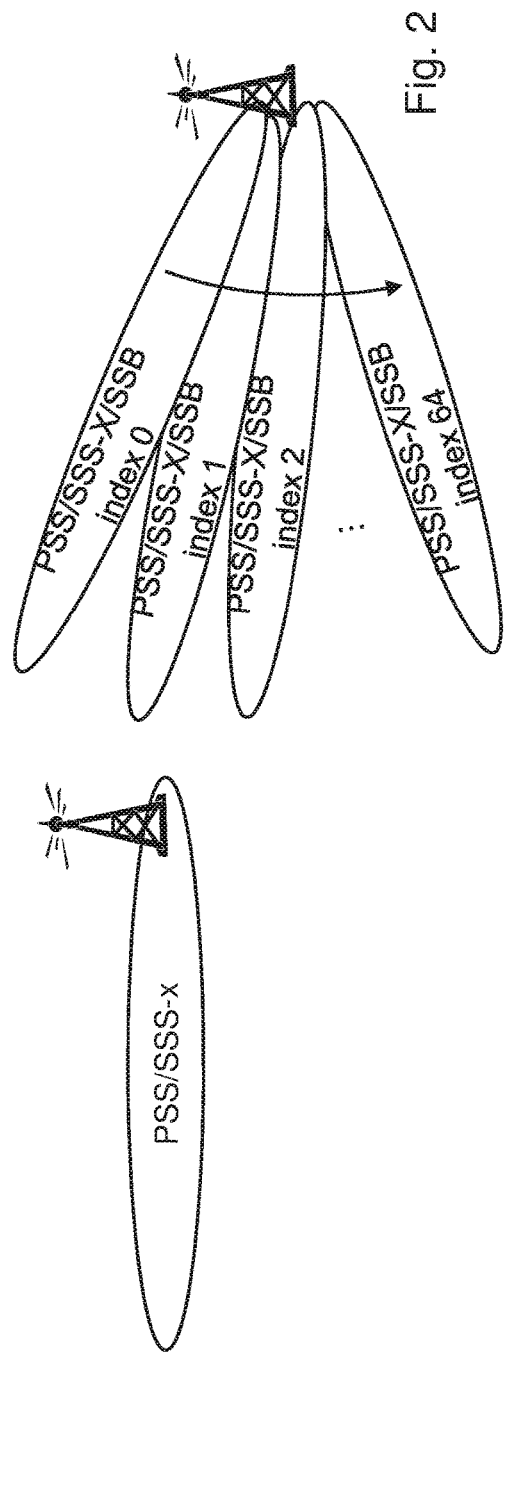
Figure 3:
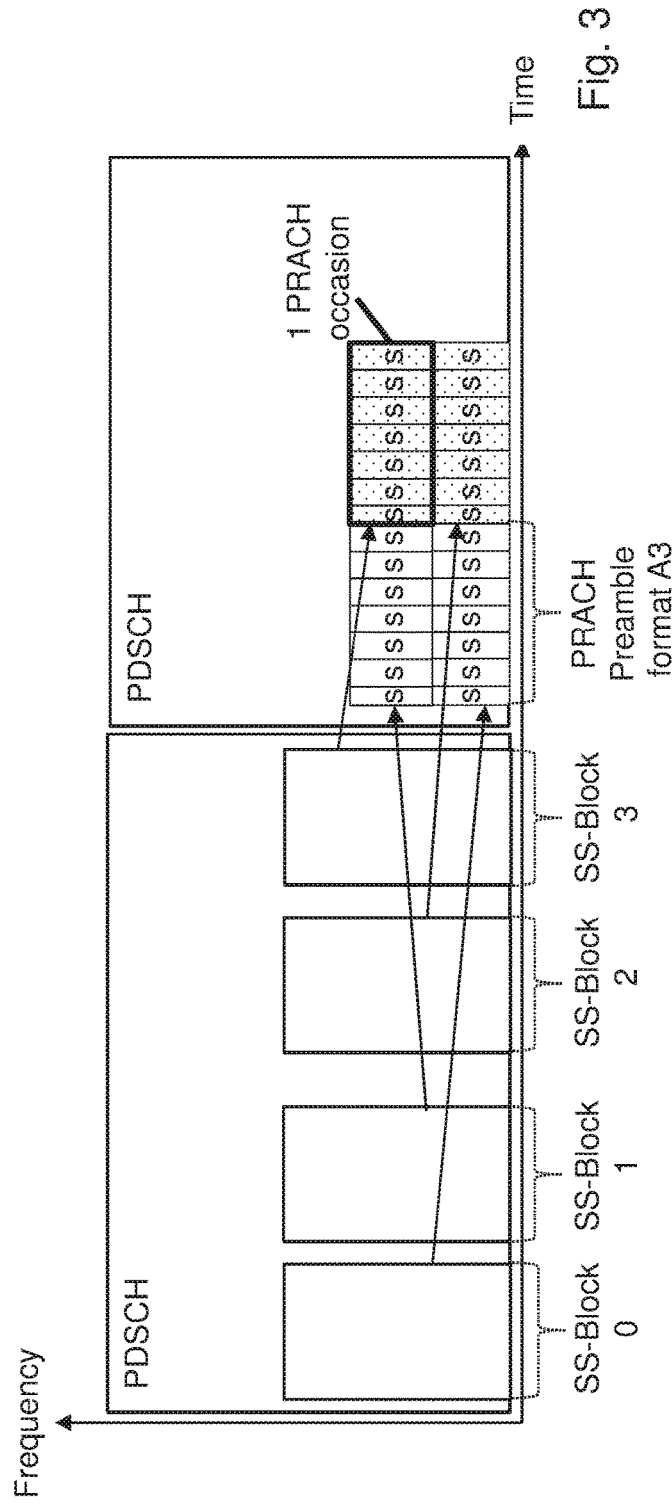
Figure 4:
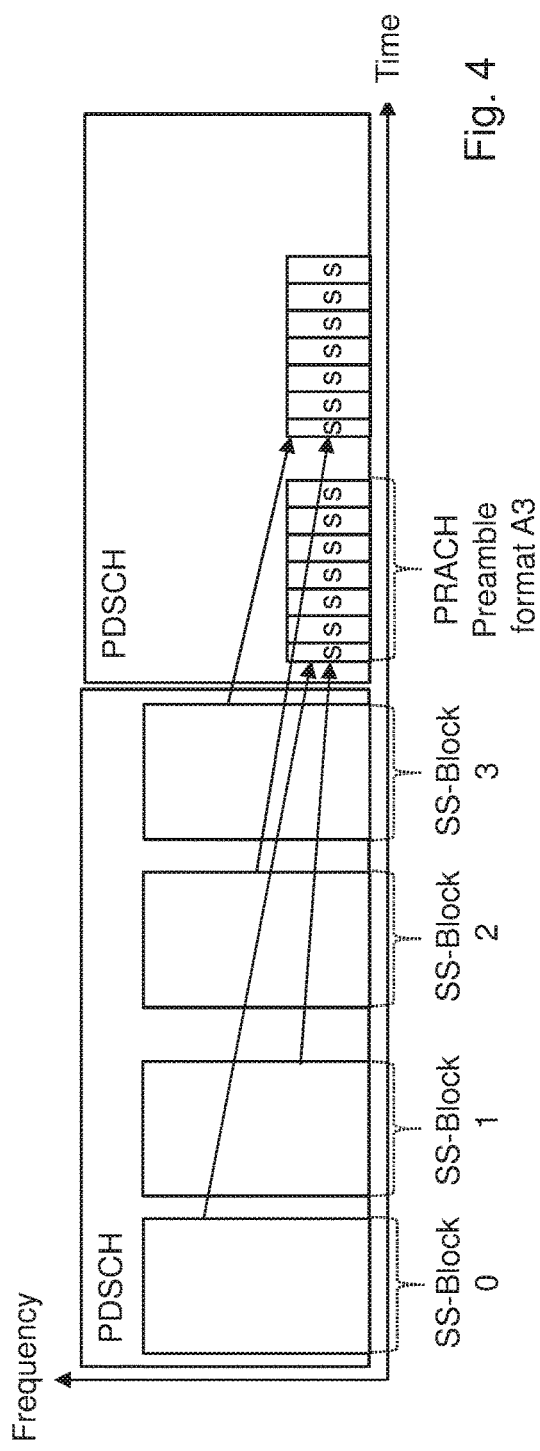
Figure 5:
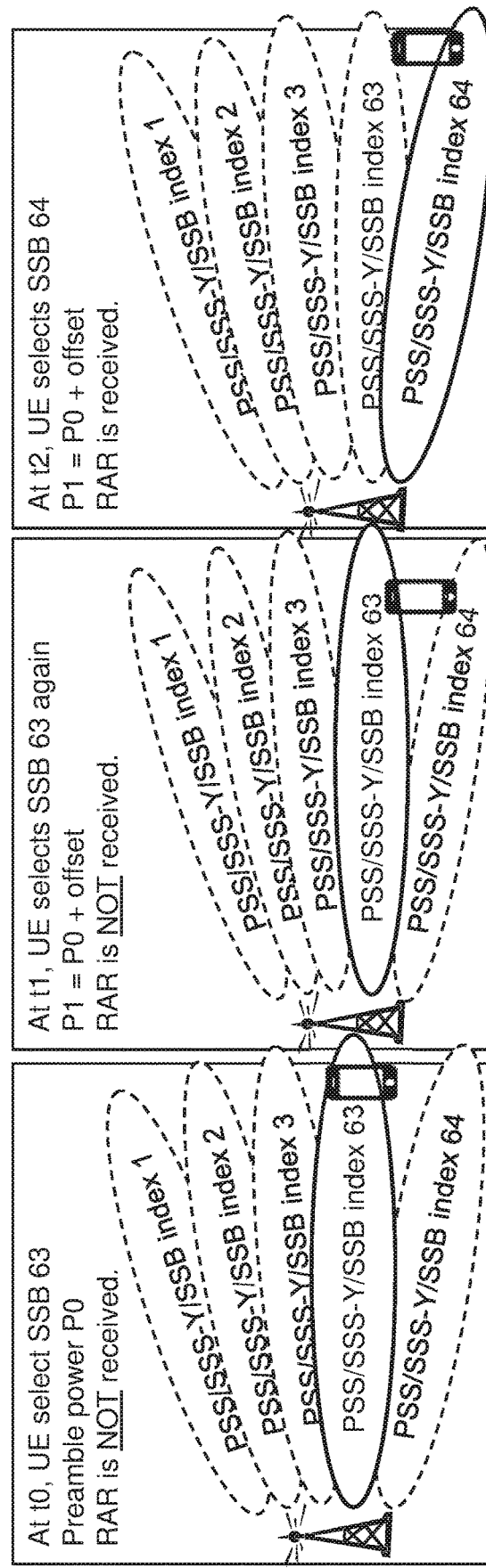

In another embodiment the radio network nodes involved in the signalling with the UE 10, by which a RACH Report is made available by the UE 10 to the network, requested to be signaled by the network and then signalled to the network by the UE 10, may comply to a split RAN architecture as for example the one shown in FIG. 1a or FIG. 1b. For the sake of simplicity the split architecture considered may be the one followed by the NG RAN. However, it should be noted that any embodiment concerning methods applicable to a split architecture are equally valid for other RAN architectures following a similar architectural split. As an example, an alternative radio access technology following such split is E-UTRAN (LTE), where an eNB is split into eNB-central unit (CU) and eNB-distributed unit (DU).

In such a split architecture the node hosting the RRC protocol, e.g. the gNB-CU-control plane (CP), receives the RACH Report. However, RACH is a process owned and managed by the gNB-DU. Hence whenever the gNB-CU-CP of a given gNB receiving a RACH report realizes that such RACH report should be analysed and taken into account for possible configuration optimization, the gNB-CU-CP receiving the RACH Report forwards it to the corresponding gNB-DU where the RACH processes logged by the UE occurred. Considering the embodiments described above, the FIG. 9I represents an example of such gNB-CU-CP to gNB-DU signalling. FIG. 9I shows a use case where the UE is connected to the MeNB. The SgNB-CU-UP sends a SgNB addition response to a SgNB addition request from the MeNB. The UE performs RACH access attempts (no successful RACH). The UE logs measurements and information concerning RACH access to SgNB. The UE performs report signalling to MeNB. The MeNB performs analysis and optimization based on received RACH report. The MeNB signals RACH report from MeNB to SgNB-CU-CP. The SgNB-CU-CP signals RACH report from SgNB-CU-CP to SgNB-DU. The SgNB-DU performs analysis and optimization based on received RACH report.

This allows the gNB-DU to detect possible misconfigurations or optimization in its RACH configuration.

According to an aspect the object is achieved by providing a method performed by the UE 10 for handling access to one or more radio network nodes. The UE initiates a RA procedure associated to a cell and according to a first configuration, while the UE is already connected to at least one cell. The UE logs or store random access related information while the UE already has a RACH report stored. The UE receives a request from a radio network node to transmit a RACH report when the UE is in Dual Connectivity. The UE transmits a RACH report upon request from the radio network node when the UE is in Dual Connectivity.

According to another aspect the object is achieved by providing a method performed by a radio network node for handling access of a UE. The radio network node transmits a request to a UE to transmit a RACH report when the UE is in Dual Connectivity. The radio network node receives a RACH report upon request from the UE when the UE is in Dual Connectivity.

According to yet another aspect the object is achieved by providing a radio network node and a UE configured to perform the methods herein.

Figure 10:
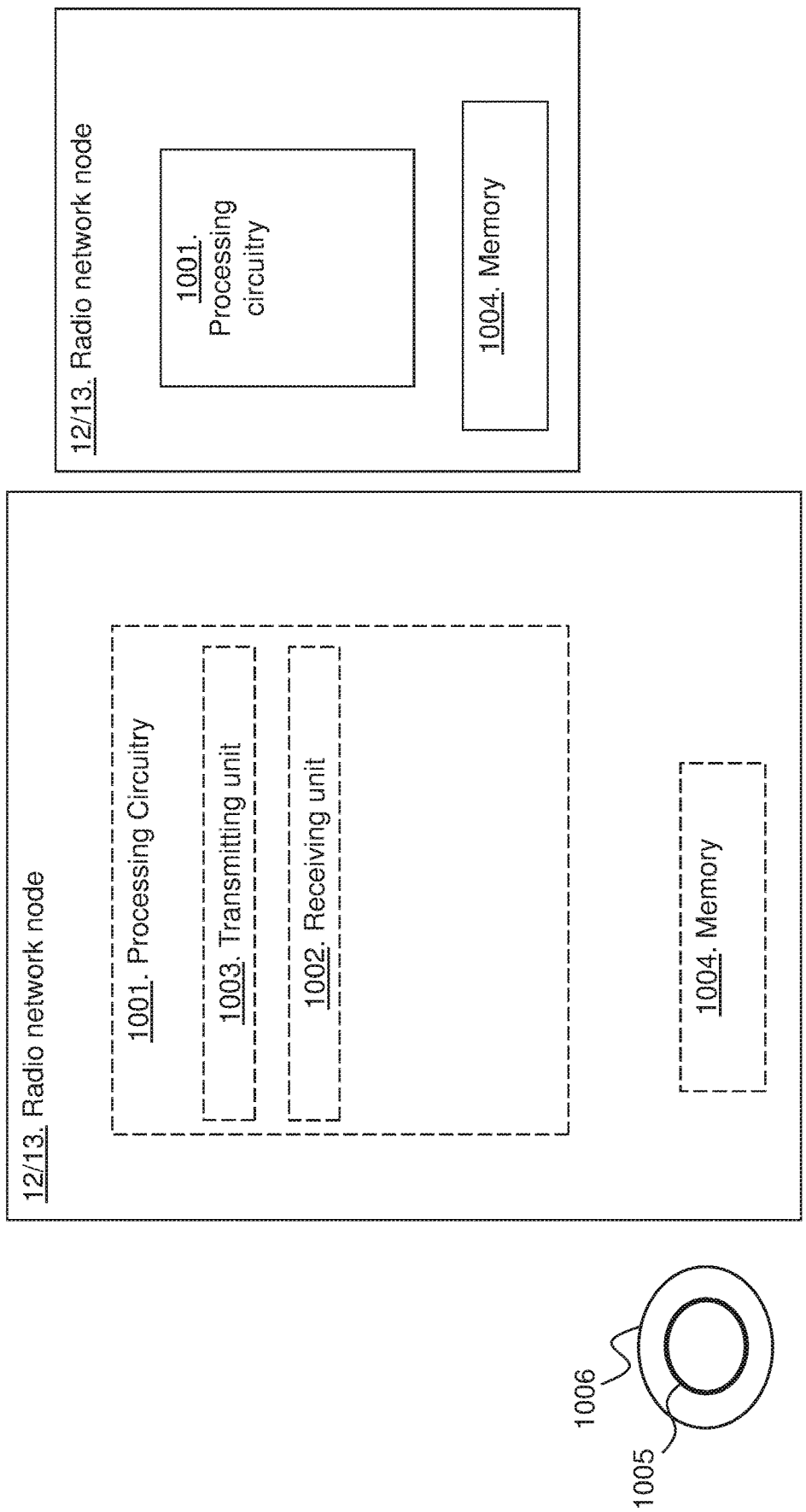
FIG. 10 shows a block diagram depicting a radio network node according to embodiments herein.

FIG. 10 is a block diagram depicting the radio network node, e.g. the first or the second radio network node, for handling access for or of the UE 10 e.g. in the wireless communication network according to embodiments herein.

The radio network node such as a radio base station may comprise processing circuitry 1001, e.g. one or more processors, configured to perform the methods herein.

The radio network node may comprise a receiving unit 1002, e.g. a receiver, a transceiver. The radio network node, the processing circuitry 1001 and/or the receiving unit 1002 is configured to receive the RACH report from the UE when the UE has more than one MAC entity, and the indication that highlights for what RAT or radio network node the RACH report was constructed, e.g. to receive a RACH report upon request from the UE when the UE is in Dual Connectivity. The radio network node, the processing circuitry 1001 and/or the receiving unit 1002 may be configured to receive the flag indicating presence of a RACH report stored at the UE 10.

The radio network node may comprise a transmitting unit 1003, e.g. a transmitter or a transceiver. The radio network node, the processing circuitry 1001 and/or the transmitting unit 1003 is configured to transmit to the UE 10, the request to transmit a RACH report when the UE 10 has more than one MAC entity e.g. when the UE 10 is in Dual Connectivity. The request may comprise the indication indicating which RACH report to transmit.

The radio network node further comprises a memory 1004. The memory comprises one or more units to be used to store data on, such as indications, RACH reports, applications to perform the methods disclosed herein when being executed, and similar. Thus, the radio network node 12 may comprise the processing circuitry and the memory, said memory comprising instructions executable by said processing circuitry whereby said radio network node is operative to perform the methods herein.

The methods according to the embodiments described herein for the radio network node are respectively implemented by means of e.g. a computer program 1005 or a computer program product 1005, comprising instructions, i.e., software code portions, which, when executed on at least one processor, cause the at least one processor to carry out the actions described herein, as performed by the radio network node. The computer program product 1005 may be stored on a computer-readable storage medium 1006, e.g. a disc or similar. The computer-readable storage medium 1006, having stored thereon the computer program product 1005, may comprise the instructions which, when executed on at least one processor, cause the at least one processor to carry out the actions described herein, as performed by the radio network node. In some embodiments, the computer-readable storage medium may be a non-transitory computer-readable storage medium.

Figure 11:
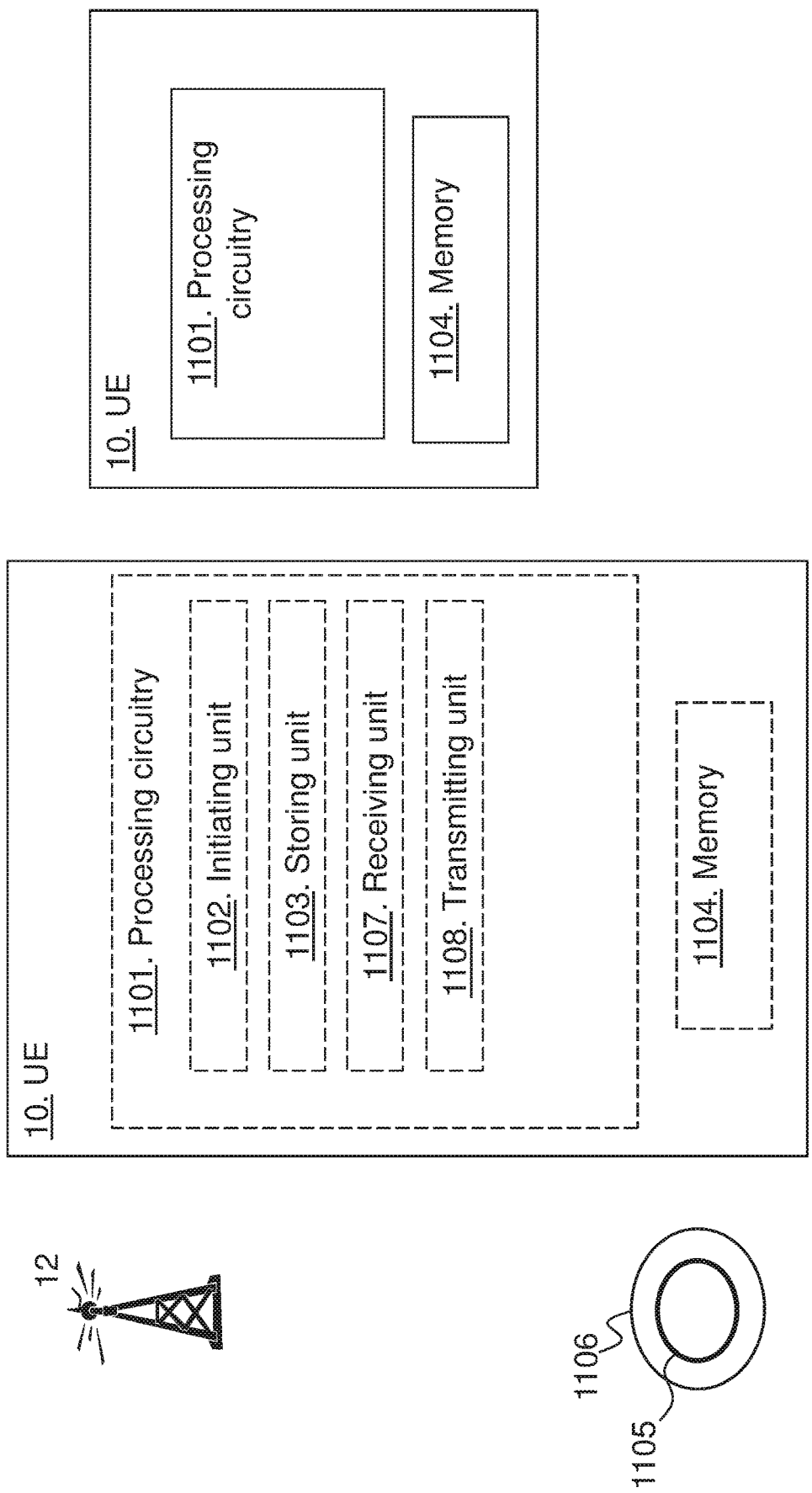
FIG. 11 shows a block diagram depicting a UE according to embodiments herein.

FIG. 11 is a block diagram depicting the UE 10 for handling access to one or more radio network nodes in the wireless communication network according to embodiments herein.

The UE 10 may comprise processing circuitry 1101, e.g. one or more processors, configured to perform the methods herein.

The UE 10 may comprise an initiating unit 1102. The UE 10, the processing circuitry 1101 and/or the initiating unit 1102 is configured to initiate the RA procedure associated to the cell and according to the first configuration for the second RAT, while the UE is already connected to at least one cell of a first RAT.

The UE 10 may comprise a storing unit 1103. The UE 10, the processing circuitry 1101 and/or the storing unit 1103 is configured to log or store random access related information of the RA procedure while the UE already has a RACH report stored for the first RAT.

The UE 10 may comprise a receiving unit 1107, e.g. a receiver or transceiver. The UE 10, the processing circuitry 1101 and/or the receiving unit 1107 may be configured to receive a request from a radio network node to transmit a RACH report when the UE is in Dual Connectivity. The UE 10, the processing circuitry 1101 and/or the receiving unit 1107 may be configured to receive the request from the radio network node comprising the indication indicating which RACH report to transmit.

The UE 10 may comprise a transmitting unit 1108. The UE 10, the processing circuitry 1101 and/or the transmitting unit 1108 is configured: to transmit upon request from a radio network node when the UE has more than one MAC entity, the RACH report based on the logged random access information or the stored RACH report e.g. when the UE is in Dual Connectivity; and to signal to the radio network node, the indication that highlights for what RAT or radio network node the RACH report was constructed. The transmitted RACH report may be related to the latest successfully executed RA procedure in a cell. The UE 10, the processing circuitry 1101 and/or the transmitting unit 1108 may be configured to when the UE is connected to a RAT different from the first RAT and for which the RACH report is stored, not to upload the RACH report for the different RAT, but to wait until the UE is connected to the first RAT, and configured to then transmit the flag indicating presence of the RACH report for the different RAT. The UE 10, the processing circuitry 1101 and/or the receiving unit 1107 may be configured to then receive the request for the RACH report for the different RAT.

The UE 10 further comprises a memory 1104. The memory comprises one or more units to be used to store data on, such as indications, RACH reports, RATs, cells, applications to perform the methods disclosed herein when being executed, and similar. Thus, the UE 10 may comprise the processing circuitry and the memory, said memory comprising instructions executable by said processing circuitry whereby said UE 10 is operative to perform the methods herein.

The methods according to the embodiments described herein for the UE 10 are respectively implemented by means of e.g. a computer program 1105 or a computer program product 1105, comprising instructions, i.e., software code portions, which, when executed on at least one processor, cause the at least one processor to carry out the actions described herein, as performed by the UE 10. The computer program product 1105 may be stored on a computer-readable storage medium 1106, e.g. a disc, USB or similar. The computer-readable storage medium 1106, having stored thereon the computer program product 1105, may comprise the instructions which, when executed on at least one processor, cause the at least one processor to carry out the actions described herein, as performed by the UE 10. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figure 12:
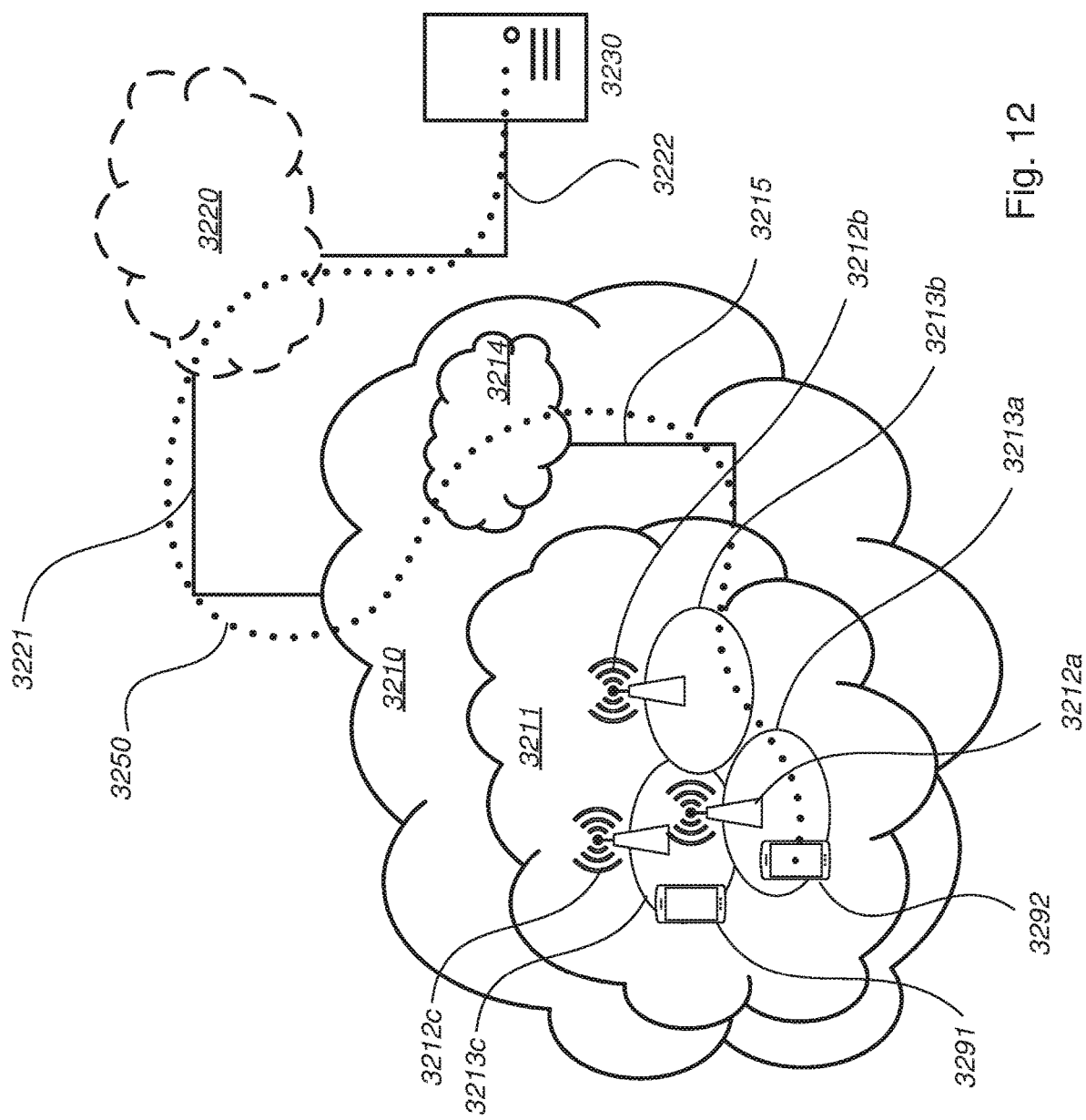
FIG. 12 is a schematic diagram depicting a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
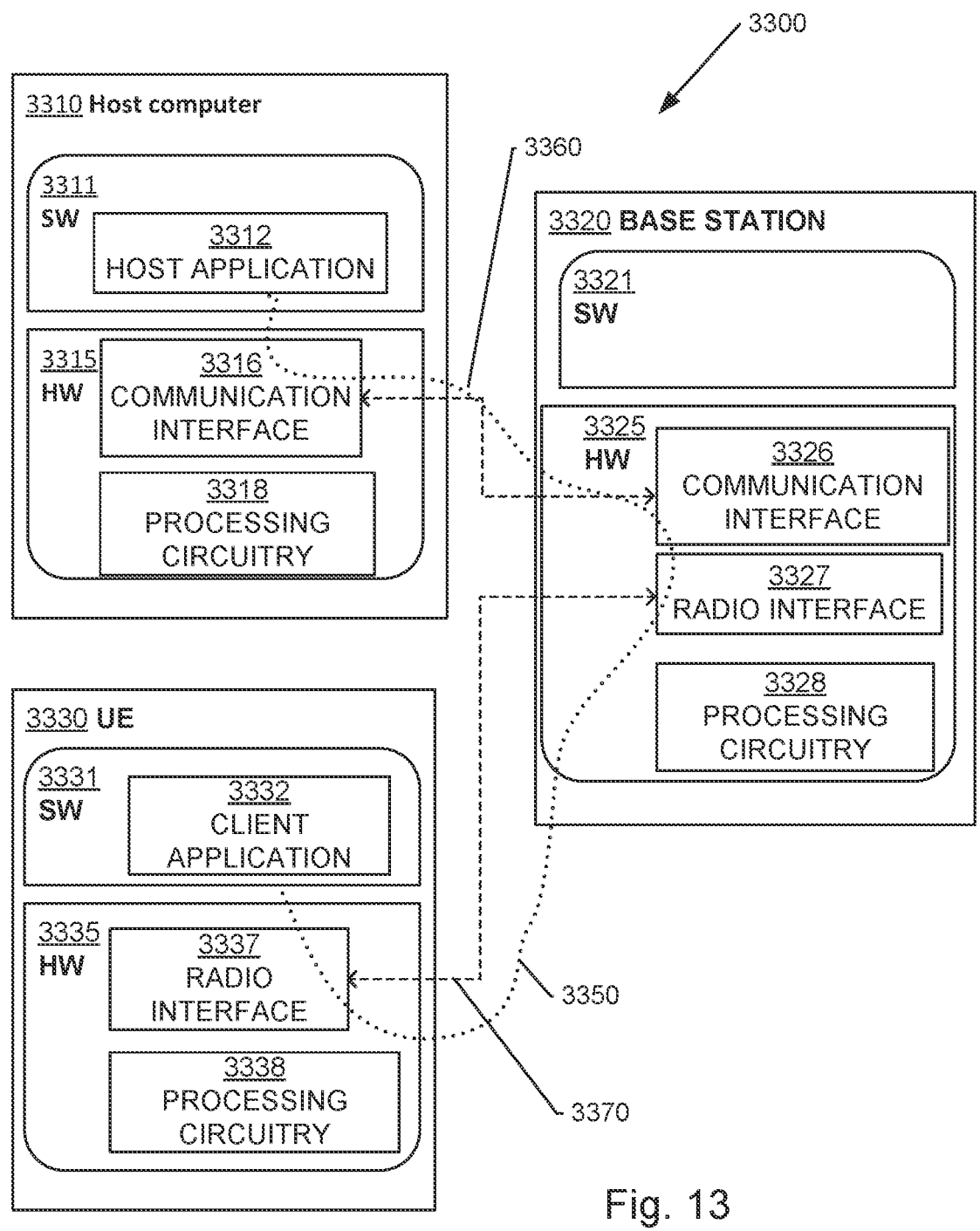
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve transmissions as number of transitions between states may be reduced and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, for handling access to one or more radio network nodes, the method comprising:
   initiating a random access, RA, procedure associated to a cell and according to a first configuration for a second radio access technology, RAT, while the UE is already connected to at least one cell of a first RAT;
   logging random access related information of the random access procedure while the UE already has a random access channel, RACH, report stored for the first RAT;
   transmitting a RACH report based on the logged random access information or the stored RACH report, upon request from a radio network node when the UE has more than one medium access control, MAC, entity; and
   signalling to the radio network node, an indication that highlights for what RAT or radio network node the transmitted RACH report was constructed.

2. The method according to claim 1, wherein the UE is connected to a RAT different from the first RAT and for which the RACH report is stored, the UE will not upload the RACH report for the different RAT, but will wait until the UE is connected to the first RAT, and then transmit a flag indicating presence of the RACH report for the different RAT and then receive a request for the RACH report for the different RAT.

3. The method according to claim 1, wherein the transmitted RACH report is related to a latest successfully executed RA procedure in a cell.

4. The method according to claim 1, further comprising receiving the request from the radio network node comprising an indication indicating which RACH report to transmit.

5. A non-transitory computer-readable storage medium, having stored thereon a computer program product comprising instructions which, when executed on at least one processor, cause the at least one processor to carry out the method according to claim 1, as performed by the UE or the radio network node, respectively.

6. A method performed by a radio network node for handling access of a user equipment, UE, the method comprising:
   transmitting to the UE, a request to transmit a random access channel, RACH, report when the UE has more than one medium access control, MAC, entity; and
   receiving from the UE, a RACH report when the UE has more than one MAC entity, and an indication that highlights for what radio access technology, RAT, or radio network node the RACH report was constructed.

7. The method according to claim 6, comprising receiving a flag indicating presence of a stored RACH report at the UE.

8. The method according to claim 6, wherein the request to the UE comprises an indication indicating which RACH report to transmit.

9. A user equipment, UE, for handling access to one or more radio network nodes, wherein the UE is configured to:
   initiate a random access, RA, procedure associated to a cell and according to a first configuration for a second radio access technology, RAT, while the UE is already connected to at least one cell of a first RAT;
   log random access related information of the RA procedure while the UE already has a random access channel, RACH, report stored for the first RAT;
   upon request from a radio network node when the UE has more than one MAC entity, transmit a RACH report based on the logged random access information or the stored RACH report; and
   signal to the radio network node, an indication that highlights for what RAT or radio network node the RACH report was constructed.

10. The UE according to claim 9, wherein the UE is configured upon being connected to a RAT different from the first RAT and for which the RACH report is stored, the UE will not upload the RACH report for the different RAT, but will wait until the UE is connected to the first RAT, and then transmit a flag indicating presence of the RACH report for the different RAT and then receive a request for the RACH report for the different RAT.

11. The UE according to claim 9, wherein the transmitted RACH report is related to a latest successfully executed RA procedure in a cell.

12. The UE according to claim 9, wherein the UE is further configured to receive the request from the radio network node comprising an indication indicating which RACH report to transmit.

13. A radio network node for handling access of a user equipment, UE, wherein the radio network node is configured to:
   transmit to the UE, a request to transmit a random access channel, RACH, report when the UE has more than one medium access control, MAC, entity; and
   receive a RACH report from the UE when the UE has more than one MAC entity, and an indication that highlights for what radio access technology, RAT, or radio network node the RACH report was constructed.

14. The radio network node according to claim 13, wherein the radio network node is further configured to receive a flag indicating presence of a RACH report stored at the UE.

15. The radio network node according to claim 13, wherein the request comprises an indication indicating which RACH report to transmit.

* * * * *